United States Patent
Cirik et al.

(10) Patent No.: US 11,337,163 B2
(45) Date of Patent: May 17, 2022

(54) POWER CONTROL FOR WIRELESS COMMUNICATIONS

(71) Applicant: Comcast Cable Communications, LLC, Philadelphia, PA (US)

(72) Inventors: Ali Cirik, Herndon, VA (US); Esmael Dinan, McLean, VA (US); Yunjung Yi, Vienna, VA (US); Hua Zhou, Herndon, VA (US); Alireza Babaei, Fairfax, VA (US); Youngwoo Kwak, Vienna, VA (US); Kyungmin Park, Herndon, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/935,968

(22) Filed: Jul. 22, 2020

(65) Prior Publication Data
US 2021/0029650 A1 Jan. 28, 2021

Related U.S. Application Data

(63) Continuation of application No. 16/935,705, filed on Jul. 22, 2020, now Pat. No. 11,224,021.

(60) Provisional application No. 62/877,020, filed on Jul. 22, 2019.

(51) Int. Cl.
*H04W 52/24* (2009.01)
*H04W 52/02* (2009.01)
*H04W 52/14* (2009.01)

(52) U.S. Cl.
CPC ..... *H04W 52/242* (2013.01); *H04W 52/0212* (2013.01); *H04W 52/146* (2013.01); *H04W 52/248* (2013.01)

(58) Field of Classification Search
CPC ............ H04W 52/242; H04W 52/248; H04W 52/0212; H04W 52/146
USPC ............ 455/452.1, 509, 452.2, 522, 69
See application file for complete search history.

(56) References Cited

U.S. PATENT DOCUMENTS

| | | | |
|---|---|---|---|
| 10,986,622 B2* | 4/2021 | Zhang | H04B 7/088 |
| 2019/0044681 A1 | 2/2019 | Zhang | |
| 2019/0075524 A1* | 3/2019 | Zhou | H04W 72/042 |
| 2019/0349867 A1* | 11/2019 | MolavianJazi | H04W 52/242 |
| 2020/0068497 A1 | 2/2020 | Gong et al. | |

(Continued)

FOREIGN PATENT DOCUMENTS

| | | |
|---|---|---|
| CN | 108632971 A | 10/2018 |
| EP | 2824956 A1 | 1/2015 |
| EP | 3481113 A1 | 5/2019 |

(Continued)

OTHER PUBLICATIONS

Nokia et al. "Remaining details on NR PUSCH power control", 3GPP Draft; Apr. 15, 2018.

(Continued)

*Primary Examiner* — John J Lee
(74) *Attorney, Agent, or Firm* — Banner & Witcoff, Ltd.

(57) ABSTRACT

Wireless communications may be used to support transmission power control. A reference signal may be mapped to a power control parameter set. A message to schedule a transmission may be received that indicates the power control parameter set. A transmission power for the scheduled transmission may be determined based on the reference signal.

20 Claims, 27 Drawing Sheets

(56) References Cited

U.S. PATENT DOCUMENTS

2020/0267663 A1    8/2020  Xu et al.
2020/0403760 A1*  12/2020  Ratasuk ............... H04L 5/0005

FOREIGN PATENT DOCUMENTS

| EP | 3731446 A1 | 10/2020 |
| WO | 2018126361 A1 | 7/2018 |
| WO | 2018175784 A1 | 9/2018 |
| WO | 2019049107 A1 | 3/2019 |
| WO | 2019127199 A1 | 7/2019 |

OTHER PUBLICATIONS

Dec. 2, 20202—European Search Report—EP 20187153.0.

3GPP TS 38.300 V15.6.0 (Jun. 2019), Technical Specification, 3rd Generation Partnership Project; Technical Specification Group Radio Access Network; NR; NR and NG-RAN Overall Description; Stage 2 (Release 15).

3GPP TS 38.321 V15.6.0 (Jun. 2019), Technical Specification, 3rd Generation Partnership Project; Technical Specification Group Radio Access Network; NR; Medium Access Control (MAC) protocol specification (Release 15).

3GPP TS 38.331 V15.6.0 (Jun. 2019), Technical Specification, 3rd Generation Partnership Project; Technical Specification Group Radio Access Network; NR; Radio Resource Control (RRC) protocol specification (Release 15).

3GPP TSG RAN WG1 Meeting #97, Reno, USA, May 13-17, 2019, Title: RAN1 Chairman's Notes.

3GPP TS 38.213 V15.6.0 (Jun. 2019), Technical Specification, 3rd Generation Partnership Project; Technical Specification Group Radio Access Network; NR; Physical layer procedures for control (Release 15).

3GPP TS 38.214 V15.6.0 (Jun. 2019), Technical Specification, 3rd Generation Partnership Project; Technical Specification Group Radio Access Network; NR; Physical layer procedures for data (Release 15).

R1-1906030 3GPP TSG RAN WG1 Meeting #97, Reno, USA, May 13-17, 2019, Source: Huawei, HiSilicon, Title: Enhancements on multi-beam operation.

R1-1906160 3GPP TSG RAN WG1 Meeting #97, Reno, USA, May 13-17, 2019, Source: vivo, Title: Further discussion on Multi-Beam Operation.

R1-1906169 3GPP TSG RAN WG1 Meeting #97, Reno, USA, May 13-17, 2019, Source: vivo, Title: Performance avaluation of L1-SINR based beam selection.

R1-1906225 3GPP TSG RAN WG1 Meeting #97, Reno, USA, May 13-17, 2019, Source: NTT DOCOMO, Inc., Title: Discussion on multi-beam enhancement.

R1-1906237 3GPP TSG RAN WG1 Meeting #97, Reno, USA, May 13-17, 2019, Source: ZTE, Title: Enhancements on multi-beam enhancement.

R1-1906244 3GPP TSG RAN WG1 Meeting #97, Reno, USA, May 13-17, 2019, Source: ZTE, Title: Considerations on beam management for multi-TRP.

R1-1906245 3GPP TSG RAN WG1 Meeting #97, Reno, USA, May 13-17, 2019, Source: ZTE, Title: Details of latency and overhead reduction for beam management.

R1-1906246 3GPP TSG RAN WG1 Meeting #97, Reno, USA, May 13-17, 2019, Source: ZTE, Title: Details and SLS evaluation on UL simultaneous transmission in indoor hotspot.

R1-1906247 3GPP TSG RAN WG1 Meeting #97, Reno, USA, May 13-17, 2019, Source: ZTE, Title: Details and LLS evaluation on UL simultaneous transmission for multi-TRP.

R1-1906248 3GPP TSG RAN WG1 Meeting #97, Reno, USA, May 13-17, 2019, Source: ZTE, Title: Details and LLS evaluation on L1-SINR measurement and reporting.

R1-1906249 3GPP TSG RAN WG1 Meeting #97, Reno, USA, May 13-17, 2019, Source: ZTE, Title: Details and SLS evaluation on L1-SINR measurement and reporting.

R1-1906250 3GPP TSG RAN WG1 Meeting #97, Reno, USA, May 13-17, 2019, Source: ZTE, Title: Discussion on UL power control for multi-panel operation.

R1-1906251 3GPP TSG RAN WG1 Meeting #97, Reno, USA, May 13-17, 2019, Source: ZTE, Title: Enhancements on UL beam management.

R1-1906252 3GPP TSG RAN WG1 Meeting #97, Reno, USA, May 13-17, 2019, Source: ZTE, Title: Leftover Issues on aperiodic CSI-RS.

R1-1906253 3GPP TSG RAN WG1 Meeting #97, Reno, USA, May 13-17, 2019, Source: ZTE, Title: PUSCH spatial relation and power control after BFR.

R1-1906254 3GPP TSG RAN WG1 Meeting #97, Reno, USA, May 13-17, 2019, Source: ZTE, Title: Configuration of SRS and PUSCH in the same symbol.

R1-1906255 3GPP TSG RAN WG1 Meeting #97, Reno, USA, May 13-17, 2019, Source: ZTE, Title: Enhancements on simultaneous Tx/Rx of channels/signals.

R1-1906275 3GPP TSG RAN WG1 Meeting #97, Reno, USA, May 13-17, 2019, Source: Lenovo, Motorola Mobility, Title: Discussion of multi-beam operation.

R1-1906276 3GPP TSG RAN WG1 Meeting #97, Reno, USA, May 13-17, 2019, Source: Lenovo, Motorola Mobility, Title: Discussion on UL multi-panel transmission.

R1-1906288 3GPP TSG RAN WG1 Meeting #97, Reno, USA, May 13-17, 2019, Source: OPPO, Title: Discussion on Multi-beam Operation Enhancements.

R1-1906346 3GPP TSG RAN WG1 Meeting #97, Reno, USA, May 13-17, 2019, Source: CATT, Title: Consideration on multi-beam enhancements.

R1-1906370 3GPP TSG RAN WG1 Meeting #97, Reno, USA, May 13-17, 2019, Source: Spreadtrum Communications, Title: Discussion on multi-beam operation.

R1-1906399 3GPP TSG RAN WG1 Meeting #97, Reno, USA, May 13-17, 2019, Source: NEC, Title: Discussion on multi-beam operation.

R1-1906446 3GPP TSG RAN WG1 Meeting #97, Reno, USA, May 13-17, 2019, Source: Fujitsu, Title: Enhancements on multi-beam operation.

R1-1906522 3GPP TSG RAN WG1 Meeting #97, Reno, USA, May 13-17, 2019, Source: CMCC, Title: Enhancements on multi-beam operation.

R1-1906537 3GPP TSG RAN WG1 Meeting #97, Reno, USA, May 13-17, 2019, Source: MediaTek Inc., Title: Enhancements on multi-beam operation.

R1-1906539 3GPP TSG RAN WG1 Meeting #97, Reno, USA, May 13-17, 2019, Source: MediaTek Inc., Title: Further considerations on RS design.

R1-1906731 3GPP TSG RAN WG1 Meeting #97, Reno, USA, May 13-17, 2019, Source: LG Electronics, Title: Discussion on multi-beam based operations and enhancements.

R1-1906741 3GPP TSG RAN WG1 Meeting #97, Reno, USA, May 13-17, 2019, Source: LG Electronics, Title: Performance analysis on STxMP for future enhancement.

R1-1906742 3GPP TSG RAN WG1 Meeting #97, Reno, USA, May 13-17, 2019, Source: LG Electronics, Title: Evaluation results on beam selection based on L1-SINR with dedicated IMR.

R1-1906816 3GPP TSG RAN WG1 Meeting #97, Reno, USA, May 13-17, 2019, Source: Intel Corporation, Title: On Beam Management Enhancement.

R1-1906851 3GPP TSG RAN WG1 Meeting #97, Reno, USA, May 13-17, 2019, Source: Sony, Title: Enhancements on multi-beam operation.

R1-1906861 3GPP TSG RAN WG1 Meeting #97, Reno, USA, May 13-17, 2019, Source: InterDigital, Inc., Title: On L1-SINR Measurement.

R1-1906887 3GPP TSG RAN WG1 Meeting #97, Reno, USA, May 13-17, 2019, Source: China Telecom, Title: Enhancements on multi-beam operation.

R1-1906969 3GPP TSG RAN WG1 Meeting #97, Reno, USA, May 13-17, 2019, Source: Samsung, Title: Enhancements on multi-beam operation.

(56) References Cited

OTHER PUBLICATIONS

R1-1906977 3GPP TSG RAN WG1 Meeting #97, Reno, USA, May 13-17, 2019, Source: Samsung, Title: Evaluation on SINR metrics for beam selection.
R1-1906978 3GPP TSG RAN WG1 Meeting #97, Reno, USA, May 13-17, 2019, Source: Samsung, Title: Discussion on IMR for L1-SINR measurement.
R1-1907032 3GPP TSG RAN WG1 Meeting #97, Reno, USA, May 13-17, 2019, Source: Panasonic, Title: On enhancements for multi-beam operations for NR MIMO in Rel. 16.
R1-1907052 3GPP TSG RAN WG1 Meeting #97, Reno, USA, May 13-17, 2019, Source: Fraunhofer IIS, Fraunhofer HHI, Title: Enhancements on UE multi-beam operation.
R1-1907205 3GPP TSG RAN WG1 Meeting #97, Reno, USA, May 13-17, 2019, Source: CAICT, Title: Further discussion on Scell BFR and L1-SINR.
R1-1907247 3GPP TSG RAN WG1 Meeting #97, Reno, USA, May 13-17, 2019, Source: Motorola Mobility, Lenovo, Title: Power control for multi-panel UE.
R1-1907290 3GPP TSG RAN WG1 Meeting #97, Reno, USA, May 13-17, 2019, Source: Qualcomm Incorporated. Title: Enhancements on Multi-beam Operation.
R1-1907317 3GPP TSG RAN WG1 Meeting #97, Reno, USA, May 13-17, 2019, Source: Nokia, Nokia Shanghai Bell, Title: Enhancements on Multi-beam Operation.
R1-1907343 3GPP TSG RAN WG1 Meeting #97, Reno, USA, May 13-17, 2019, Source: Apple, Title: Considerations on multi-panel and MPE in FR2.
R1-1907344 3GPP TSG RAN WG1 Meeting #97, Reno, USA, May 13-17, 2019, Source: Apple Inc., Title: Further considerations on beam management enhancement.
R1-1907360 3GPP TSG RAN WG1 Meeting #97, Reno, USA, May 13-17, 2019, Source: Asia Pacific Telecom, Title: Enhancements on Multi-beam Operations.
R1-1907416 3GPP TSG RAN WG1 Meeting #97, Reno, USA, May 13-17, 2019, Source: KDDI, Title: Enhancements on Multi-beam Operations.
R1-1907436 3GPP TSG RAN WG1 Meeting #97, Reno, USA, May 13-17, 2019, Source: Ericsson, Title: Enhancements on Multi-beam Operations.
R1-1907437 3GPP TSG RAN WG1 Meeting #97, Reno, USA, May 13-17, 2019, Source: Ericsson, Title: On event-driven reporting for beam management.
R1-1907438 3GPP TSG RAN WG1 Meeting #97, Reno, USA, May 13-17, 2019, Source: Ericsson, Title: Latency analysis of SCell BFR solutions.
R1-1907439 3GPP TSG RAN WG1 Meeting #97, Reno, USA, May 13-17, 2019, Source: Ericsson, Title: Performance of beam selection based on L1-SINR.
R1-1907444 3GPP TSG RAN WG1 Meeting #97, Reno, USA, May 13-17, 2019, Source: Xiaomi, Title: Enhancements on beam management.
R1-1907466 3GPP TSG RAN WG1 Meeting #97, Reno, USA, May 13-17, 2019, Source: Convida Wireless, Title: On Beam Failure Recovery for Scell.
R1-1907473 3GPP TSG RAN WG1 Meeting #97, Reno, USA, May 13-17, 2019, Source: Ericsson, Title: Comparison of MAC CE signalling options for spatial relation update of aperiodic SRS.
R1-1907474 3GPP TSG RAN WG1 Meeting #97, Reno, USA, May 13-17, 2019, Source: Ericsson, Title: L1-SINR estimation using ZP and NZP IMR.
R1-1907475 3GPP TSG RAN WG1 Meeting #97, Reno, USA, May 13-17, 2019, Source: Ericsson, Title: Signalling reduction for beam-based UL power control.
R1-1907476 3GPP TSG RAN WG1 Meeting #97, Reno, USA, May 13-17, 2019, Source: Ericsson, Title: Performance of P-MPR-aware multi-panel scheduling.
R1-1907530 3GPP TSG RAN WG1 Meeting #97, Reno, USA, May 13-17, 2019, Source: Huawei, HiSilicon, Title: UL/DL BM for latency reduction.
R1-1907531 3GPP TSG RAN WG1 Meeting #97, Reno, USA, May 13-17, 2019, Source: Huawei, HiSilicon, Title: Discussion on panel activation/deactivation status.
R1-1907532 3GPP TSG RAN WG1 Meeting #97, Reno, USA, May 13-17, 2019, Source: Huawei, HiSilicon, Title: Measurement configuration and UE behavior for L1-SINR reporting.
R1-1907533 3GPP TSG RAN WG1 Meeting #97, Reno, USA, May 13-17, 2019, Source: Huawei, HiSilicon, Title: Beam failure recovery for SCell with new beam information.
R1-1907534 3GPP TSG RAN WG1 Meeting #97, Reno, USA, May 13-17, 2019, Source: Huawei, HiSilicon, Title: Evaluation methodology for multi-beam enhancements.
R1-1907535 3GPP TSG RAN WG1 Meeting #97, Reno, USA, May 13-17, 2019, Source: Huawei, HiSilicon, Title: Evaluation results of panel-specific beam selection.
R1-1907552 3GPP TSG RAN WG1 Meeting #97, Reno, USA, May 13-17, 2019, Source: Huawei, HiSilicon, Title: UL/DL BM for overhead reduction.
R1-1907553 3GPP TSG RAN WG1 Meeting #97, Reno, USA, May 13-17, 2019, Source: Huawei, HiSilicon, Title: Discussion on panel ID and usage.
R1-1907554 3GPP TSG RAN WG1 Meeting #97, Reno, USA, May 13-17, 2019, Source: Huawei, HiSilicon, Title: Discussion on reporting content and format for L1-SINR reporting.
R1-1907555 3GPP TSG RAN WG1 Meeting #97, Reno, USA, May 13-17, 2019, Source: Huawei, HiSilicon, Title: Beam failure recovery for SCell without new beam information.
R1-1907650 3GPP TSG RAN WG1 Meeting #97, Reno, USA, May 13-17, 2019, Source: LG Electronics, Title: Feature lead summary of Enhancements on Multi-beam Operations.
Nokia et al.: "Remaining details on NR 1-15 PUSCH power control", 3GPP Draft; RI-1805156, 3rd Generation Partnership Project (3GPP), Mobile Competence Centre; 650, Route Des Lucioles ; F-06921 Sophia-Antipolis Cedex; France vol. RAN WGI, no. Sanya, China; Apr. 16-2018-Apr. 20, 2018 Apr. 15, 2018 (Apr. 15, 2018).
Dec. 1, 20208—European Search Report—EP 20187143.1.

* cited by examiner

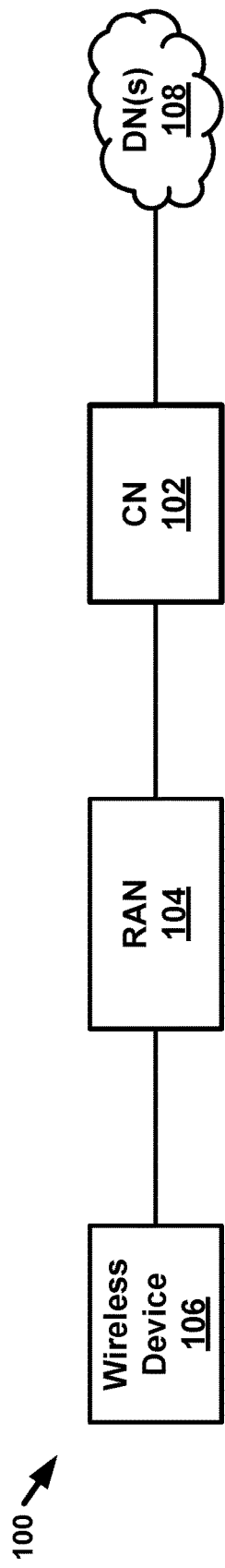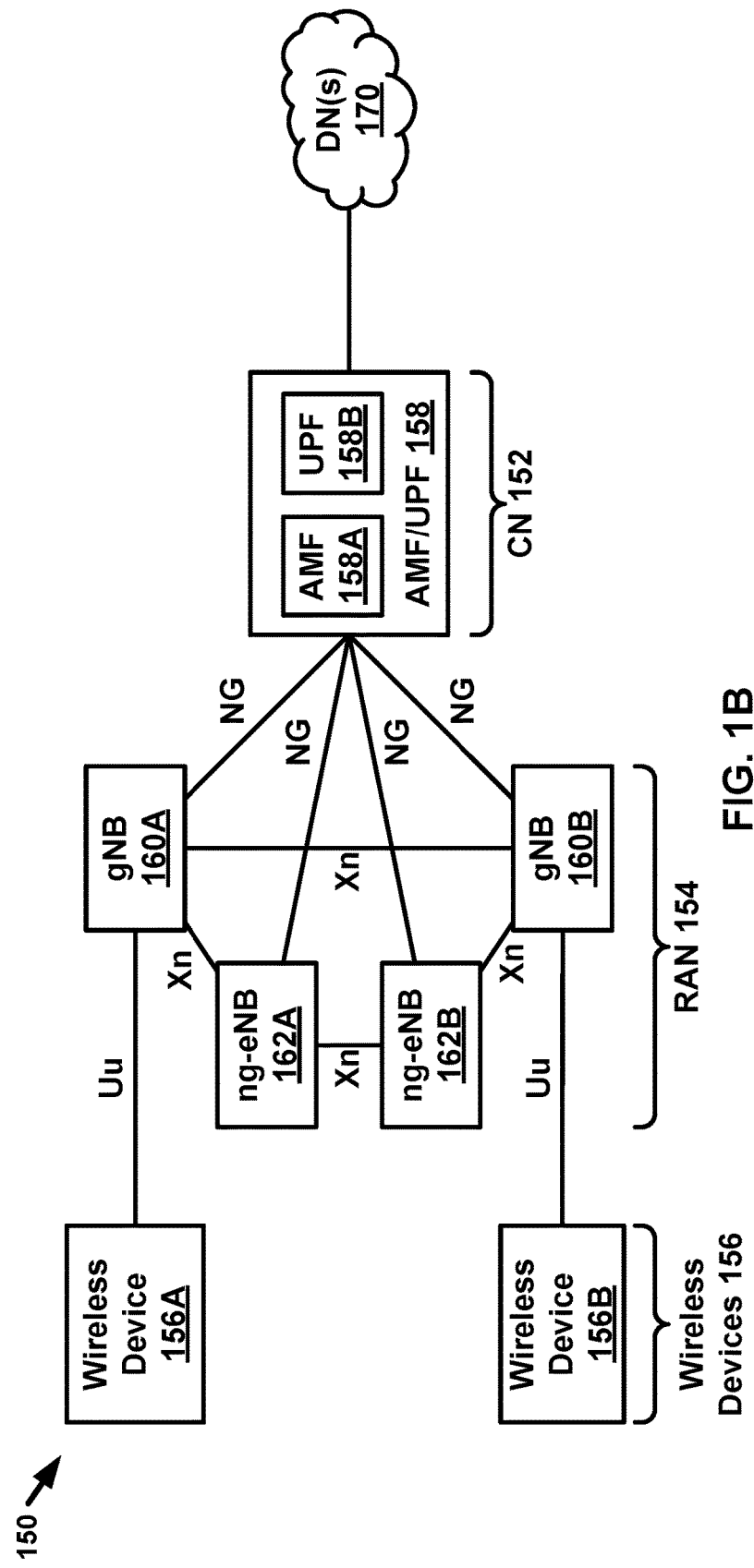

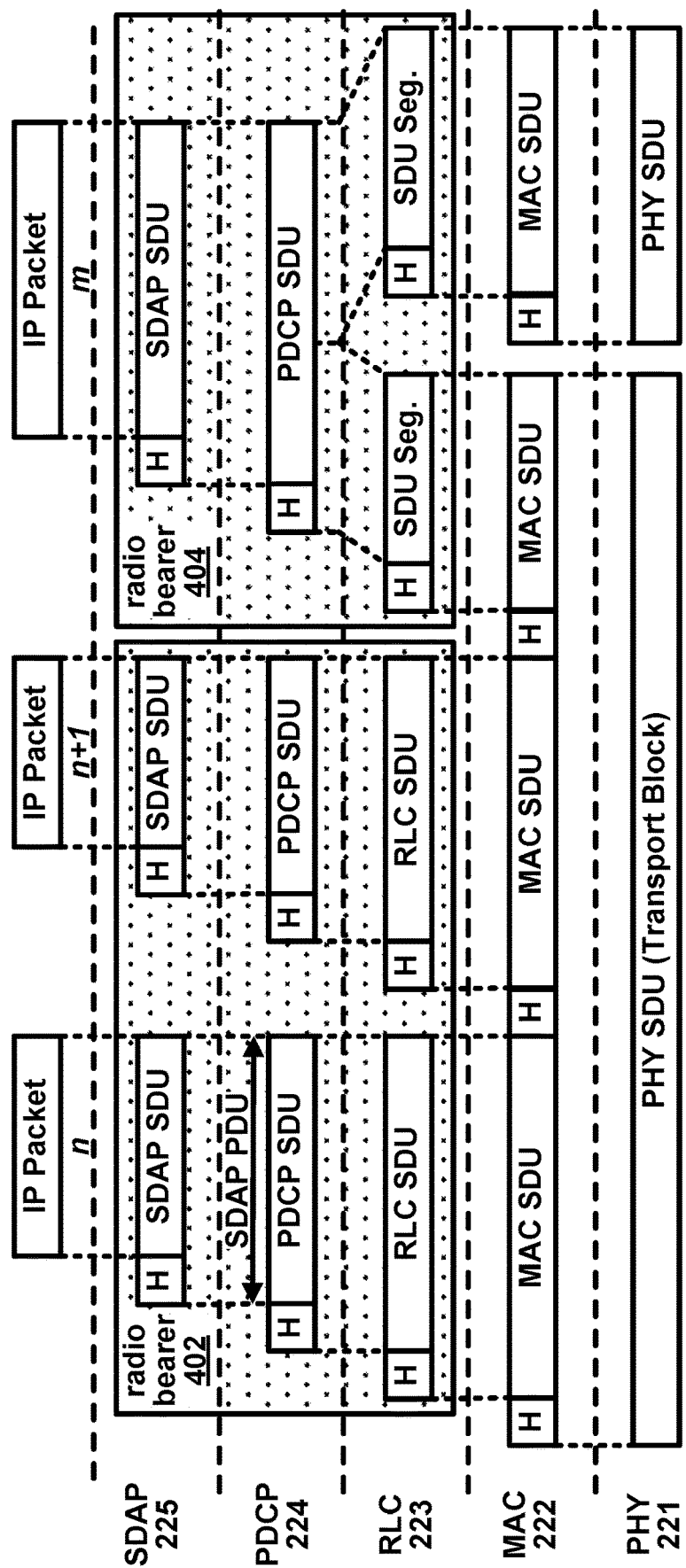
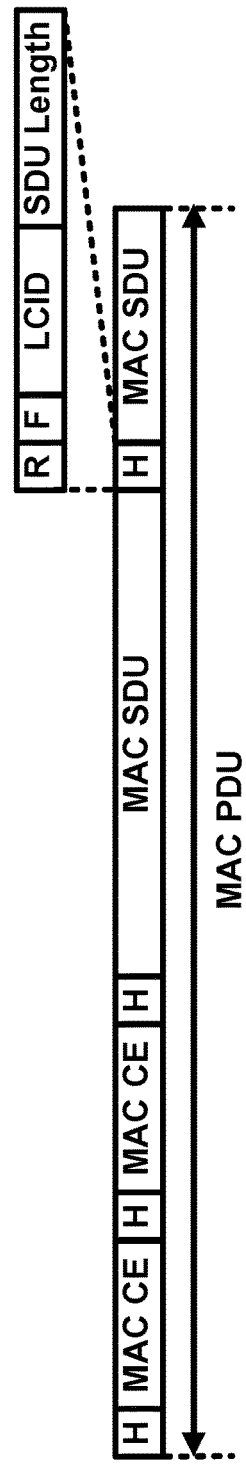
FIG. 4A
FIG. 4B

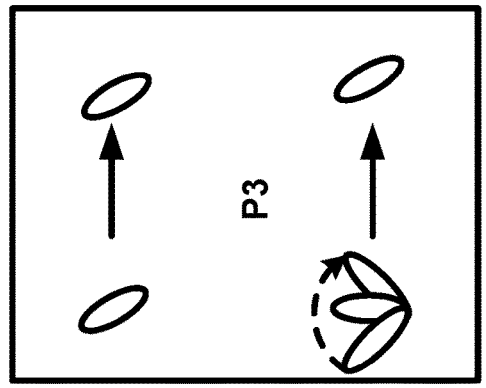
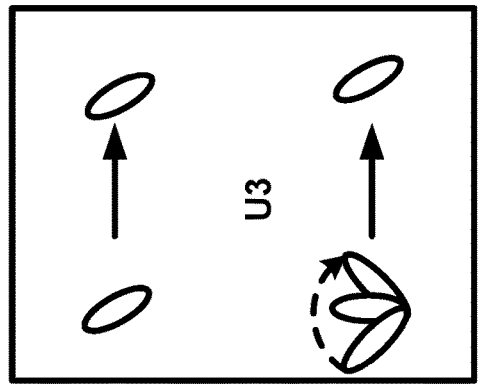
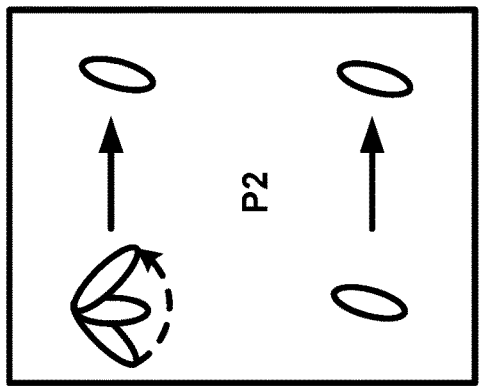
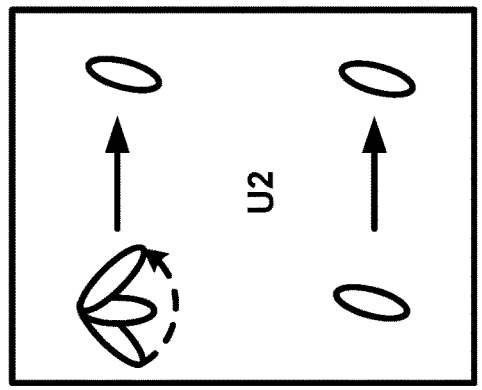
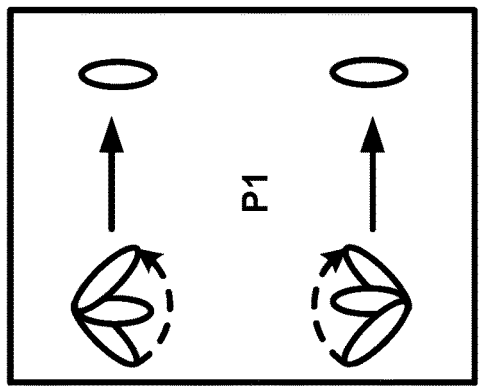
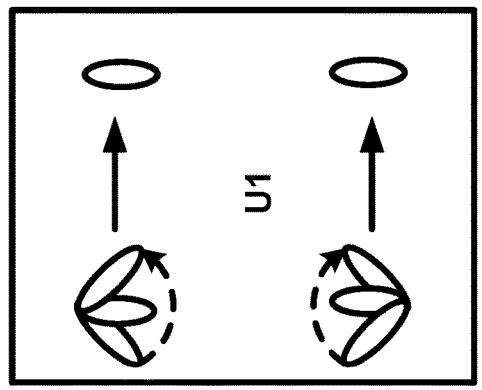
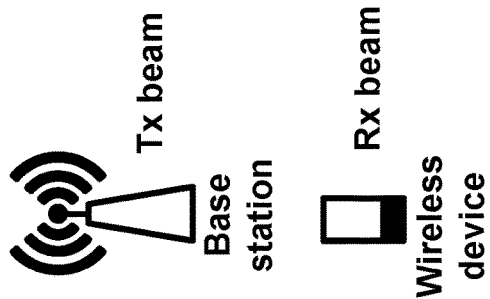
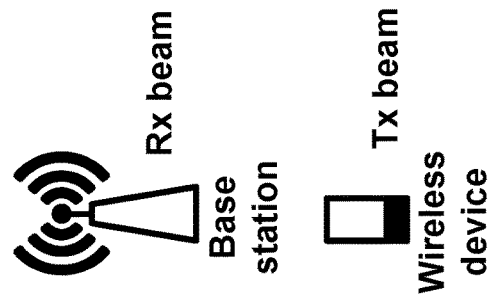
FIG. 12A
FIG. 12B

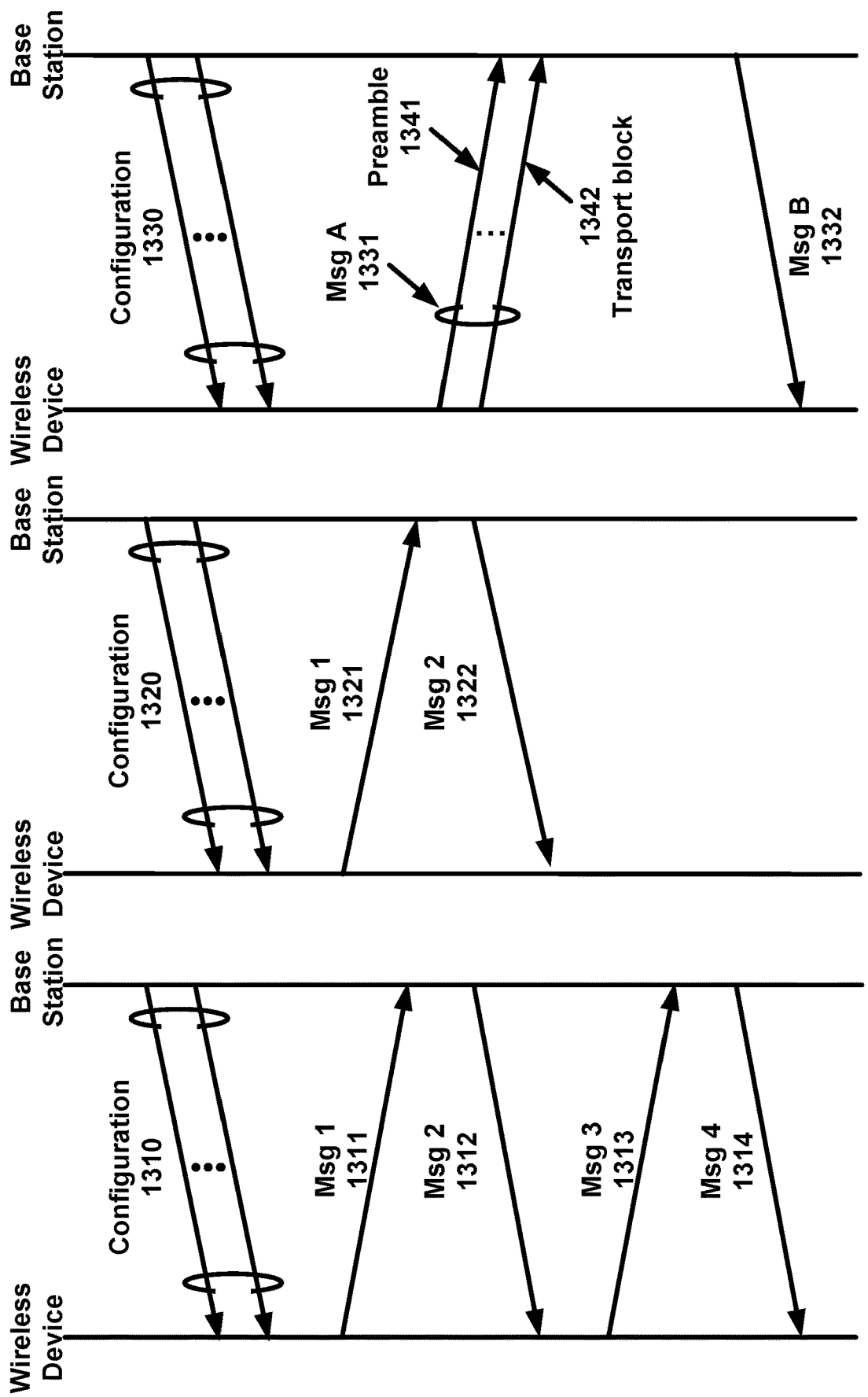

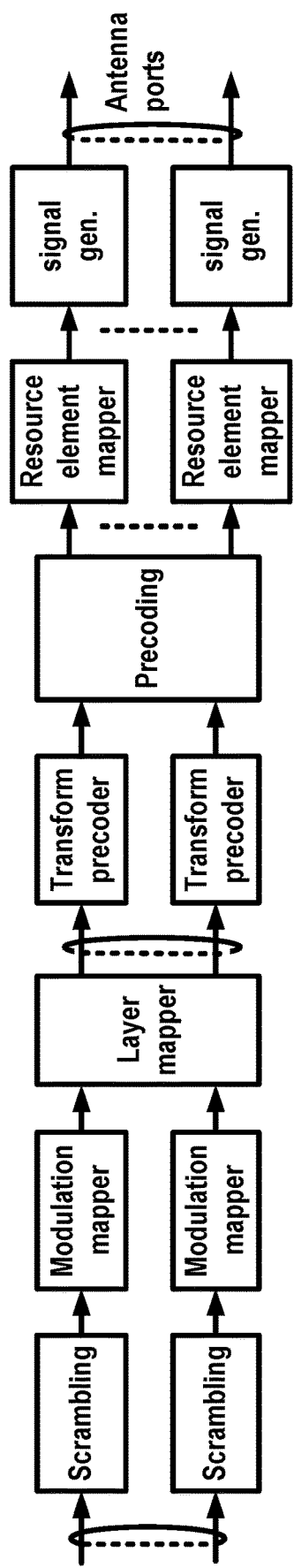
FIG. 16A
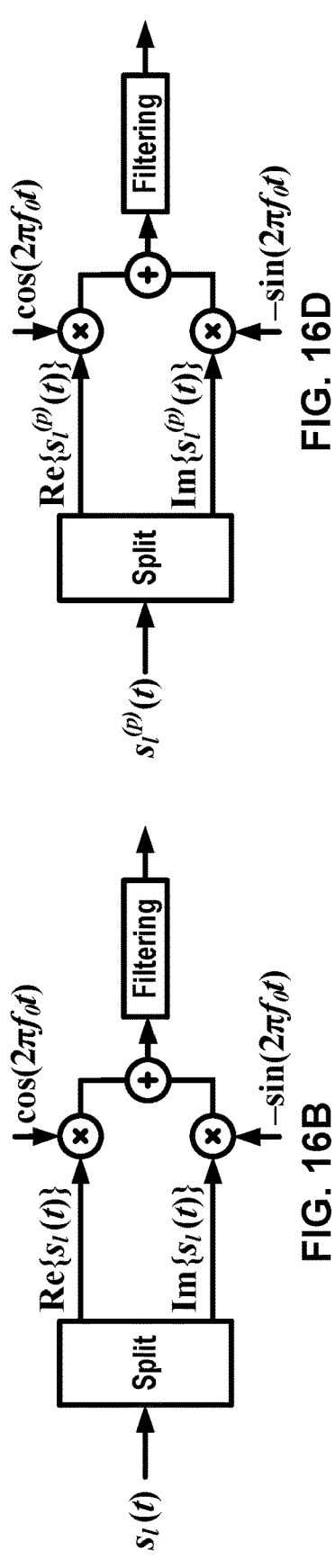
FIG. 16B
FIG. 16D
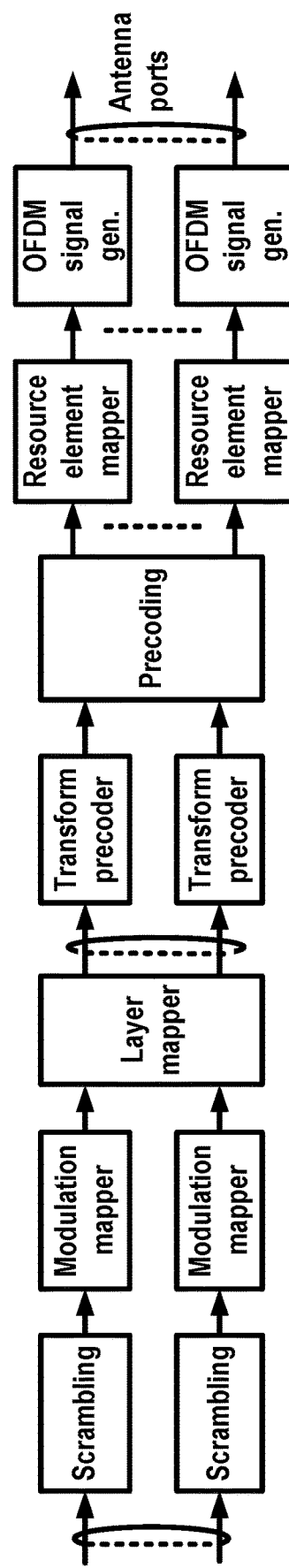
FIG. 16C

```
PUSCH-PowerControl ::=          SEQUENCE {
p0-AlphaSets                    SEQUENCE (SIZE (1..maxNrofP0-PUSCH-
AlphaSets)) OF P0-PUSCH-AlphaSet
pathlossReferenceRSToAddModList    SEQUENCE (SIZE
(1..maxNrofPUSCH-PathlossReferenceRSs)) OF PUSCH-
PathlossReferenceRS
pathlossReferenceRSToReleaseList   SEQUENCE (SIZE
(1..maxNrofPUSCH-PathlossReferenceRSs)) OF PUSCH-
PathlossReferenceRS-Id
sri-PUSCH-MappingToAddModList      SEQUENCE (SIZE
(1..maxNrofSRI-PUSCH-Mappings)) OF SRI-PUSCH-PowerControl
sri-PUSCH-MappingToReleaseList     SEQUENCE (SIZE
(1..maxNrofSRI-PUSCH-Mappings)) OF SRI-PUSCH-PowerControlId   }

P0-PUSCH-AlphaSet ::=           SEQUENCE {
   p0-PUSCH-AlphaSetId          P0-PUSCH-AlphaSetId,
   p0                           INTEGER (-16..15)
   alpha                        Alpha
}

P0-PUSCH-AlphaSetId ::=         INTEGER (0..maxNrofP0-PUSCH-
AlphaSets-1)

PUSCH-PathlossReferenceRS ::=   SEQUENCE {
   pusch-PathlossReferenceRS-Id     PUSCH-PathlossReferenceRS-Id,
   referenceSignal              CHOICE {
      ssb-Index                 SSB-Index,
      csi-RS-Index              NZP-CSI-RS-ResourceId}}

PUSCH-PathlossReferenceRS-Id ::=    INTEGER (0..maxNrofPUSCH-
PathlossReferenceRSs-1)

SRI-PUSCH-PowerControl ::=      SEQUENCE {
   sri-PUSCH-PowerControlId     SRI-PUSCH-PowerControlId,
   sri-PUSCH-PathlossReferenceRS-Id PUSCH-PathlossReferenceRS-Id,
   sri-P0-PUSCH-AlphaSetId      P0-PUSCH-AlphaSetId,
   sri-PUSCH-ClosedLoopIndex       ENUMERATED { i0, i1 }}

SRI-PUSCH-PowerControlId ::=    INTEGER (0..maxNrofSRI-PUSCH-
Mappings-1)
```

FIG. 17

POWER CONTROL FOR WIRELESS COMMUNICATIONS

CROSS-REFERENCE TO RELATED APPLICATIONS

This application claims priority to and is a continuation of U.S. patent application Ser. No. 16/935,705, filed on Jul. 22, 2020, which claims the benefit of U.S. Provisional Application No. 62/877,020, filed on Jul. 22, 2019. Each of the above-referenced applications is hereby incorporated by reference in its entirety.

BACKGROUND

A base station and/or a wireless device in a communication network determine and/or adjust transmission powers for signal transmissions. The wireless device uses reference signals, transmitted by the base station, to determine transmission power for an uplink transmission from the wireless device

SUMMARY

The following summary presents a simplified summary of certain features. The summary is not an extensive overview and is not intended to identify key or critical elements.

Wireless communications may be used to support transmission power control. At least one reference signal may be used by a wireless device to determine power for signal transmission. A reference signal may be activated (e.g., by a base station), from a plurality of reference signals, for transmission power determination by the wireless device. A reference signal may be indicated in a message comprising updated beam information. In the absence of an indication of a reference signal, the wireless device may use a parameter, such as an index of a power control parameter set, and/or a rule (e.g., lowest index), to determine an associated reference signal.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 4A shows an example downlink data flow for a user plane configuration.

FIG. 4B shows an example format of a Medium Access Control (MAC) subheader in a MAC Protocol Data Unit (PDU).

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 17 shows an example of a power control configuration for an uplink transmission.

DETAILED DESCRIPTION

Figure 2A:
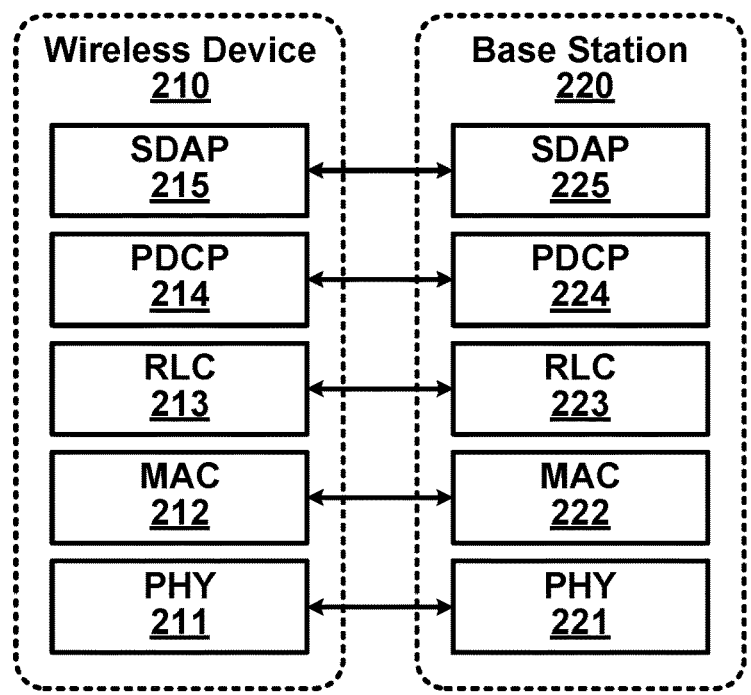
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to determination of signal transmission power and/or updating power control parameters to be used for the determination.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
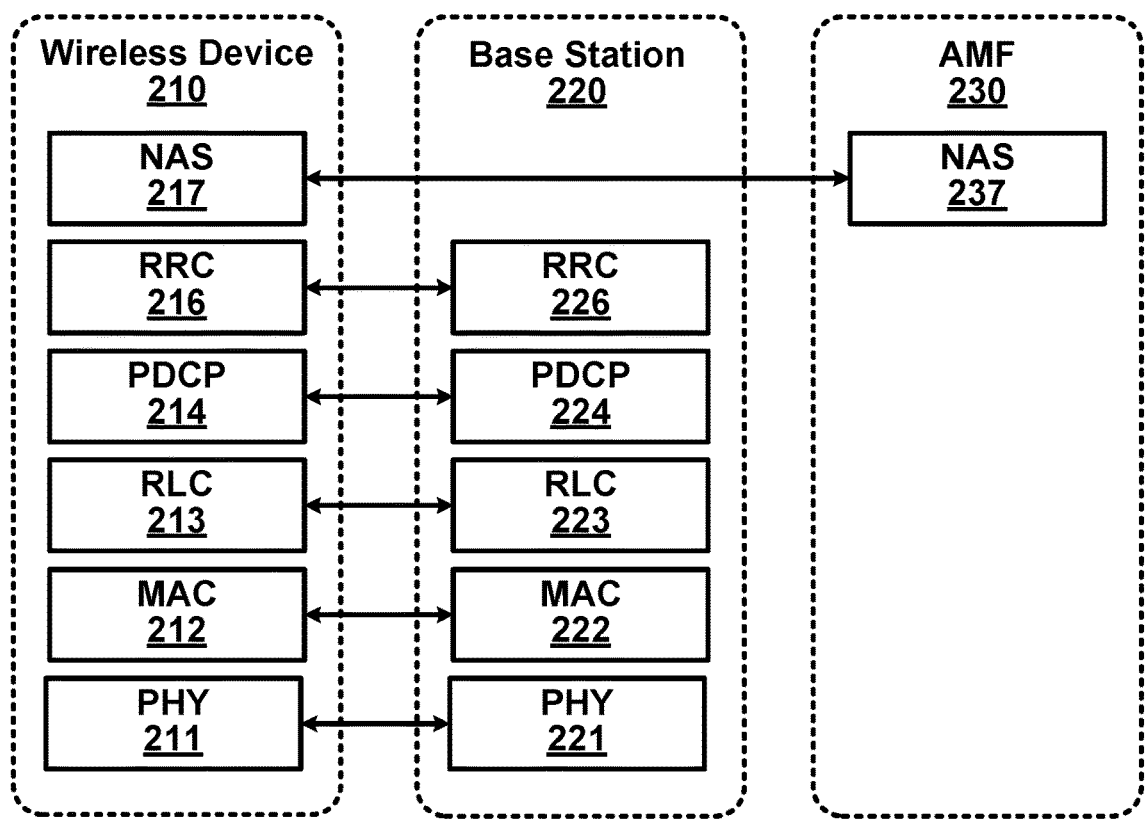
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
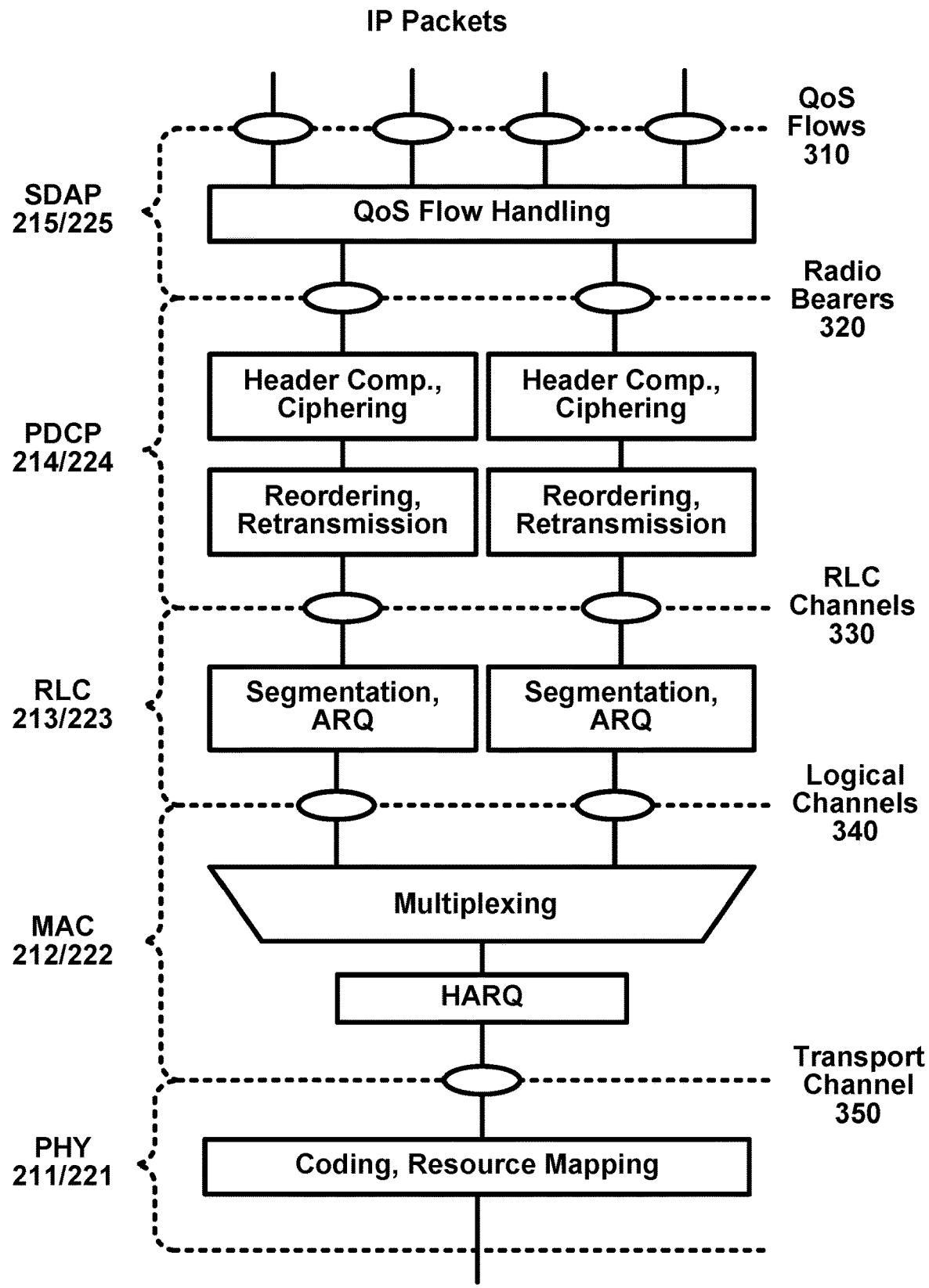
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5B:
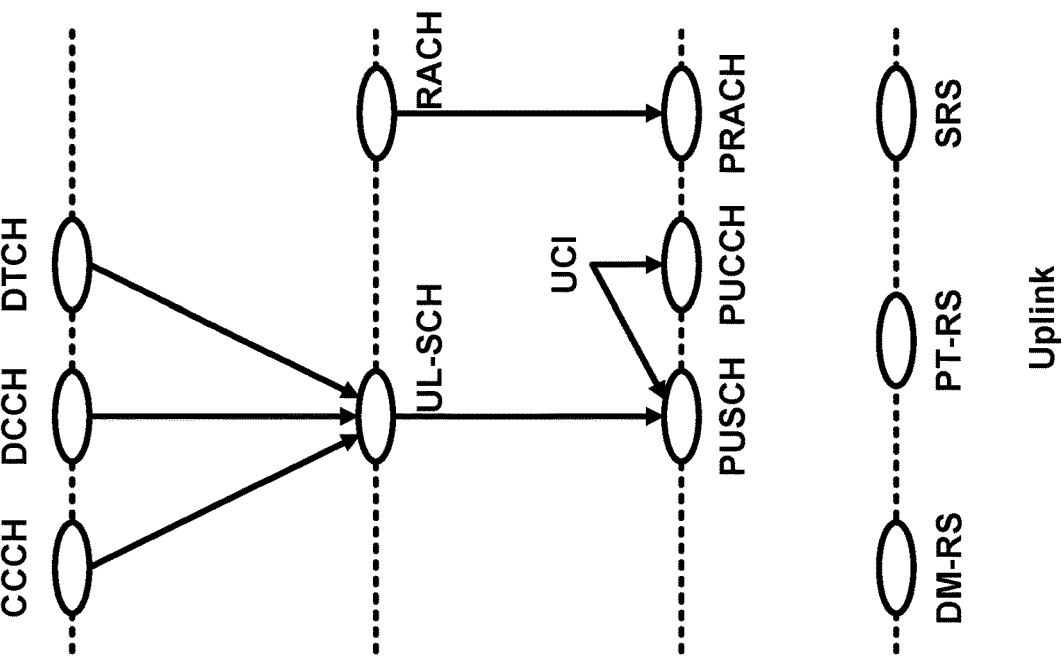
FIG. 5B shows an example mapping for uplink channels.
Figure 5A:
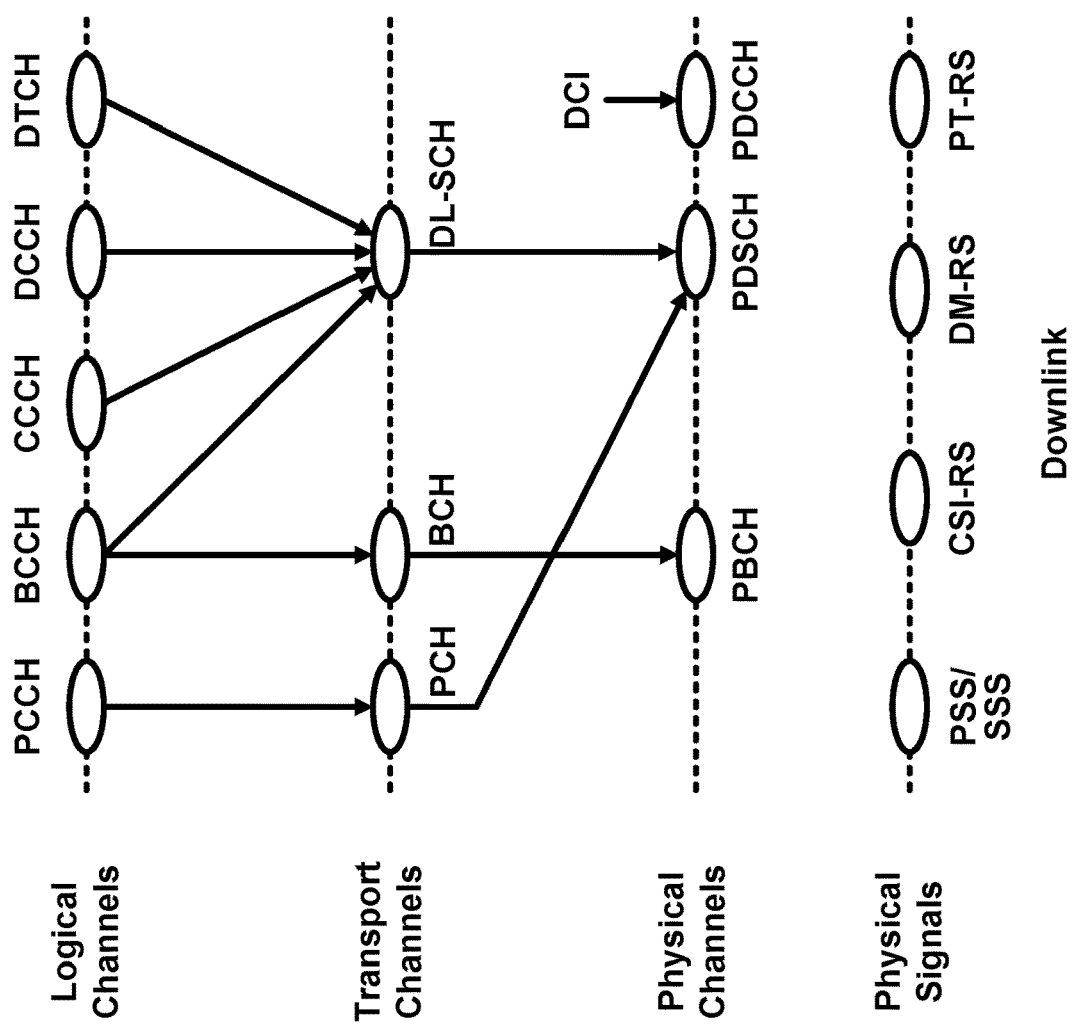
FIG. 5A shows an example mapping for downlink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
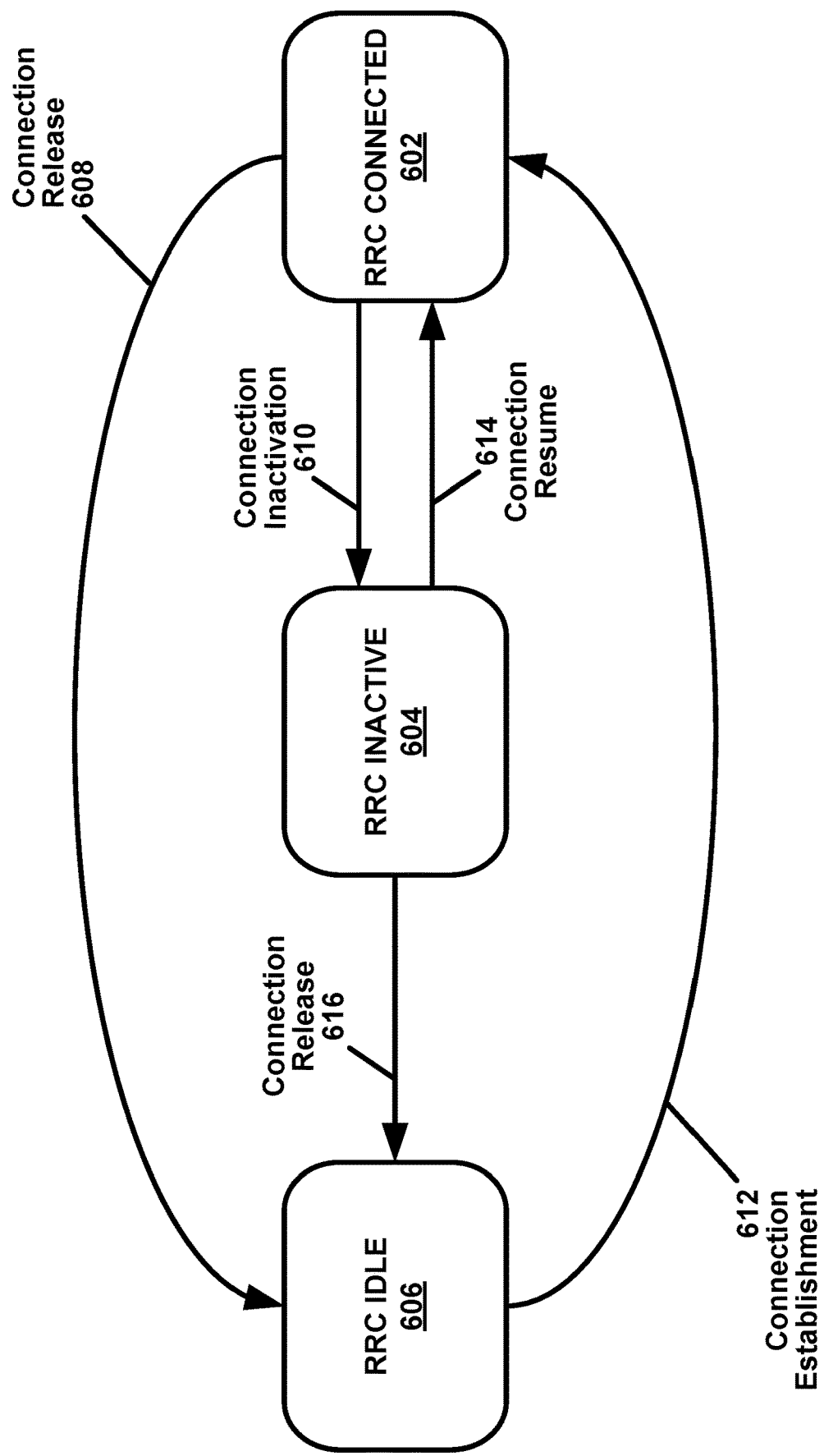
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
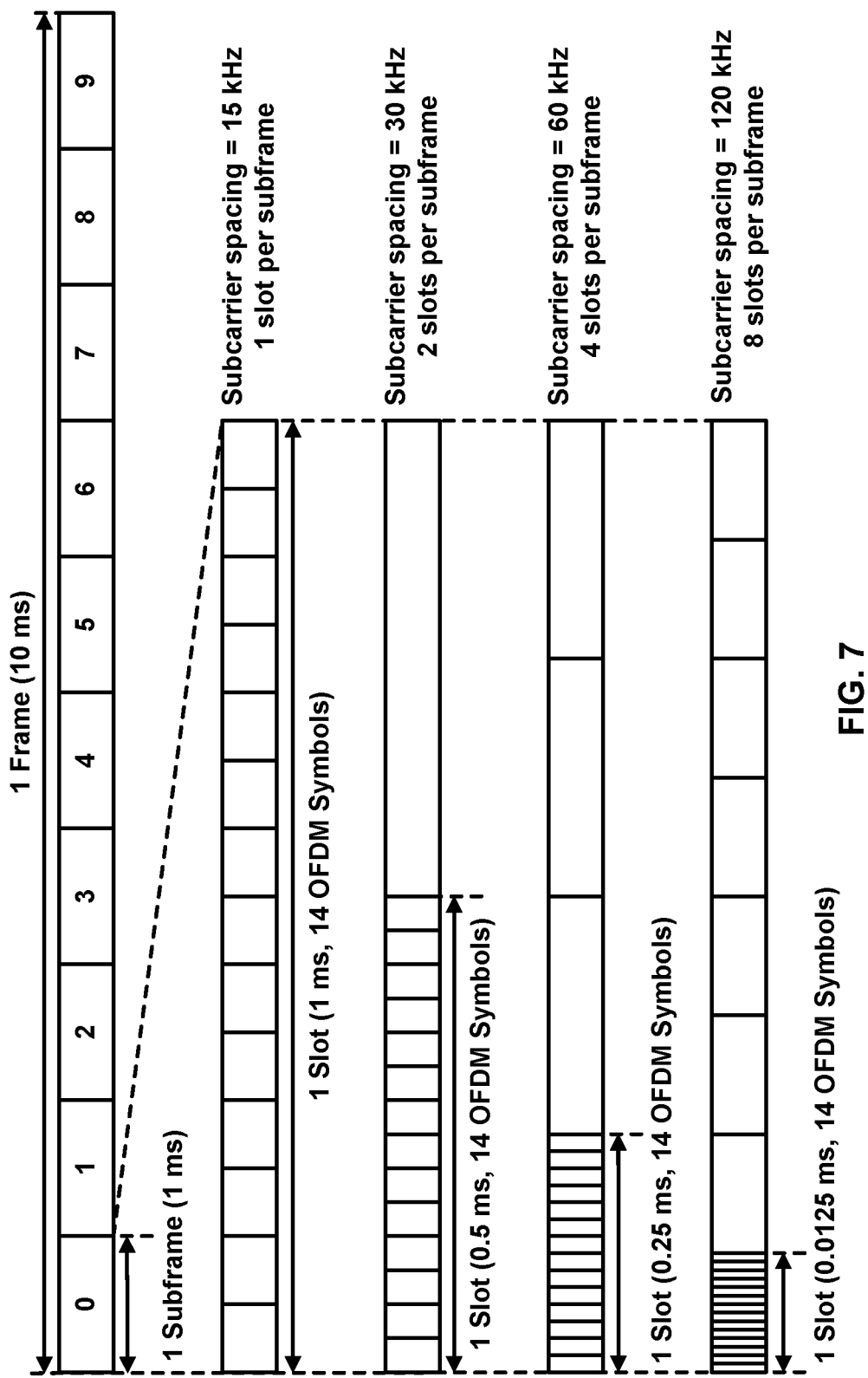
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
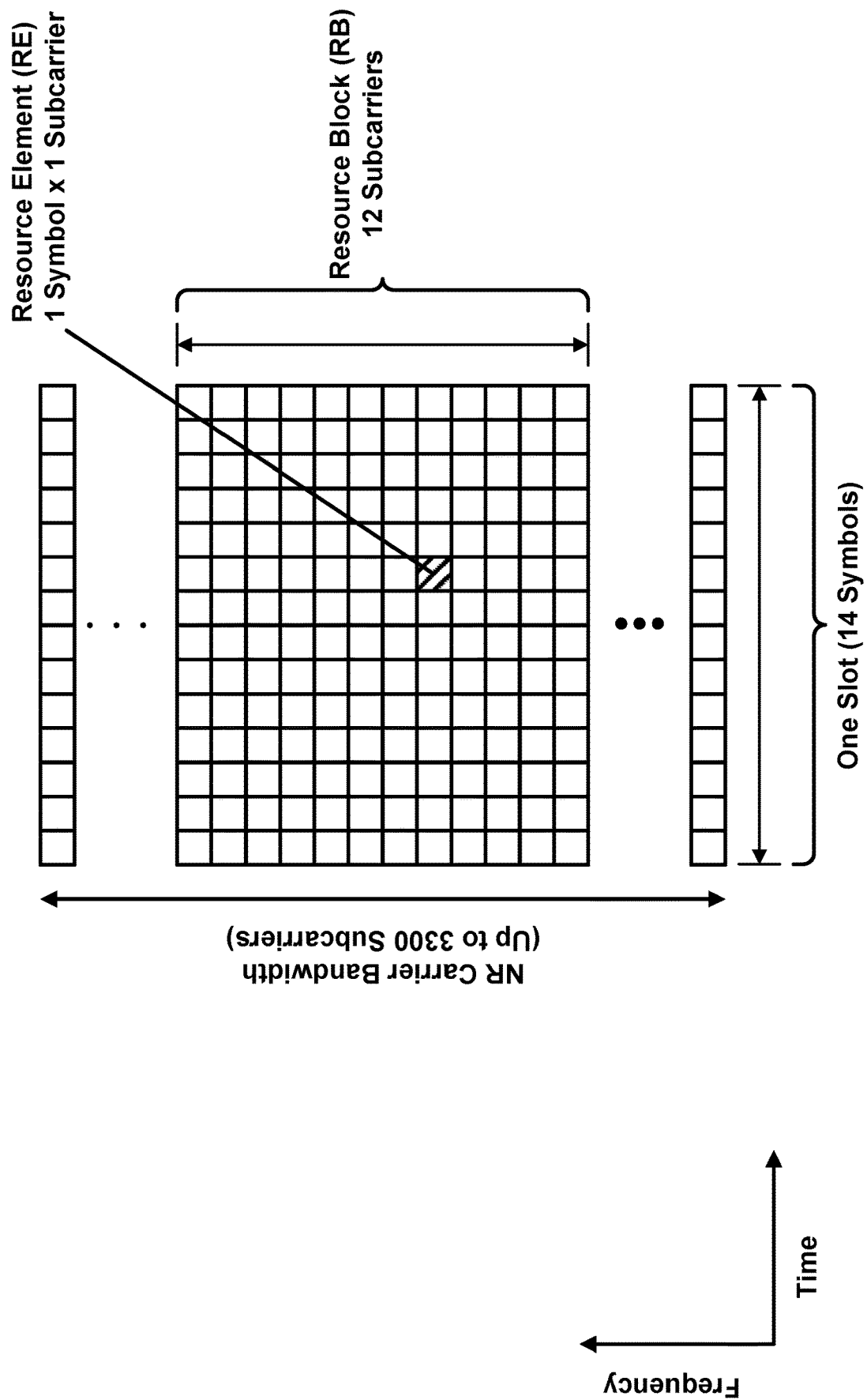
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
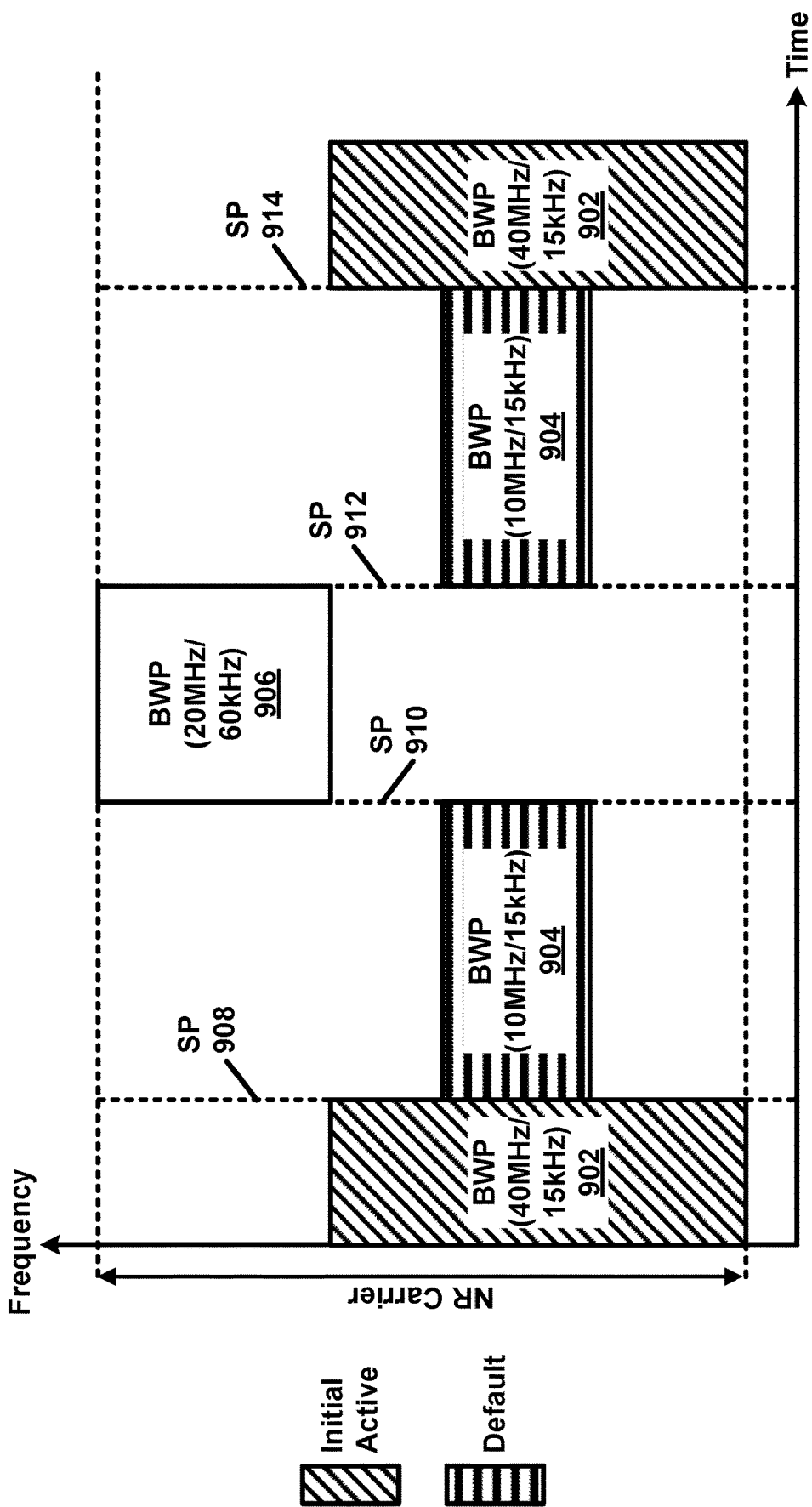
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
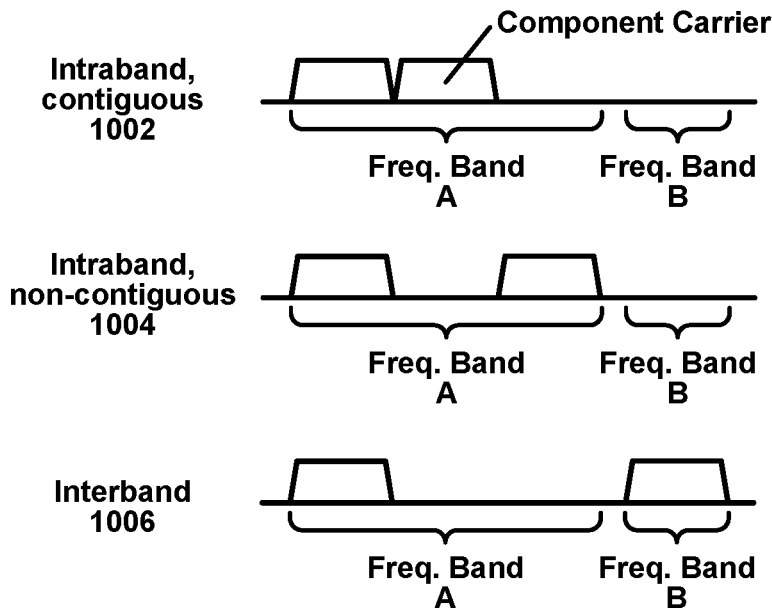
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
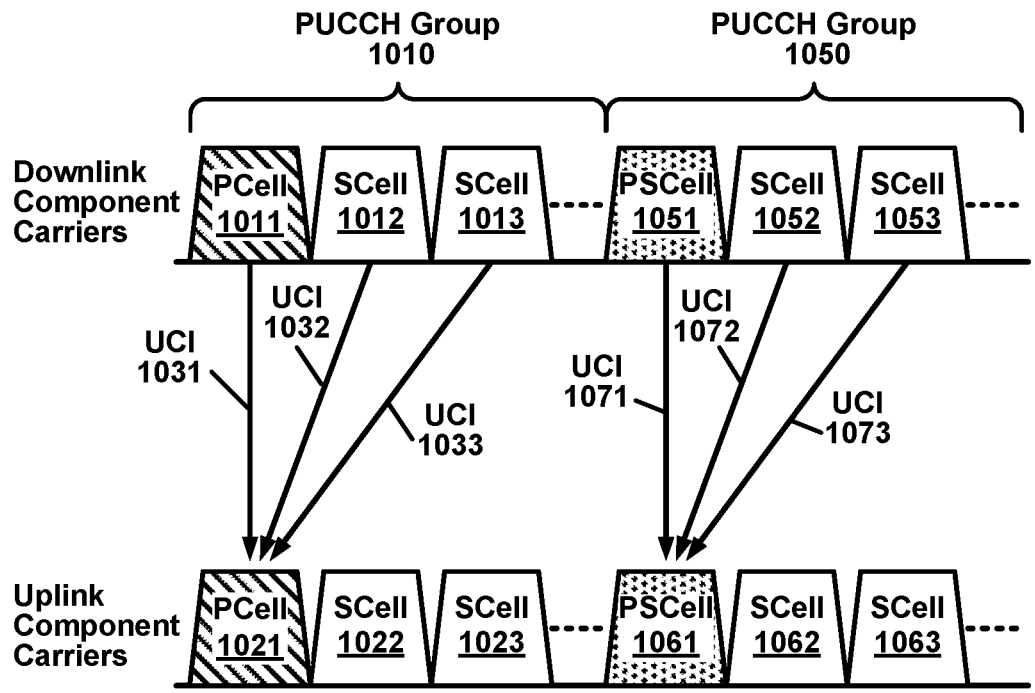
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
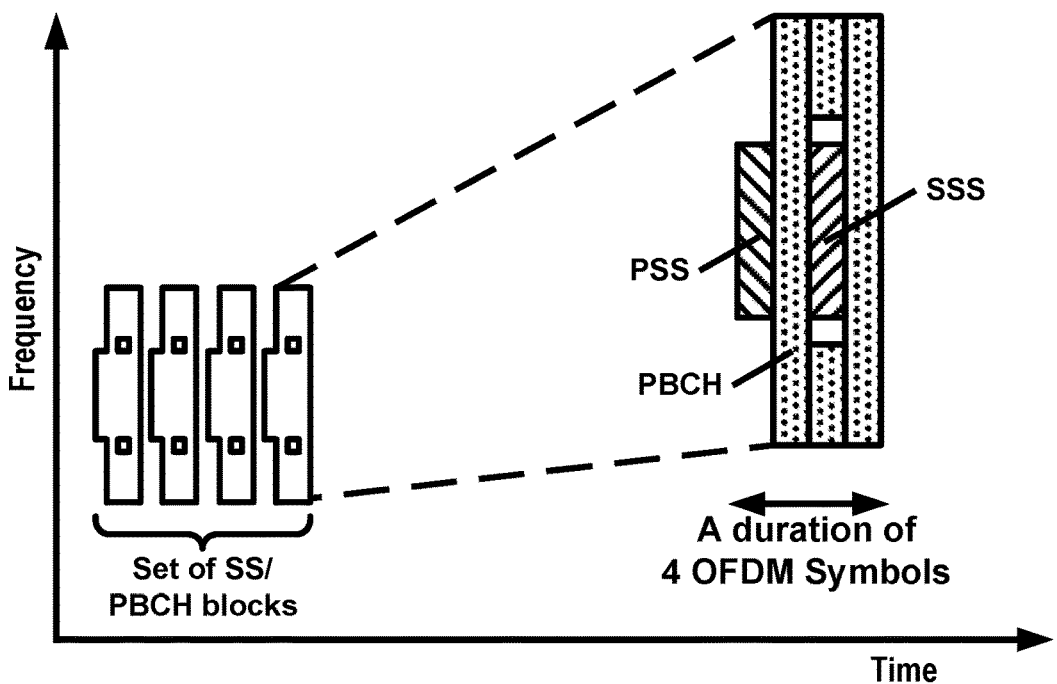
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
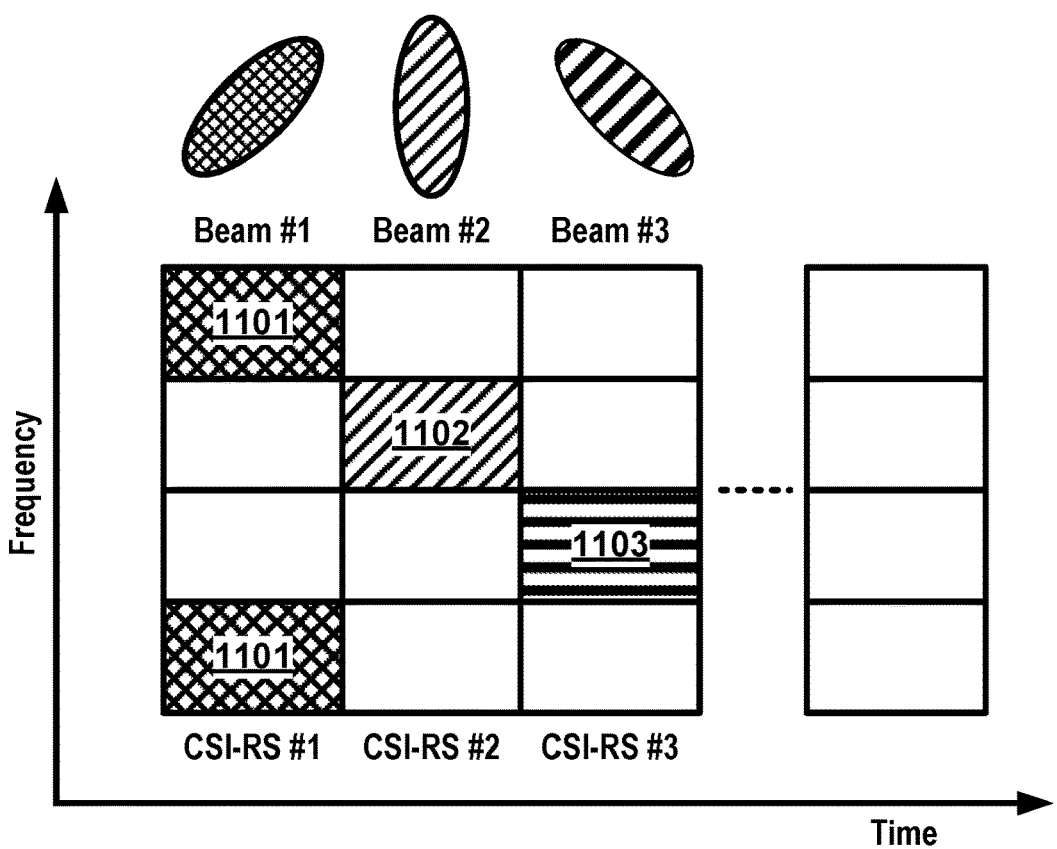
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counterclockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counterclockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type 1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0<s_id<14), t_id may be an index of a first slot of the PRACH occasion in a system frame (e.g., 0<t_id<80), f_id may be an index of the PRACH occasion in the frequency domain (e.g., 0<f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
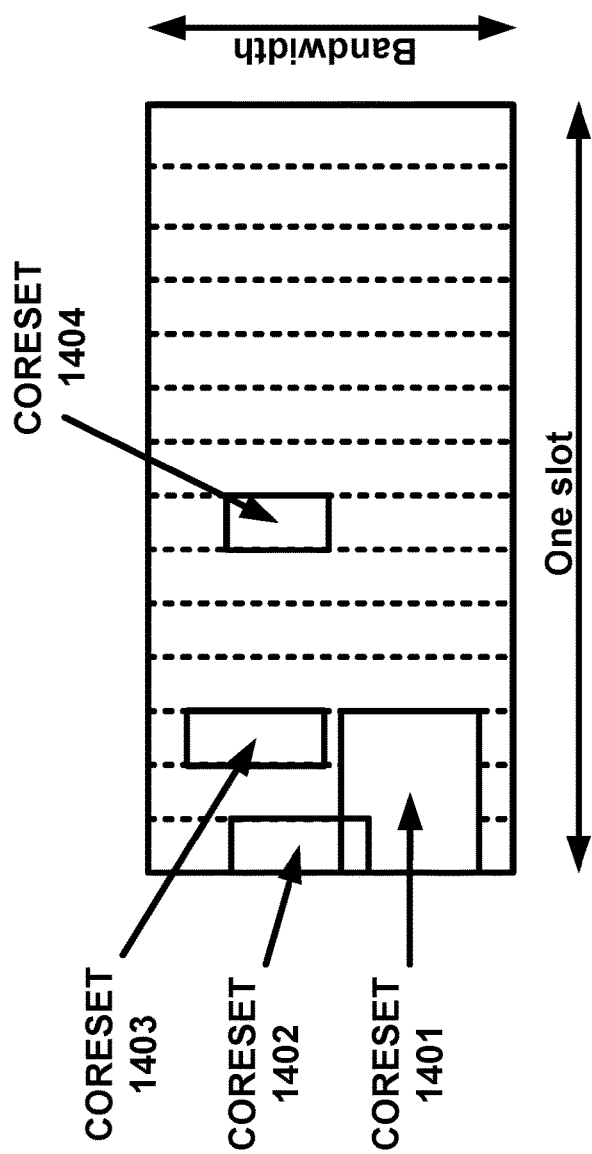
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
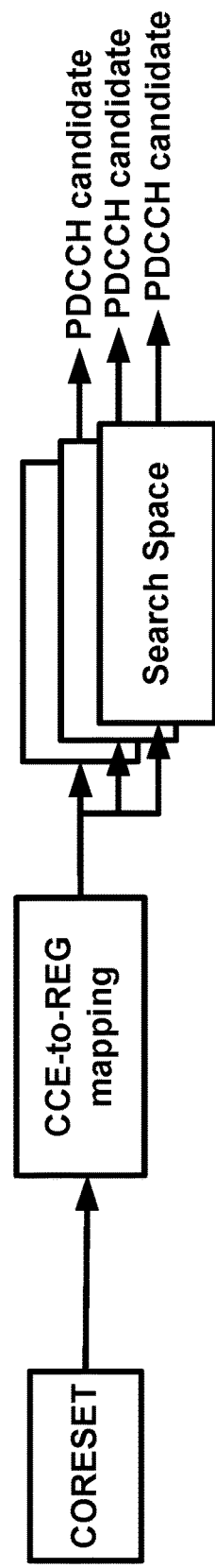
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
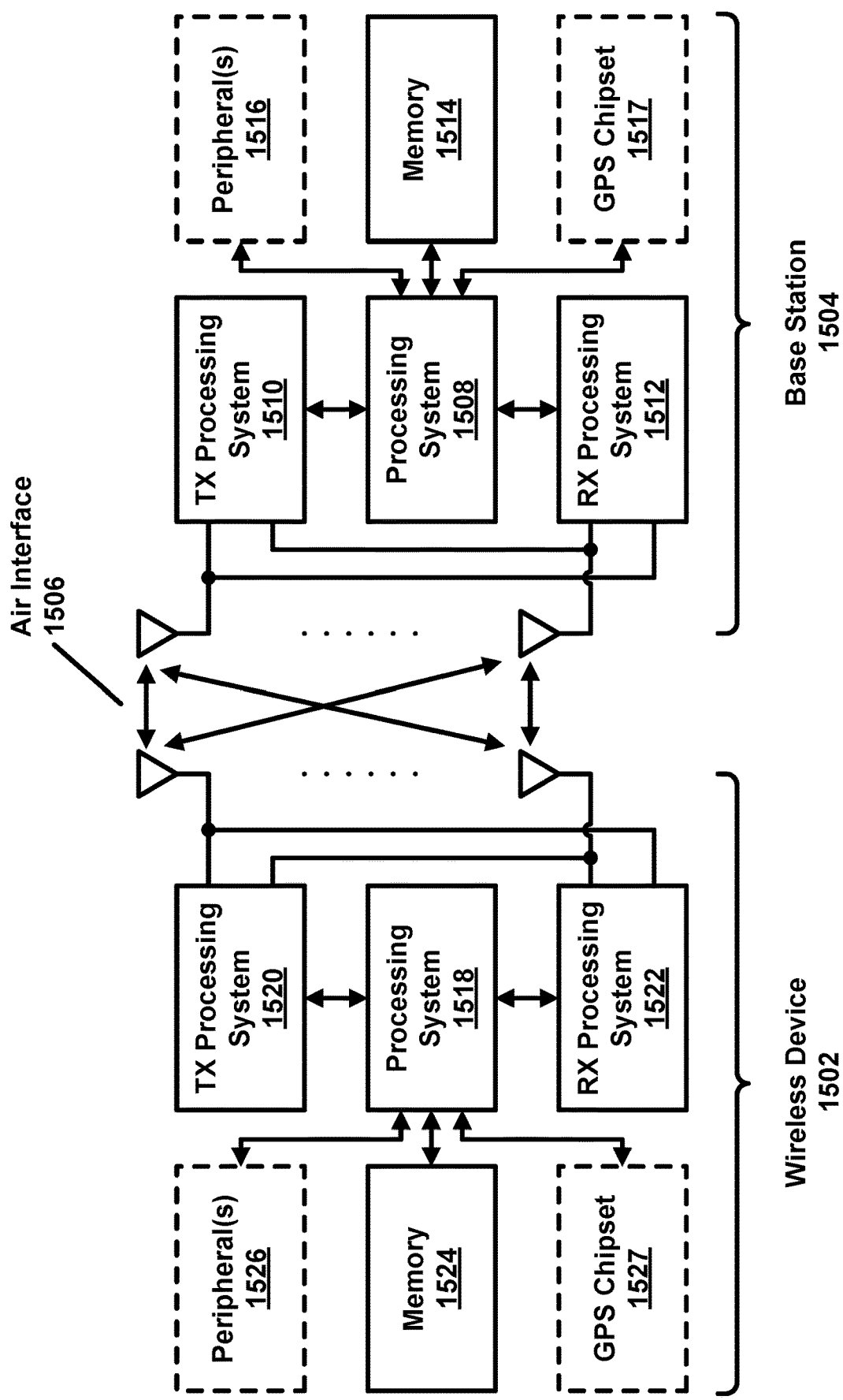
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
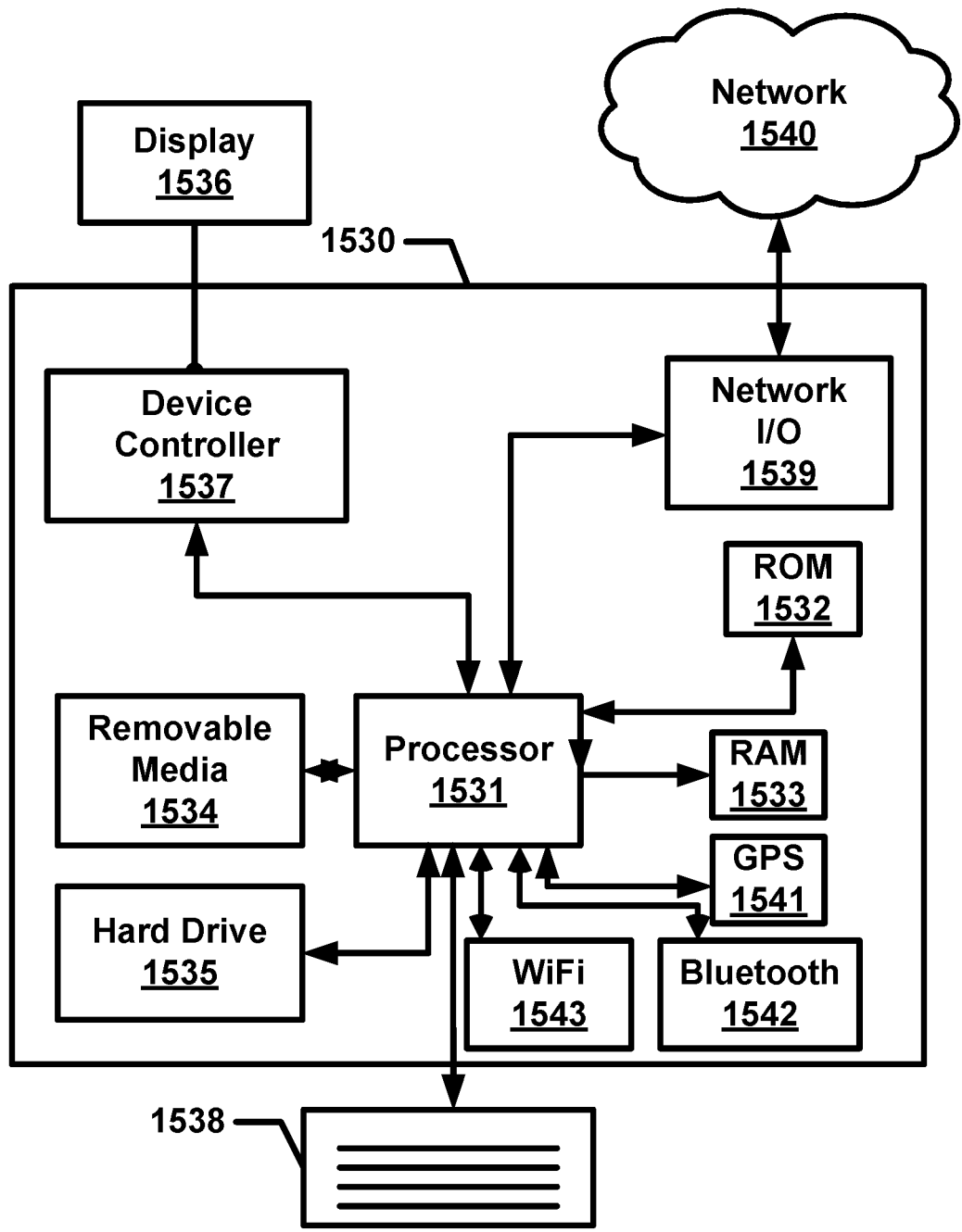
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may configure a wireless device with one or more sounding reference signal (SRS) resource sets. The base station may configure the wireless device with one or more SRS resource sets, for example, using a higher layer parameter (e.g., SRS-ResourceSet). The base station may configure the wireless device with one or more SRS resources for an SRS resource set of the one or more SRS resource sets, for example, using a higher layer parameter (e.g., SRS-Resource). The wireless device may indicate, to the base station, a maximum quantity of the one or more SRS resources (e.g., using a parameter, such as SRS_capability). The base station may configure an applicability of the SRS resource set using a higher layer parameter (e.g., usage) in a higher layer parameter (e.g., SRS-ResourceSet).

The wireless device may send (e.g., transmit), at a given time instant, one SRS resource of the one or more SRS resources in each SRS resource set (e.g., simultaneously or substantially simultaneously), for example, if the higher layer parameter usage is set to BeamManagement. The wireless device may determine that the one SRS resource of the one or more SRS resources in each SRS resource set may have a same time domain behavior in a same BWP (e.g., uplink BWP). The wireless device may transmit the one SRS resource of the one or more SRS resources in each SRS resource set in the same BWP simultaneously (or substantially simultaneously), for example, based on the determining.

The wireless device may send (e.g., transmit), at a given time instant, only one SRS resource in each of the one or more SRS resource sets (e.g., simultaneously or substantially simultaneously), for example, if the higher layer parameter usage is set to an indication for beam management (e.g., BeamManagement). The wireless device may determine that the only one SRS resource in each of the one or more SRS resource sets may have the same time domain behavior in a same BWP (e.g., uplink BWP). The wireless device may send (e.g., transmit) the only one SRS resource in each of the one or more SRS resource sets in the same BWP simultaneously (or substantially simultaneously), for example, based on the determining.

The wireless device may send (e.g., transmit), at a given time instant, one SRS resource in each of one or more SRS resource sets simultaneously (or substantially simultaneously), for example, if the higher layer parameter usage is set to BeamManagement. The wireless device may determine that the one SRS resource in each of the one or more SRS resource sets may have the same time domain behavior in a same BWP (e.g., uplink BWP). The wireless device may send (e.g., transmit) the one SRS resource in each of the one or more SRS resource sets in the same BWP simultaneously (or substantially simultaneously), for example, based on the determining.

The one or more SRS resource sets may comprise a first SRS resource set and a second SRS resource set. The first SRS resource set may comprise one or more first SRS resources. The one or more first SRS resources may comprise a first SRS resource and a second SRS resource. The second SRS resource set may comprise one or more second SRS resources. The one or more second SRS resources may comprise a third SRS resource and a fourth SRS resource. The one or more first SRS resource set and/or the one or more second SRS resource set many comprise any quantity of SRS resources. The one or more first SRS resources and/or the one or more second SRS resources may comprise any quantity of SRS resources.

A first time domain behavior of the first SRS resource and a third time domain behavior of the third SRS resource may be the same/substantially the same (or may be different) in a BWP. The wireless device may send (e.g., transmit) the first SRS resource of the first SRS resource set and the third SRS resource of the second SRS resource set simultaneously (or substantially simultaneously) in a BWP, for example, based on the higher layer parameter usage being set to BeamManagement and/or based on the first time domain behavior of the first SRS resource and the third time domain behavior of the third SRS resource being the same (or substantially the same).

A first time domain behavior of the first SRS resource and a fourth time domain behavior of the fourth SRS resource may be different (or may be the same or substantially the same) in a BWP. The wireless device may not send (e.g., transmit) (e.g., may refrain from the transmitting) the first SRS resource of the first SRS resource set and the fourth SRS resource of the second SRS resource set simultaneously (or substantially simultaneously) in a BWP, for example, based on the higher layer parameter usage being set to BeamManagement and/or based on the first time domain behavior of the first SRS resource and the fourth time domain behavior of the fourth SRS resource being different.

A second time domain behavior of the second SRS resource and a fourth time domain behavior of the fourth SRS resource may be the same/substantially the same (or may be different) in a BWP. The wireless device may send (e.g., transmit) the second SRS resource of the first SRS resource set and the fourth SRS resource of the second SRS resource set simultaneously in a BWP, for example, based on the higher layer parameter usage being set to BeamManagement and/or based on the second time domain behavior of the second SRS resource and the fourth time domain behavior of the fourth SRS resource being the same (or substantially the same).

A second time domain behavior of the second SRS resource and a third time domain behavior of the third SRS resource may be different (or may be same or substantially the same) in a BWP. The wireless device may not send/ transmit (e.g., may refrain from transmitting) the second SRS resource of the first SRS resource set and the third SRS resource of the second SRS resource set simultaneously (or substantially simultaneously) in a BWP, for example, based on the higher layer parameter usage being set to BeamManagement and/or based on the second time domain behavior of the second SRS resource and the third time domain behavior of the third SRS resource being different.

A higher layer parameter (e.g., SRS-Resource) may configure, semi-statically, various parameters. For example, the higher layer parameter (e.g., SRS-Resource) may configure at least one of: an SRS resource indicator/index (SRI) (e.g., provided by a higher layer parameter srs-ResourceId) indicating a configuration of an SRS resource, a time domain behavior of the configuration of the SRS resource (e.g., indicated by a higher layer parameter resourceType), an SRS sequence indicator/ID (e.g., provided by a higher layer parameter sequenceId); and a configuration of a spatial relation between a reference signal (RS) and a target SRS (e.g., as indicated by the SRS resource indicator/index). The base station may configure the wireless device with a higher layer parameter (e.g., spatialRelationInfo). The higher layer parameter spatialRelationInfo may comprise an indicator/ID of the reference RS. The time domain behavior of an SRS resource may correspond to a periodic transmission, a semi-persistent transmission, or an aperiodic SRS transmission. The time domain behavior of an SRS resource may comprise one or more of a transmission periodicity, a transmission offset of the SRS resource, etc.

The wireless device may determine that a higher layer parameter (e.g., servingCellId) indicating a serving cell may be present in the higher layer parameter spatialRelationInfo. The wireless device may determine that the reference RS may be a first RS (e.g., SS/PBCH block, CSI-RS) configured on the serving cell, for example, based on the determining that the higher layer parameter indicating a serving cell may be present in the higher layer parameter spatialRelationInfo.

The wireless device may determine that a higher layer parameter (e.g., uplinkBWP) indicating an uplink BWP and a higher layer parameter (e.g., servingCellId) indicating a serving cell may be present in the higher layer parameter spatialRelationInfo. The wireless device may determine that the reference RS may be a first RS (e.g., SRS) configured on the uplink BWP of the serving cell, for example, based on determining that a higher layer parameter (e.g., uplinkBWP) indicating an uplink BWP, and/or a first higher layer parameter (e.g., servingCellId) indicating a serving cell may be present in a second higher layer parameter (e.g., spatialRelationInfo).

The base station may configure the target SRS on a serving cell. The wireless device may determine that a higher layer parameter (e.g., servingCellId) may be absent in the higher layer parameter spatialRelationInfo. The wireless device may determine that the reference RS may be a first RS (e.g., SS/PBCH block, CSI-RS) configured on the serving cell, for example, based on the determining that a first higher layer parameter (e.g., servingCellId) is not present in a second higher layer parameter (e.g., spatialRelationInfo).

The base station may configure the target SRS on a serving cell. The wireless device may determine that a higher layer parameter (e.g., servingCellId) is absent and a higher layer parameter (e.g., uplinkBWP) indicating an uplink BWP is present in the higher layer parameter spatialRelationInfo. The wireless device may determine that the reference RS may be a first RS (e.g., SRS) configured on the uplink BWP the serving cell, for example, based on the determining that a first higher layer parameter (e.g., servingCellId) is absent and a second higher layer parameter (e.g., uplinkBWP) is present in a third higher layer parameter (e.g., spatialRelationInfo).

A wireless device may send (e.g., transmit) a PUSCH transmission and a SRS in a same slot. The base station may configure the wireless device to transmit the SRS after (or before) the PUSCH transmission (and the corresponding DM-RS), for example, based on the PUSCH transmission and the SRS transmission being in the same slot.

A base station may configure a wireless device with one or more SRS resource configurations. A higher layer parameter (e.g., resourceType) in a higher layer parameter SRS-Resource may indicate a periodic time domain behavior. The base station may configure the wireless device with a higher layer parameter (e.g., spatialRelationInfo). The higher layer parameter (e.g., spatialRelationInfo) may comprise an indicator/ID of a reference RS (e.g., ssb-Index, csi-RS-Index, srs).

The reference RS may comprise a variety of RSs. For example, the reference RS may comprise a SS/PBCH block. The reference RS may comprise a CSI-RS (e.g., periodic CSI-RS, semi-persistent CSI-RS, aperiodic CSI-RS). The wireless device may use a spatial domain receiving filter to receive the reference RS. The wireless device may send (e.g., transmit) a target SRS resource using a spatial domain transmission filter that is the same as (or substantially the same as) the spatial domain receiving filter, for example, based on a higher layer parameter (e.g., spatialRelationInfo) indicating that the reference RS (e.g., by the ID of the reference RS) is the SS/PBCH block or the CSI-RS. The wireless device may send (e.g., transmit) a target SRS resource with the spatial domain receiving filter, for example, based on a higher layer parameter (e.g., spatialRelationInfo) indicating the reference RS (e.g., by the ID of the reference RS).

The reference RS may be an SRS (e.g., periodic SRS, semi-persistent SRS, aperiodic SRS). The wireless device may use a spatial domain transmission filter to send (e.g., transmit) the reference RS. The wireless device may send (e.g., transmit) a target SRS resource with the spatial domain transmission filter, for example, based on a higher layer parameter (e.g., spatialRelationInfo) indicating that the reference RS (e.g., by the ID of the reference RS) is the SRS.

The base station may activate and/or deactivate one or more configured SRS resource sets (e.g., semi-persistent SRS resource sets) of a serving cell. The base station may activate and/or deactivate one or more configured SRS resource sets (e.g., semi-persistent SRS resource sets) of a serving cell, for example, by sending a semi persistent (SP) SRS activation/deactivation MAC CE. The one or more configured SRS resource sets may be initially deactivated upon configuration. The one or more configured SRS resource sets may be deactivated, for example, after a handover.

A base station may configure a wireless device with one or more SRS resource sets (e.g., semi-persistent SRS resource sets). A first higher layer parameter (e.g., resource-Type) in a second higher layer parameter (e.g., SRS-Resource) may indicate a semi-persistent time-domain behavior. The wireless device may receive, from the base station, an activation command (e.g., an SP SRS activation/deactivation MAC CE) for an SRS resource set of the one or more SRS resource sets. A PDSCH transmission may comprise the activation command. The wireless device may send (e.g., transmit) a HARQ-ACK message corresponding to the PDSCH transmission in a slot n. The wireless device may use/apply one or more assumptions/actions for an SRS transmission of the SRS resource set starting from the slot $n+3N_{slot}^{subframe,\mu}+1$, for example, based on sending/transmitting the HARQ-ACK message. The activation command may comprise one or more spatial relation assumptions for one or more SRS resources of the SRS resource set. A first field (e.g., a resource Idi field) in the activation command may comprise an indicator/identifier of a resource (e.g., SS/PBCH block, NZP CSI-RS, SRS) used for spatial relationship derivation for an SRS resource of the one or more SRS resources. The one or more spatial relation assumptions may be provided by a list of references to one or more reference signal indicators/IDs (e.g., SSB-Index, SRS-ResourceId, etc.). One reference signal indicator/ID may be provided per SRS resource of the (activated) SRS resource set. A spatial relation assumption of the one or more spatial relation assumptions may be provided by a reference to an indicator/ID of a reference RS. The reference RS may be a SS/PBCH block, an NZP CSI-RS resource, or a SRS.

A field (e.g., a resource serving cell indicator/ID field) indicating a serving cell may be present in the activation command. The reference RS may be an SS/PBCH block resource or an NZP CSI-RS resource. The reference RS (e.g., SS/PBCH block, NZP CSI-RS resource) may be configured on the serving cell, for example, based on the resource serving cell indicator/ID field being present and/or the reference RS being the SS/PBCH block resource or the NZP CSI-RS resource.

The base station may configure the (activated) SRS resource set on a serving cell. A resource serving cell ID field may be absent in the activation command. The reference RS (e.g., SS/PBCH block, NZP CSI-RS resource) may be configured on the serving cell, for example, based on the resource serving cell ID field not being present in the activation command and the base station configuring the SRS resource set on the serving cell.

A resource serving cell ID field indicating a serving cell and a resource BWP indicator/ID field indicating an uplink BWP may be present in the activation command. The reference RS (e.g., SRS resource) may be configured on the uplink BWP of the serving cell, for example, based on the resource serving cell ID field and/or the resource BWP ID field being present in the activation command.

The base station may configure the SRS resource set on an uplink BWP of a serving cell. A resource serving Cell ID field and a resource BWP ID field may be absent in the activation command. The reference RS (e.g., SRS resource) may be configured on the uplink BWP of the serving cell, for example, based on the resource serving cell ID field and the Resource BWP ID field not being present in the activation command and/or the SRS resource set being configured on the uplink BWP of the serving cell.

The base station may configure an SRS resource in the (activated) SRS resource set with a higher layer parameter (e.g., spatialRelationInfo). The wireless device may assume/determine that a reference RS (e.g., indicated by an indicator/ID of the reference RS) in the activation command overrides a second reference RS configured in a higher layer parameter (e.g., spatialRelationInfo), for example, if the SRS resource, in the (activated) SRS resource set, is configured with the higher layer parameter (e.g., spatialRelationInfo).

The wireless device may receive, from the base station, a deactivation command (e.g., an SP SRS activation/deactivation MAC CE) for an (activated) SRS resource set of the one or more SRS resource sets. A PDSCH transmission may comprise the deactivation command. The wireless device may send (e.g., transmit) a HARQ-ACK message corresponding to the PDSCH transmission in a slot n. The wireless device may use/apply one or more assumptions/actions for a cessation of an SRS transmission of the (deactivated) SRS resource set starting from the slot $n+3N_{slot}^{subframe,\mu}+1$, for example, based on the sending/transmitting the HARQ-ACK corresponding to the PDSCH transmission.

A wireless device may activate a semi-persistent SRS resource configuration on an uplink BWP of a serving cell, for example, based on receiving, from a base station, an activation command for the semi-persistent SRS resource configuration. The wireless device may not receive, from the base station, a deactivation command for the semi-persistent SRS resource configuration.

The uplink BWP may be an active uplink BWP of the serving cell. The wireless device may consider/determine that the semi-persistent SRS resource configuration is active, for example, based on the uplink BWP being the active uplink BWP of the serving cell and/or based on not receiving the deactivation command for the semi-persistent SRS resource configuration. The wireless device may send (e.g., transmit) an SRS transmission, via the uplink BWP of the serving cell, based on the semi-persistent SRS resource configuration, for example, based on considering/determining that the semi-persistent SRS resource configuration is active.

The uplink BWP may not be an active uplink BWP of the serving cell. The uplink BWP not being the active uplink BWP may correspond to the uplink BWP being deactivated in the serving cell. The wireless device may determine/assume that the semi-persistent SRS configuration is suspended in the UL BWP of the serving cell, for example, based on not receiving the deactivation command for the semi-persistent SRS resource configuration and the uplink BWP being deactivated. The semi-persistent SRS configuration being suspended in the UL BWP may comprise that the wireless device may reactivate the semi-persistent SRS configuration if the UL BWP becomes an active UL BWP of the serving cell.

A first SRS resource of an SRS resource set may have a first time domain behavior (e.g., periodic, semi-persistent, aperiodic). A second SRS resource of the SRS resource set may have a second time domain behavior (e.g., periodic, semi-persistent, aperiodic). The wireless device may assume/expect/determine that the first time domain behavior and the second time behavior are the same (or substantially the same), for example, based on the first SRS resource and the second SRS resource being in the (same) SRS resource set. The wireless device may not assume/expect/determine that the first time domain behavior and the second time behavior are different, for example, based on the first SRS resource and the second SRS resource being in the (same) SRS resource set.

An SRS resource of an SRS resource set may have a first time domain behavior (e.g., periodic, semi-persistent, aperiodic). The SRS resource set may have a second time domain behavior (e.g., periodic, semi-persistent, aperiodic). The wireless device may expect/determine that the first time domain behavior and the second time behavior are the same, for example, based on the SRS resource being associated with the SRS resource set. The wireless device may not expect/determine that the first time domain behavior and the second time behavior are different, for example, based on the SRS resource and the SRS resource set being associated. The SRS resource being associated with the SRS resource set may correspond to the SRS resource set comprising the SRS resource. The SRS resource being associated with the SRS resource set may correspond to the SRS resource being an element of the SRS resource set.

A base station may configure a wireless device with a PUCCH on at least one first symbol on a carrier (e.g., supplementary UL (SUL) carrier, normal UL (NUL) carrier). A PUCCH transmission may carry/comprise one or more CSI reports. The PUCCH transmission may carry/comprise one or more L1-RSRP reports. The PUCCH transmission may carry/comprise a HARQ-ACK message and/or a scheduling request (SR). The base station may configure the wireless device with an SRS configuration on the carrier. The SRS configuration may be a semi-persistent SRS configuration. The SRS configuration may be a periodic SRS configuration. The wireless device may determine that the PUCCH transmission and an SRS transmission corresponding to the SRS configuration overlap in at least one symbol. The wireless device may determine that at least one first symbol of the PUCCH transmission and at least one second symbol of the SRS transmission of the SRS configuration may overlap in the at least one symbol. The wireless device may not perform the SRS transmission, on the carrier, on the at least one symbol, for example, based on the determining.

A base station may configure a wireless device with a PUCCH on at least one first symbol on a carrier (e.g., SUL carrier, NUL carrier). A PUCCH transmission may comprise a HARQ-ACK message and/or an SR. The base station may trigger an SRS configuration on the carrier. The SRS configuration may be an aperiodic SRS configuration. The wireless device may determine that the PUCCH transmission and an SRS transmission corresponding to the SRS configuration overlap in at least one symbol. The wireless device may determine that at least one first symbol of the PUCCH transmission and at least one second symbol of the SRS transmission of the SRS configuration may overlap in the at least one symbol. The wireless device may not perform the SRS transmission, on the carrier, on the at least one symbol, for example, based on the determining.

The not performing the SRS transmission may comprise dropping the SRS transmission on the at least one symbol. The wireless device may perform the SRS transmission on at least one third symbol of the at least one second symbol. The at least one third symbol may not overlap with the at least one symbol.

A base station may configure a wireless device with a PUCCH on at least one first symbol on a carrier (e.g., SUL carrier, NUL carrier). A PUCCH transmission may carry/comprise one or more semi-persistent CSI reports. The PUCCH transmission may carry/comprise one or more periodic CSI reports. The PUCCH transmission may carry/comprise one or more semi-persistent L1-RSRP reports. The PUCCH transmission may comprise one or more periodic L1-RSRP reports. The base station may trigger an SRS configuration on the carrier. The SRS configuration may be an aperiodic SRS configuration. The wireless device may determine that the PUCCH transmission and an SRS transmission corresponding to the SRS configuration overlap in at least one symbol. The wireless device may determine that at least one first symbol of the PUCCH transmission and at least one second symbol of the SRS transmission corresponding to the SRS (e.g., an aperiodic SRS configuration) may overlap in the at least one symbol. The wireless device may not send/transmit the PUCCH transmission, on the carrier, on the at least one symbol, for example, based on the determining.

A wireless device may or may not send (e.g., transmit) an SRS and a PUCCH transmission/PUSCH transmission simultaneously (or substantially simultaneously), for example, in an intra-band carrier aggregation (CA) or in an inter-band CA band-band combination. A base station may or may not configure the wireless device with an SRS transmission from a first carrier and a PUCCH transmission/PUSCH transmission (e.g., a PUSCH format, a UL DM-RS format, a UL PT-RS format, or a PUCCH format) in a second carrier in the same symbol. The first carrier may be different from the second carrier.

A wireless device may or may not send (e.g., transmit) an SRS and a PRACH transmission simultaneously (or substantially simultaneously), for example, in an intra-band carrier aggregation or in an inter-band CA band-band combination. The wireless device may or may not send/transmit an SRS from a first carrier and a PRACH from a second carrier simultaneously. The first carrier may be different from the second carrier.

A base station may configure a wireless device with a periodic SRS transmission on at least one symbol (e.g., an OFDM symbol). The base station may configure an SRS resource with a higher layer parameter (e.g., resourceType) indicating an aperiodic time-domain behavior. The base station may trigger the SRS resource on the at least one symbol. The wireless device may send (e.g., transmit) the (aperiodic) SRS resource on the at least one (overlapped) symbol, for example, based on the SRS resource being triggered on the at least one symbol configured with a periodic SRS transmission. The wireless device may or may not perform a periodic SRS transmission on the at least one symbol, for example, based on the SRS resource being triggered on the at least one symbol configured with a periodic SRS transmission. The not performing the periodic SRS transmission may comprise that the wireless device may not send/transmit (e.g., refrain from sending/transmitting) an SRS associated with the periodic SRS transmission on the at least one (overlapped) symbol.

A base station may configure a wireless device with a semi-persistent SRS transmission on at least one symbol (e.g., OFDM symbol). The base station may configure an SRS resource with a higher layer parameter (e.g., resourceType) indicating an aperiodic time domain behavior. The base station may trigger the SRS resource on the at least one symbol. The wireless device may send (e.g., transmit) the (aperiodic) SRS resource on the at least one (overlapped) symbol, for example, based on the SRS resource being triggered on the at least one symbol configured with the semi-persistent SRS transmission. The wireless device may or may not perform the semi-persistent SRS transmission on the at least one symbol, for example, based on the SRS resource being triggered on the at least one symbol configured with the semi-persistent SRS transmission. The not performing the semi-persistent SRS transmission may comprise that the wireless device may not send/transmit (e.g., refrain from sending/transmitting) an SRS associated with the semi-persistent SRS transmission on the at least one (overlapped) symbol.

A base station may configure a wireless device with a periodic SRS transmission on at least one symbol (e.g., OFDM symbol). The base station may configure an SRS resource with a higher layer parameter (e.g., resourceType) indicating a semi-persistent time-domain behavior. The base station may trigger the SRS resource on the at least one symbol. The wireless device may transmit the (semi-persistent) SRS resource on the at least one (overlapped) symbol, for example, based on the SRS resource being triggered on the at least one symbol configured with the periodic SRS transmission. The wireless device may or may not perform the periodic SRS transmission on the at least one symbol, for example, based on the SRS resource being triggered on the at least one symbol configured with the periodic SRS transmission. The not performing the periodic SRS transmission may comprise that the wireless device may not send/transmit (e.g., refrain from sending/transmitting) an SRS associated with the periodic SRS transmission on the at least one (overlapped) symbol.

Two transmission schemes may be supported for a PUSCH transmission: codebook-based transmission and non-codebook-based transmission. A wireless device may be configured with a codebook-based transmission, for example, if a higher layer parameter (e.g., txConfig in pusch-Config) is set to codebook. A wireless device may be configured with a non-codebook-based transmission, for example, if the higher layer parameter (e.g., txConfig) is set to nonCodebook. If the higher layer parameter txConfig is not configured, the wireless device may not be expected to be scheduled by DCI format 0_1. The wireless device may not expect to be scheduled for a PUSCH transmission by DCI (e.g., with DCI format 0_0) in a BWP without a configured PUCCH resource with PUCCH-SpatialRelation-Info in frequency range 2 in RRC connected mode.

A codebook-based PUSCH transmission may be scheduled by DCI corresponding to DCI format 0_0, DCI format 0_1, or may be semi-statically configured. The wireless device may determine its PUSCH transmission precoder based on SRS resource indicator/index (SRI), transmitted precoding matrix indicator (TPMI), and/or transmission rank, for example, if a PUSCH transmission is scheduled by DCI corresponding to DCI format 0_0 or is semi-statically configured. The SRI, TPMI and/or the transmission rank may be indicated by DCI fields (e.g., an SRS resource indicator field, a precoding information field, and a number of layers field) or indicated by higher layer parameters (e.g., srs-ResourceIndicator and precodingAndNumberOfLayers). The wireless device may be configured with at least one SRS resource, for example, if the wireless device is configured with the higher layer parameter txConfig set to codebook. The indicated SRI in slot n may be associated with the most recent transmission of an SRS resource identified by the SRI. The SRS resource may be prior to a PDCCH transmission comprising the SRI.

The wireless device may be configured, for codebook-based transmission, with a single higher layer parameter SRS-ResourceSet with the higher layer parameter usage set to codebook. Only one SRS resource (or any other quantity of SRS resources) may be indicated based on the SRI within the SRS resource set. The maximum quantity of configured SRS resources for codebook-based transmission may be 2 (or any other quantity). An SRS request field in DCI may trigger a transmission of aperiodic SRS resources, for example, if aperiodic SRS is configured for a wireless device.

A non-codebook-based PUSCH transmission may be scheduled by DCI corresponding to DCI format 0_0, DCI format 0_1, or may be semi-statically configured. The wireless device may determine its PUSCH precoder and transmission rank based on SRI (e.g., indicated in DCI) if multiple SRS resources are configured. The wireless device may use one or multiple SRS resources for SRS transmission. The maximum quantity/number of SRS resources for simultaneous transmission in a same symbol may be configured at the wireless device and/or may be based on the wireless device capabilities. The simultaneously transmitted SRS resources may occupy the same RBs. Only one SRS resource set (or any other quantity of SRS resource sets) may be configured using the higher layer parameter usage, in SRS-ResourceSet, set to nonCodebook. The maximum quantity of SRS resources that may be configured for non-codebook-based uplink transmission may be 4 (or any other quantity). An indicated SRI in slot n may be associated with the most recent transmission of SRS resource(s) identified by the SRI, where the SRS transmission is prior to a PDCCH transmission comprising the SRI. The wireless device may be scheduled, for non-codebook-based transmission, with DCI corresponding to DCI format 0_1, for example, if at least one SRS resource is configured in SRS-ResourceSet with the higher layer parameter usage set to nonCodebook.

Reference signals may be used to determine power for signal transmission. A base station may send one or more indications to a wireless device. The one or more indications may be used by the wireless device to determine reference signals. The reference signals may comprise pathloss reference signals.

In some types of wireless communications, such as corresponding to a first communication protocol (e.g., compatible with 3GPP Release 15, earlier/later 3GPP releases or generations, and/or other access technology), a wireless device may be configured (e.g., using RRC signaling), by a base station, with a first quantity (e.g., four, or any other quantity) of pathloss reference RSs. The wireless device may start measuring (e.g., simultaneously or substantially simultaneously) the pathloss reference RSs for a pathloss estimation (e.g., to determine a transmission power). The base station may trigger an uplink transmission, from a wireless device, via DCI. The wireless device may select a pathloss reference RS indicated by the DCI (e.g., in an SRI field), for example, to determine a transmission power for the uplink transmission. The wireless device may select a default pathloss reference RS (e.g., a pathloss RS corresponding to an index 0) for determining a transmission power, for example, if the DCI corresponds to a format that does not comprise an SRI field. The default pathloss reference RS may be preset at the wireless device. However, the wireless device may be unable to transmit an uplink signal using power based on an optimal pathloss reference RS, for example, if the first quantity of pathloss reference RS is insufficient to cover an entire cell. For example, the location of the wireless device may not be in the direction of any of the configured pathloss reference RS such that the wireless device may be required to measure pathloss reference RSs that may be non-optimal. The base station may need to transmit, to the wireless device, reconfiguration parameters indicating a new set of pathloss reference RSs that are directed towards the wireless device. Such reconfiguration parameters may be required to be transmitted by the base station every time the location of the wireless device is changed (e.g., beyond a threshold area). Transmission of reconfiguration parameters to a wireless device may lead to issues such as reduced spectrum efficiency, increased signaling overhead, and/or increased delay in determining optimal power for uplink transmissions by a wireless device.

In some types of wireless communications, such as corresponding to a second communication protocol (e.g., compatible with 3GPP Release 16, earlier/later 3GPP releases or generations, and/or other access technology), a base station may configure a wireless device with a second quantity (e.g. 64, or any other quantity) of pathloss reference RSs using RRC signaling. The second quantity of the pathloss reference RSs (e.g., according to the second communication protocol) may be greater than the first quantity of pathloss reference RSs (e.g., according to the first communication protocol), thereby increasing the likelihood of optimal coverage of the cell. However, the wireless device may be limited to measure a quantity of pathloss reference RSs (e.g., 4 or any other quantity) that is less than the second quantity (e.g., 64 or any other quantity). For example, the wireless device may be limited to measure only the first quantity of pathloss reference RSs based on processing capability, power constraints, and/or other restrictions in measuring pathloss reference RSs. The base station may send an indication of a subset of the second quantity of pathloss reference RSs that may be measured by the wireless device. The base station may send a MAC CE indicating a subset of the second quantity of pathloss reference RSs. The wireless device may start measuring (e.g., simultaneously or substantially simultaneously) the subset of the second quantity of pathloss reference RSs for a pathloss estimation (e.g., for determining a transmission power). Additionally or alternatively, the wireless device may receive DCI scheduling an uplink transmission (e.g., a PUSCH transmission). An SRI field in the DCI may indicate (or be mapped) to a pathloss reference RS of the subset of the second plurality of pathloss reference RSs. The wireless device may determine a transmission power for the uplink transmission based on measuring the pathloss reference RS. The wireless device may transmit the uplink transmission with the transmission power based on the determining the transmission power.

In some types of wireless communications (e.g., compatible with 3GPP Release 16, earlier/later 3GPP releases or generations, and/or other access technology), a wireless device may determine (or may be required) to transmit a signal without having sufficient information to determine an appropriate transmission power. For example, the wireless device may determine to send/transmit an uplink transmission (e.g., a PUSCH transmission) before receiving an indication (e.g., before receiving a MAC CE comprising the indication) of a pathloss reference, or a subset of a total quantity of pathloss reference RSs to measure for determining an appropriate transmission power. The wireless device may be incapable of measuring all pathloss reference RSs of the total quantity of pathloss reference RSs (e.g., 64 or any other quantity of pathloss reference RSs), for example, based on processing capability, power constraints, and/or other restrictions in measuring pathloss reference RSs. In the absence of receiving an indication of a pathloss reference RS or a subset of pathloss reference RSs (e.g., from a base station), the wireless device may be unable to determine which pathloss reference RS(s) is to be measured for determining a transmission power. As a result, the wireless device may ultimately use an inappropriate transmission power (e.g., either too high or too low). Additionally or alternatively, a base station may be unaware of a pathloss reference RS, among the total quantity of pathloss reference RSs, that the wireless device may use for determining the power for an uplink transmission. The base station may not decode the uplink transmission (e.g., PUSCH transmission) and/or may encounter an error in attempting to decode the PUSCH transmission, for example, if the base station is unaware of a pathloss reference RS selected by the wireless device for the uplink transmission. Inability of the base station to determine the pathloss reference RS selected at the wireless device may result in retransmission, which may lead to increased power consumption by the base station and/or by wireless device, increased uplink interference to other cells and/or to other wireless devices, and/or increased latency for communications. The base station may not adjust power control parameters (e.g., closed-loop power control parameters) for scheduling subsequent transmissions/TBs (e.g., PUSCH TBs, PDSCH TBs), for example, if the base station is unaware of the pathloss reference RS selected, by the wireless device, for the transmission. Not adjusting the power control parameters may result in using more than a required transmission power (e.g., which may result in increased interference) or using less than a required transmission power (e.g., which may result in decoding errors and/or reduced coverage).

Various examples herein describe enhanced pathloss reference RS determination. Enhanced pathloss reference RS determination may be used, for example, if the wireless device send/transmits a first message (e.g., a PUSCH transmission) using a transmission power before receiving a second message (e.g., a MAC CE) indicating a subset of a quantity of reference RSs (e.g., pathloss reference RSs) that may be configured/indicated (e.g., by RRC signaling) to be measured to determine the appropriate transmission power. The wireless device may select/determine a pathloss reference RS based on at least one parameter, message, and/or condition. For example, the wireless device may select/determine a pathloss reference RS based on a reference signal that is used to receive a MIB. The wireless device may select/determine a pathloss reference RS based on a reference signal that may be used in a latest/most recent random-access procedure. The wireless device may select a pathloss reference RS in a pathloss reference set with a lowest pathloss reference set index among pathloss reference set indices of a plurality of pathloss reference RSs sets (e.g., configured by RRC signaling). The wireless device may select a pathloss reference RS used for an uplink transmission via an uplink resource associated with a lowest uplink resource index among uplink resource indices corresponding to one or more uplink resources (e.g., configured by the RRC signaling). The wireless device may select/determine a pathloss reference RS based at least one parameter, message, and/or condition that is known by both the wireless device and a base station that is to receive a transmission from the wireless using a transmission power determined based on the pathloss reference RS. Enhanced pathloss reference RS determination described herein may provide advantages such as improved power control signaling, reduced uplink overhead/retransmissions and interference, reduced wireless device and/or base station battery/power consumption, and/or reduces delay/latency of communication.

FIG. 17 shows an example of a power control configuration for a PUSCH transmission. The example power control configuration comprises one or more higher layer parameters that may be used for determination of a transmission power of the PUSCH transmission. The one or more higher layer parameters may be indicated in one or more RRC messages sent, by a base station, to a wireless device, for example, for configuring the PUSCH transmission. Functionalities of each of higher layer parameter is described with reference to FIGS. 18-25.

Figure 18:
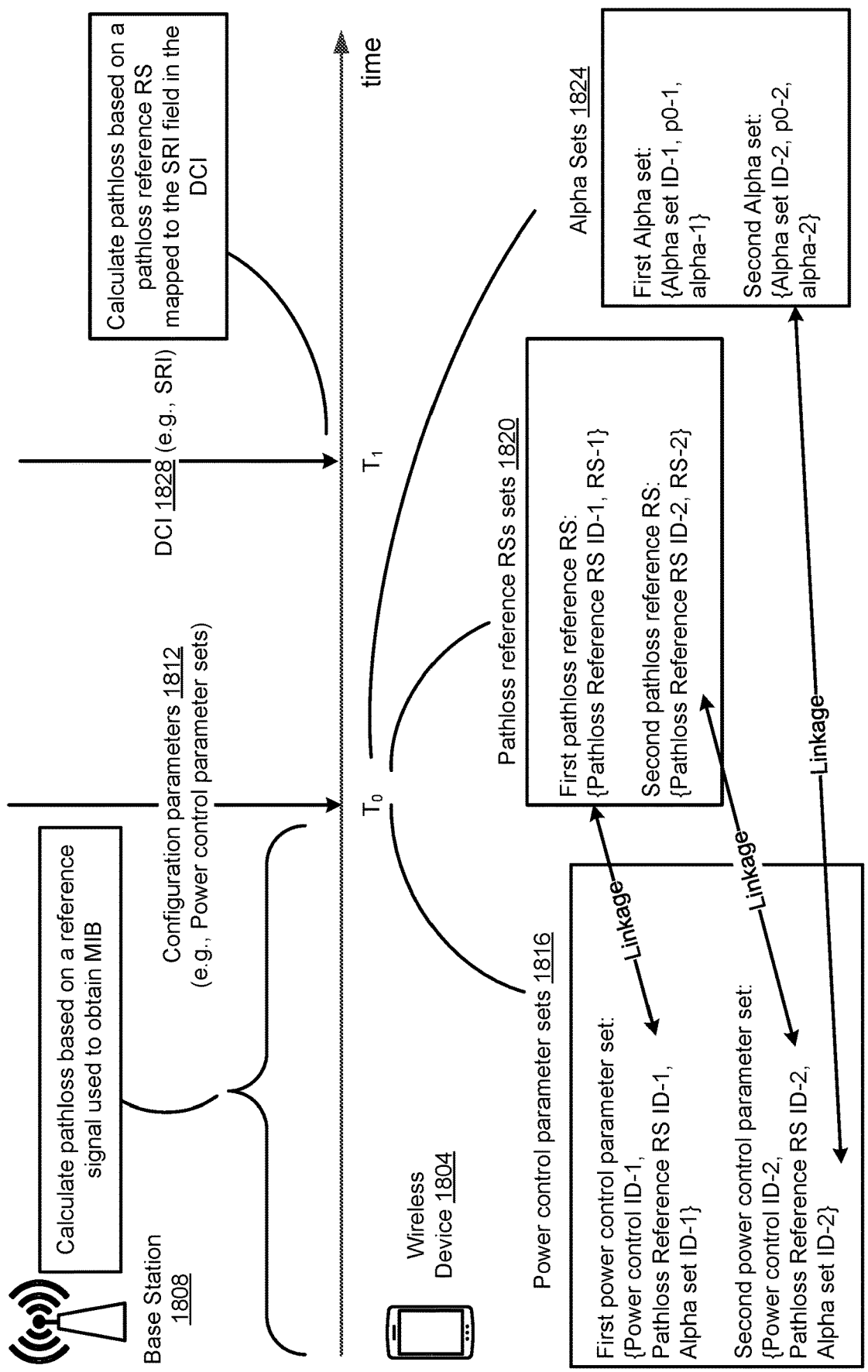
FIG. 18 shows example communications for transmission power control.

FIG. 18 shows example communications for transmission power control. A base station 1808 may send, to a wireless device 1804, power control parameters for determining transmission power (e.g., for a PUSCH transmission, for a PUCCH transmission, etc.) at the wireless device. The wireless device 1804 may determine the transmission power (e.g., for an uplink transmission responsive to DCI) based on received power control parameters.

A wireless device 1804 may receive (e.g., at or after time $T_0$) one or more messages (e.g., RRC messages). The wireless device 1804 may receive the one or more messages from a base station 1808. The one or more messages may comprise one or more configuration parameters 1812. The one or more configuration parameters 1812 may comprise/indicate a plurality of power control parameter sets 1816. The plurality of power control parameter sets 1816 may be provided by a higher layer parameter (e.g., SRI-PUSCH-PowerControl in FIG. 17). The plurality of power control parameter sets 1816 may correspond to (e.g., be configured for) a PUSCH transmission via/of a cell. The plurality of power control parameter sets 1816 may correspond to (e.g., be configured for) a PUCCH transmission via/of a cell. The cell may be a primary cell (e.g., PCell). The cell may be a secondary cell (e.g., SCell). The cell may be a secondary cell configured with PUCCH (e.g., PUCCH SCell).

The one or more configuration parameters 1812 (and/or the plurality of power control parameter sets 1816) may indicate/comprise power control indicators/indices (e.g., that may be provided by a higher layer parameter SRI-PUSCH-PowerControlId described with respect to FIG. 17) for the plurality of power control parameter sets 1816. Each power control parameter set of the plurality of power control parameter sets 1816 may be indicated/identified by (or may comprise) a respective power control index of the power control indices. A first power control parameter set of the plurality of power control parameter sets 1816 may be indicated/identified by a first power control index (e.g., power control ID-1) of the power control indices. A second power control parameter set of the plurality of power control parameter sets 1816 may be indicated/identified by a second power control index (e.g., power control ID-2) of the power control indices. The first power control index and the second power control index may be different.

The one or more configuration parameters 1812 may indicate one or more pathloss reference RS sets 1820. The one or more pathloss RS sets 1820 may be provided by a higher layer parameter (e.g., PUSCH-PathlossReferenceRS described with respect to FIG. 17). The one or more configuration parameters 1812 may indicate one or more pathloss reference RS indicators/indices (e.g., provided by a higher layer parameter PUSCH-PathlossReferenceRS-Id described with respect to FIG. 17) for the one or more pathloss reference RS sets 1820. Each pathloss reference RS set of the one or more pathloss reference RS sets 1820 may be indicated/identified by (or may comprise) a respective pathloss reference RS indicator/index of the one or more pathloss reference RS indicators/indices. A first pathloss reference RS set (e.g., first pathloss reference RS in FIG. 18) of the one or more pathloss reference RS sets 1820 may be indicated/identified by (or may comprise) a first pathloss reference RS index (e.g., pathloss reference RS ID-1) of the one or more pathloss reference RS indices. A second pathloss reference RS set (e.g., second pathloss reference RS in FIG. 18) of the one or more pathloss reference RS sets 1820 may be indicated/identified by (or may comprise) a second pathloss reference RS index (e.g., pathloss reference RS ID-2 in FIG. 18) of the one or more pathloss reference RS indices. Each pathloss reference RS set of the one or more pathloss reference RS sets 1820 may indicate/comprise a respective pathloss reference RS (e.g., provided by a higher layer parameter referenceSignal, ssb-index, csi-RS-Index, NZP-CSI-RS-ResourceId in FIG. 17). The first pathloss reference RS set of the one or more pathloss reference RS sets 1820 may indicate a first pathloss reference RS or may comprise a first index of the first pathloss reference RS (e.g., RS-1 in FIG. 18). The second pathloss reference RS set of one or more pathloss reference RS sets 1820 may indicate a second pathloss reference RS or may comprise a second index of the second pathloss reference RS (e.g., RS-2 in FIG. 18).

The one or more configuration parameters 1812 (or the plurality of power control parameter sets 1816) may indicate pathloss reference RSs (e.g., RS-1 and RS-2) for the plurality of power control parameter sets 1816. Each power control parameter set of the plurality of power control parameter sets 1816 may indicate a respective pathloss reference RS (e.g., SS/PBCH block, CSI-RS) of the pathloss reference RSs. The respective pathloss reference RS may be indicated by a pathloss reference RS set of the one or more pathloss reference RS sets 1820. Each power control parameter set may indicate, via a pathloss reference RS index (e.g., by sri-PUSCH-PathlossReferenceRS-Id in FIG. 17) in the power control parameter set, a respective pathloss reference RS set indicating the respective pathloss reference RS. The first power control parameter set of the plurality of power control parameter sets 1816 may indicate a first pathloss reference RS (e.g., RS-1) of the pathloss reference RSs. The first power control parameter set may indicate the first pathloss reference RS set (e.g., using sri-PUSCH-Pathloss-ReferenceRS-Id described with respect to FIG. 17, using pathloss reference RS ID-1 in FIG. 18, etc.) indicating the first pathloss reference RS (e.g., RS-1 in FIG. 18). The second power control parameter set of the plurality of power control parameter sets 1816 may indicate a second pathloss reference RS (e.g., RS-2 in FIG. 18) of the pathloss reference RSs. The second power control parameter set may indicate the second pathloss reference RS set (e.g., using sri-PUSCH-PathlossReferenceRS-Id described with respect to FIG. 17, using pathloss reference RS ID-2 in FIG. 18) indicating the second pathloss reference RS (e.g., RS-2 in FIG. 18). The first pathloss reference RS and the second pathloss reference RS may be different. The first pathloss reference RS and the second pathloss reference RS may be the same.

The one or more configuration parameters 1812 (and/or the plurality of power control parameter sets 1816) may indicate/comprise pathloss reference RS indices (e.g., provided by a higher layer parameter sri-PUSCH-PathlossReferenceRS-Id described with respect to FIG. 17) for the plurality of power control parameter sets 1816. The one or more pathloss reference RS indices of the one or more pathloss reference RS sets 1820 may comprise the pathloss reference RS indices. Each power control parameter set of the plurality of power control parameter sets may indicate/comprise a respective pathloss reference RS index, of the pathloss reference RS indices, indicating a pathloss reference RS (e.g., SS/PBCH block, CSI-RS, etc.). Each power control parameter set of the plurality of power control parameter sets 1816 may indicate/comprise a respective pathloss reference RS index of the pathloss reference RS indices. The respective pathloss reference RS index may identify/indicate a pathloss reference RS set, of the one or more pathloss reference RS sets, indicating the pathloss reference RS (e.g., SS/PBCH block, CSI-RS, etc.). Each pathloss reference RS index of the pathloss reference RS indices may be associated with (and/or may identify, may indicate, and/or may be mapped to) a respective pathloss reference RS set, of the one or more pathloss reference RS sets 1820. The respective pathloss reference RS set may indicate a respective pathloss reference RS. Each pathloss reference RS index of the pathloss reference RS indices may be mapped to the respective pathloss reference RS set by a respective linkage. The first power control parameter set of the plurality of power control parameter sets 1816 may indicate/comprise a first pathloss reference RS index (e.g., pathloss reference RS ID-1), of the pathloss reference RS indices, indicating a first pathloss reference RS (e.g., RS-1). The first power control parameter set may indicate/comprise the first pathloss reference RS index (e.g., pathloss reference RS ID-1) corresponding to (or indicating/identifying) the first pathloss reference RS set (e.g., first pathloss reference RS in FIG. 18) indicating the first pathloss reference RS. The second power control parameter set of the plurality of power control parameter sets 1816 may indicate/comprise a second pathloss reference RS index (e.g., pathloss reference RS ID-2), of the pathloss reference RS indices, indicating a second pathloss reference RS (e.g., RS-2). The second power control parameter set may indicate/comprise the second pathloss reference RS index (e.g., pathloss reference RS ID-2) corresponding to (or indicating/identifying) the second pathloss reference RS set (e.g., second pathloss reference RS in FIG. 18) indicating the second pathloss reference RS (e.g., RS-2). The first pathloss reference RS index and the second pathloss reference RS index may be different. The first pathloss reference RS index and the second pathloss reference RS index may be the same.

The one or more configuration parameters 1812 may indicate one or more alpha sets 1824. The one or more alpha sets 1824 may be provided by a higher layer parameter (e.g., P0-PUSCH-AlphaSet as shown in FIG. 17). The one or more configuration parameters 1812 may indicate one or more alpha set indicator/indices (e.g., provided by a higher layer parameter P0-PUSCH-AlphaSetId as shown in FIG. 17) for the one or more alpha sets 1824. Each alpha set of the one or more alpha sets 1824 may be indicated/identified by (or may comprise) a respective alpha set indicator/index of the one or more alpha set indicators/indices. A first alpha set of one or more alpha sets may be identified/indicates by (or may comprise) a first alpha set indicator/index (e.g., alpha set ID-1) of the one or more alpha set indices. A second alpha set of one or more alpha sets may be identified/indicated by (or may comprise) a second alpha set indicator/index (e.g., alpha set ID-2) of the one or more alpha set indices. Each alpha set of the one or more alpha sets may indicate/comprise a respective power control parameter (e.g., target power level (p0), pathloss scaling factor (alpha)). The first alpha set of one or more alpha sets may indicate a first power control parameter (e.g., p0-1, alpha-1). The second alpha set of one or more alpha sets may indicate a second power control parameter (e.g., p0-2, alpha-2).

The one or more configuration parameters 1812 (or the plurality of power control parameter sets 1816) may indicate/comprise alpha set indices (e.g., provided by a higher layer parameter sri-P0-PUSCH-AlphaSetId in FIG. 17) for the plurality of power control parameter sets. The one or more alpha set indices of the one or more alpha sets may comprise the alpha set indices. Each power control parameter set of the plurality of power control parameter sets may comprise a respective alpha set index, of the alpha set indices, indicating a power control parameter (e.g., target power level (p0), pathloss scaling factor (alpha) in FIG. 17). Each power control parameter set of the plurality of power control parameter sets may comprise a respective alpha set index (of the alpha set indices) identifying an alpha set, of the one or more alpha sets. Each alpha set index of the alpha set indices may be associated with (and/or may identify, may indicate, and/or may be mapped to) a respective alpha set, of the one or more alpha sets, indicating a power control parameter. Each alpha set index of the alpha set indices may be mapped to a respective alpha set by a linkage. The first power control parameter set of the plurality of power control parameter sets may indicate/comprise a first alpha set index (e.g., alpha set ID-1), of the alpha set indices, identifying the first alpha set indicating the first power control parameter (e.g., p0-1, alpha-1). The second power control parameter set of the plurality of power control parameter sets may indicate/comprise a second alpha set index (e.g., alpha set ID-2), of the alpha set indices, identifying the second alpha set indicating the second power control parameter (e.g., p0-2, alpha-2). The first alpha set index and the second alpha set index may be different. The first alpha set index and the second alpha set index may be the same.

The cell may comprise a plurality of BWPs. The plurality of BWPs may comprise one or more uplink BWPs. The plurality of BWPs may comprise one or more downlink BWPs. The one or more configuration parameters 1816 may indicate the plurality of power control parameter sets on/for an uplink BWP of the one or more uplink BWPs of the cell. The one or more configuration parameters 1816 may indicate the one or more pathloss reference RS sets 1820 on/for the uplink BWP of the cell. The one or more configuration parameters 1816 may indicate the one or more alpha sets 1824 on/for the uplink BWP of the cell.

A BWP of the plurality of BWPs may be in one of an active state and an inactive state. The wireless device 1808 may monitor a downlink channel/signal (e.g., PDCCH, DCI, CSI-RS, PDSCH) on/for/via an active downlink BWP of the one or more downlink BWPs. The wireless device 1808 may receive a PDSCH transmission on/via the active downlink BWP. The wireless device 1808 may not monitor a downlink channel/signal (e.g., PDCCH, DCI, CSI-RS, PDSCH) on/for an inactive downlink BWP of the one or more downlink BWPs. The wireless device 1808 may not receive a PDSCH transmission on/via the inactive downlink BWP. The wireless device 1804 may send (e.g., transmit) an uplink signal/channel (e.g., PUCCH, preamble, PUSCH, PRACH, SRS, etc.) via an active uplink BWP. The wireless device may not send (e.g., transmit) an uplink signal/channel (e.g., PUCCH, preamble, PUSCH, PRACH, SRS, etc.) via an inactive uplink BWP.

The wireless device 1804 may activate a downlink BWP of the one or more downlink BWPs of the cell. The activating the downlink BWP may comprise that the wireless device 1804 sets the downlink BWP as an active downlink BWP of the cell. The activating the downlink BWP may comprise that the wireless device 1804 sets the downlink BWP in an active state. The activating the downlink BWP may comprise switching the downlink BWP from an inactive state to an active state.

The wireless device 1804 may activate an uplink BWP of the one or more uplink BWPs of the cell. The activating the uplink BWP may comprise that the wireless device 1804 sets the uplink BWP as an active uplink BWP of the cell. The activating the uplink BWP may comprise that the wireless device 1804 sets the uplink BWP in an active state. The activating the uplink BWP may comprise switching the uplink BWP from an inactive state to an active state.

The wireless device 1804 may send (e.g., transmit) a TB on an (active) uplink BWP of an uplink carrier (e.g., NUL carrier, SUL carrier) of the cell. The TB may correspond to a PUSCH transmission (e.g., uplink data). The wireless device 1804 may be scheduled (e.g., via DCI indicating an uplink grant, via a configured uplink grant, etc.) to transmit a TB on the (active) uplink BWP of an uplink carrier (e.g., NUL carrier, SUL carrier) of the cell. The TB may correspond to a PUSCH transmission (e.g., uplink data). The wireless device 1804 may send (e.g., transmit) the TB (e.g., corresponding to a PUSCH transmission) based on a configured uplink grant (e.g., configured grant type 1, configured grant type 2). The one or more configuration parameters 1812 may indicate the configured uplink grant (e.g., configured grant type 1). The wireless device 1804 may receive a PDCCH transmission (e.g., and/or DCI) activating the configured uplink grant (e.g., configured grant type 2). The one or more configuration parameters 1812 may indicate one or more uplink resources for the configured uplink grant. The PDCCH transmission (e.g., and/or the DCI) may indicate one or more uplink resources for the configured uplink grant. The wireless device 1804 may transmit the TB via at least one uplink resource of the one or more uplink resources. The wireless device may transmit the TB with periodically. The one or more configuration parameters 1812 may indicate the periodicity of transmission of TB.

The wireless device 1804 may receive (e.g., at or after time $T_1$) DCI 1828. The DCI 1828 may schedule a transmission of the TB. The DCI may correspond to DCI format 0_0. The DCI 1828 may correspond to DCI format 0_1. The wireless device 1808 may transmit the TB (e.g., corresponding to the PUSCH transmission) before receiving the one or more messages comprising the plurality of power control parameter sets 1816 (e.g. before $T_0$). The wireless device 1804 may determine a transmission power for the TB based on a reference signal. The wireless device 1804 may use, for determining the transmission power, the reference signal (e.g., SS/PBCH block) that is used to obtain/receive a MIB. Determining a transmission power for a TB may comprise calculating the transmission power for the TB.

The wireless device 1808 may send (e.g., transmit) the TB (e.g., corresponding to the PUSCH transmission), for example, before receiving dedicated higher layer (e.g., RRC) parameters. The wireless device 1808 may determine a transmission power for the TB based on a reference signal, for example, before receiving the dedicated higher layer (e.g., RRC) parameters. The wireless device 1808 may use, for the determining the transmission power, the reference signal (e.g., SS/PBCH block) that is used to obtain/receive MIB.

The one or more configuration parameters 1812 may or may not comprise/indicate one or more pathloss reference RS sets 1820 (e.g., PUSCH-PathlossReferenceRS in FIG. 17, PUCCH-PathlossReferenceRS). The wireless device 1804 may determine a transmission power for the TB based on a reference signal, for example, based on the one or more configuration parameters 1812 not comprising/indicating the one or more pathloss reference RS sets. The wireless device 1804 may use, for the determining the transmission power, the reference signal (e.g., SS/PBCH block) that is used to obtain an MIB.

The wireless device 1804 may use an RS resource from the reference signal to determine the transmission power for the TB. The wireless device 1804 may the use the reference signal as a pathloss reference RS to determine the transmission power. The determining the transmission power for the TB based on the reference signal may comprise calculating a downlink pathloss estimate for the transmission power of the TB based on (e.g., measuring) the reference signal.

The one or more configuration parameters 1812 may indicate a reference signal power (e.g., provided by a higher layer parameter referenceSignalPower). Downlink pathloss estimate may be based on the reference signal power and the reference signal. The downlink pathloss estimate may be equal to a difference between the reference signal power and a measured RSRP of the reference signal (e.g., $PL_{b,f,c}(q_d)$ =referenceSignalPower−higher layer filtered RSRP). The wireless device 1804 may use the downlink pathloss estimate for determining the transmission power. The transmission power may comprise (e.g., be equal to) the downlink pathloss estimate.

The wireless device 1804 may transmit the TB based on the determined/calculated transmission power. The wireless device 1804 may transmit the TB with the transmission power. The wireless device 1804 may transmit the TB based on the downlink pathloss estimate. The reference signal may be for the (active) downlink BWP. The one or more configuration parameters 1812 may indicate the reference signal for the (active) downlink BWP of the cell. The wireless device 1804 may receive the reference signal via the (active) downlink BWP of the cell.

The DCI (e.g., the DCI 1828) scheduling the TB may not comprise an SRI field. The DCI 1828 may correspond to DCI format 0_0. The DCI 1828 may correspond to DCI format 0_1 that does not comprise the SRI field. The wireless device 1804 may determine a value for a determined power control parameter (e.g., $\alpha_{b,f,c}(j)$ or alpha as shown in FIG. 17; $P_{O\_UE\_PUSCH,b,f,c}(j)$ or p0 as shown in FIG. 17) for the TB based on a value of a power control parameter (e.g., alpha, p0) in an alpha set among the one or more alpha sets 1824, for example, if the DCI 1828 does not comprise the SRI field. The value for the determined power control parameter may be same as the value of the power control parameter in the alpha set. The wireless device 1804 may use/determine a value of a power control parameter (e.g., alpha, p0) in an alpha set among the one or more alpha sets 1824 to determine a transmission power of the TB.

The wireless device 1804 may reset an accumulation of a power control adjustment state (e.g., PUSCH power control adjustment state) to a value l, for example, based on the DCI 1828 not comprising the SRI field. l may be equal to 0, 1, or any other value. j may be greater than one.

A value of the j may indicate a transmission mode. The transmission mode may be a random-access procedure, for example if j is equal to a first value (e.g., 0, or any other value). The wireless device 1804 may send (e.g., transmit) a random-access preamble for the random-access procedure. The wireless device 1804 may transmit a TB (e.g., msg3, a PUSCH transmission) for the random-access procedure. The transmission mode may be a PUSCH transmission for a configured uplink grant for example, if j is equal to second value (e.g., 1, or any other value). The wireless device 1804 may transmit a TB (e.g., a PUSCH transmission) for the configured uplink grant. The transmission mode may be a PUSCH transmission scheduled by an uplink grant in (or indicated by DCI), for example, if j is equal to a third value (e.g., j>1, or any other value). The wireless device 1804 may transmit a TB (e.g., a PUSCH transmission) for the uplink grant.

The wireless device 1804 may determine that the one or more configuration parameters 1812 do not indicate/comprise at least one power control parameter set (e.g., SRI-PUSCH-PowerControl as shown in FIG. 17). The base station 1808 may not provide, to the wireless device 1804, at least one power control parameter set via the one or more configuration parameters 1812 (e.g., via RRC signaling). The wireless device 1804 may determine a value for a determined power control parameter (e.g., $\alpha_{b,f,c}(j)$ or alpha in FIG. 17; $P_{O\_UE\_PUSCH,b,f,c}(j)$ or p0 in FIG. 17) for the TB based on a value of a power control parameter (e.g., alpha, p0) in an alpha set among the one or more alpha sets 1824, for example, based on the one or more configuration parameters not indicating/comprising the at least one power control parameter set. The value for the determined power control parameter may be the same as the value of the power control parameter in the alpha set. The wireless device 1804 may use/determine a value of a power control parameter (e.g., alpha, p0) in an alpha set among the one or more alpha sets to determine a transmission power of the TB, for example, based on the one or more configuration parameters not indicating/comprising the at least one power control parameter set.

The wireless device 1804 may use a determined value (of a pathloss power scaling factor (e.g., alpha) to determine a transmission power of the TB. The wireless device 1804 may use a determined value of a target power level (e.g., p0) to determine a transmission power of the TB. The wireless device 1804 may reset an accumulation of a power control adjustment state (e.g., PUSCH power control adjustment state) to a value l, for example, based on the one or more configuration parameters 1812 not indicating/comprising the at least one power control parameter set. l may be equal to 0, 1, or any other value. j may be greater than one. The wireless device 1804 may send (e.g., transmit) the TB based on the determined/calculated transmission power, for example, based on the determining the transmission power for the TB. The wireless device 1804 may transmit the TB with the determined transmission power.

The alpha set may be a first alpha set in the one or more alpha sets 1824. The alpha set may be the first alpha set in a vector of the one or more alpha sets 1824. Alpha set 3 may be the first alpha set in the one or more alpha sets 1824, for example, if the one or more alpha sets 1824 are {alpha set 3, alpha set 1, alpha set 4, alpha set 2}. Alpha set 2 may be the first alpha set in the one or more alpha sets, for example, if the one or more alpha sets 1824 are {alpha set 2, alpha set 3, alpha set 1, alpha set 4}. The alpha set may be identified with a lowest (or a highest) alpha set index among the one or more alpha set indices of the one or more alpha sets 1824.

The DCI 1828 scheduling the TB may comprise an SRI field. The SRI field in the DCI 1828 may indicate (or be mapped to) a power control parameter set of the plurality of power control parameter sets 1816. A value of the SRI field in the DCI may indicate (or be mapped to) the power control parameter set (e.g., the first power control parameter set, or the second power control parameter set) of the plurality of power control parameter sets 1816 The SRI field may indicate a power control index of the power control parameter set. A value of the SRI field may indicate (or be mapped to) the power control index (e.g., power control ID-1 or power control ID-2, as shown in FIG. 18, that may be provided by a higher layer parameter sri-PUSCH-PowerControlId) of the power control parameter set.

The power control parameter set may comprise a pathloss reference RS index (e.g., provided by a higher layer parameter sri-PUSCH-PathlossReferenceRS-Id) indicating (or mapped to) a pathloss reference RS. The pathloss reference RS index may identify a pathloss reference RS set, of the one or more pathloss reference RS sets, indicating the pathloss reference RS. The SRI field in the DCI 1828 may indicate (or be associated with or mapped to, via the power control parameter set) the pathloss reference RS index of (or indicating/identifying) the pathloss reference RS set indicating the pathloss reference RS. A value of the SRI field in the DCI 1828 may be mapped to the pathloss reference RS index of the pathloss reference RS set indicating (or associated with or mapped to) the pathloss reference RS. The power control parameter set indicated by the SRI field may comprise the pathloss reference RS index of (or indicating/identifying) the pathloss reference RS set. The wireless device 1804 may determine the pathloss reference RS from a value of the pathloss reference RS index that is mapped to the SRI field in the DCI. The value of the pathloss reference RS index and the SRI field may be mapped from the power control index of the power control parameter set.

The pathloss reference RS may be the first pathloss reference RS (e.g., RS-1) in the first pathloss reference RS set identified by the first pathloss reference RS index (e.g., pathloss reference RS ID-1), for example, if a first value of the SRI field in the DCI 1828 indicates (or is mapped to) the first power control index of the first power control parameter set. The first power control parameter set may comprise the first pathloss reference RS index (e.g., pathloss reference RS ID-1) indicating (or identifying or of) the first pathloss reference RS set.

The pathloss reference RS may be the second pathloss reference RS (e.g., RS-2) in the second pathloss reference RS set identified by the second pathloss reference RS index (e.g., pathloss reference RS ID-2), for example, if a second value of the SRI field in the DCI indicates (or is mapped to) the second power control index of the second power control parameter set. The second power control parameter set may comprise the second pathloss reference RS index (e.g., pathloss reference RS ID-2) indicating (or identifying or of) the second pathloss reference RS set.

The wireless device 1804 may determine a transmission power for the TB based on the pathloss reference RS in (or indicated by) the pathloss reference RS set. The determining the transmission power for the TB based on the pathloss reference RS may comprise calculating/determining a downlink pathloss estimate for the transmission power based on (e.g., measuring) the pathloss reference RS. The wireless device 1804 may transmit the TB based on the determined/calculated transmission power. The wireless device 1804 may transmit the TB with the transmission power. The wireless device 1804 may transmit the TB based on the downlink pathloss estimate. The pathloss reference RS may be for the (active) downlink BWP. The one or more configuration parameters 1812 may indicate the pathloss reference RS for the (active) downlink BWP of the cell. The wireless device 1804 may receive the pathloss reference RS via the (active) downlink BWP of the cell.

The power control parameter set (e.g., indicated by the SRI field in the DCI 1828) may comprise an alpha set index (e.g., provided by a higher layer parameter sri-P0-PUSCH-AlphaSetId in FIG. 17) indicating (or mapped to) a power control parameter (e.g., p0, alpha). The alpha set index may indicate/identify an alpha set, of the one or more alpha sets 1824, indicating the power control parameter. The SRI field in the DCI 1828 may indicate (or be associated with or mapped, via the power control parameter set, to) the alpha set index of the alpha set indicating the power control parameter A value of the SRI field in the DCI 1828 may be mapped to the alpha set index of the alpha set indicating (or associated with or mapped to) the power control parameter. The power control parameter set indicated by the SRI field may comprise the alpha set index corresponding to the alpha set. The wireless device 1804 may determine the power control parameter from a value of the alpha set index that is mapped to the SRI field in the DCI 1828. The value of the alpha set index and the SRI field may be mapped from/via the power control index of the power control parameter set.

The power control parameter may be the first power control parameter (e.g., p0-1, alpha-1) in the first alpha set identified by the first alpha set index (e.g., alpha set ID-1), for example if a first value of the SRI field in the DCI 1828 indicates (or is mapped to) the first power control index of the first power control parameter set. The first power control parameter set may comprise the first alpha set index (e.g., alpha set ID-1) indicating (or identifying or of) the first alpha set.

The power control parameter may be the second power control parameter (e.g., p0-2, alpha-2) in the second alpha set identified by the second alpha set index (e.g., alpha set ID-2), for example, if a second value of the SRI field in the DCI 1828 indicates (or is mapped to) the second power control index of the second power control parameter set. The second power control parameter set may comprise the second alpha set index (e.g., alpha set ID-2) indicating (or identifying or of) the second alpha set.

The wireless device 1804 may determine a transmission power for the TB based on the power control parameter (e.g., $P_{O\_UE\_PUSCH,b,f,c}(j)$ or p0, $\alpha_{b,f,c}(j)$ or alpha) indicated by the alpha set. The wireless device 1804 may use a value of the power control parameter for a pathloss power scaling factor (e.g., alpha) to determine the transmission power of the TB. The wireless device 1804 may use a value of the power control parameter for a target power level (e.g., p0) to determine the transmission power of the TB. The wireless device 1804 may transmit the TB based on the determined/calculated transmission power. The wireless device 1804 may transmit the TB with the transmission power.

The one or more configuration parameters 1812 may indicate one or more uplink resources on/for the cell. The one or more uplink resources may comprise one or more PUCCH resources. The one or more uplink resources may comprise one or more SRS resources. The one or more configuration parameters 1812 may indicate the one or more uplink resources on/for the uplink BWP of the cell.

The one or more configuration parameters 1812 may indicate uplink resource indicators (e.g., indices) for the one or more uplink resources. The uplink resource indices may be provided by a higher layer parameter (e.g., pucch-ResourceId). Each uplink resource of the one or more uplink resources may be identified by a respective uplink resource index of the uplink resource indices. A first uplink resource of the one or more uplink resources may be indicated/identified by a first uplink resource index of the uplink resource indices. A second uplink resource of the one or more uplink resources may be indicated/identified by a second uplink resource index of the uplink resource indices.

The DCI 1828 scheduling the TB may be DCI format 0_0. The DCI 1828 may or may not comprise an SRI field. The wireless device 1808 may determine that an uplink resource (e.g., a PUCCH resource), of the one or more uplink resources, for sending (e.g., transmitting) uplink information or for uplink signaling (e.g., UCI, a HARQ-ACK message, an SR, CSI, SRS) is configured (e.g., by the one or more configuration parameters 1812) and/or activated (e.g., by a PUCCH spatial relation activation/deactivation MAC CE) with spatial relation information (e.g., PUCCH-SpatialRelationInfo, SpatialRelationInfo for SRS). The one or more configuration parameters 1812 may indicate (or provide) spatial relation information for the uplink resource. The uplink resource may have a lowest (or highest) uplink resource index among the uplink resource indices of the one or more uplink resources.

The wireless device 1804 may determine (e.g., select) an uplink resource with a lowest (or highest) uplink resource index among the uplink resource indices of the one or more uplink resources. An uplink resource with the lowest uplink resource index may an uplink resource with a resource index 0. The one or more configuration parameters 1812 may indicate (or provide) spatial relation information for the uplink resource with the lowest (or highest) uplink resource index.

The spatial relation information (e.g., PUCCH-SpatialRelationInfo, SpatialRelationInfo for SRS) of the uplink resource (e.g., with the lowest (or highest) uplink resource index) may comprise/indicate a pathloss reference RS (e.g., provided by a higher layer parameter PUCCH-PathlossReferenceRS-Id). The wireless device 1804 may determine a transmission power for an uplink transmission (e.g., a PUCCH transmission) via/in the uplink resource based on the pathloss reference RS. The determining the transmission power for the uplink transmission based on the pathloss reference RS may comprise determining/calculating a downlink pathloss estimate for the transmission power based on (e.g., measuring) the pathloss reference RS.

The wireless device 1804 may determine a transmission power for the TB based on the pathloss reference RS (e.g., with the lowest (or highest) index) used for the uplink transmission (e.g., PUCCH transmission) in/via the uplink resource. The determining the transmission power for the TB based on the pathloss reference RS may comprise calculating a downlink pathloss estimate for the transmission power based on (e.g., measuring) the pathloss reference RS.

The wireless device 1804 may transmit the TB based on the determined/calculated transmission power. The wireless device 1804 may transmit the TB with the transmission power. The wireless device 1804 may transmit the TB based on the downlink pathloss estimate. The pathloss reference RS may be for the (active) downlink BWP. The one or more configuration parameters 1812 may indicate the pathloss reference RS for the (active) downlink BWP of the cell. The wireless device 1804 may receive the pathloss reference RS via the (active) downlink BWP of the cell.

The DCI 1828 may correspond to DCI format 0_0. The wireless device 1804 may determine that an uplink resource (e.g., PUCCH resource), of the one or more uplink resources, for transmitting uplink information and/or for uplink signaling (e.g., UCI, a HARQ-ACK message, an SR, CSI, SRS) is not configured (e.g., by the one or more configuration parameters 1812) and/or activated (e.g., by a PUCCH spatial relation activation/deactivation MAC CE) with spatial relation information (e.g., PUCCH-SpatialRelationInfo, SpatialRelationInfo for SRS). The wireless device 1804 may determine that each uplink resource, of the one or more uplink resources, for transmitting uplink information and/or for uplink signaling (e.g., UCI, a HARQ-ACK message, an SR, CSI, SRS) is not configured (e.g., by the one or more configuration parameters) and/or activated (e.g., by a PUCCH spatial relation activation/deactivation MAC CE) with spatial relation information (e.g., PUCCH-SpatialRelationInfo, SpatialRelationInfo for SRS). The wireless device 1804 may determine that the one or more configuration parameters 1812 do not indicate spatial relation information (e.g., PUCCH-SpatialRelationInfo, SpatialRelationInfo for SRS), for example, for the one or more uplink resources. The wireless device 1804 may determine that a MAC CE (e.g., PUCCH spatial relation activation/deactivation MAC CE) indicating spatial relation information (e.g., PUCCH-SpatialRelationInfo, SpatialRelationInfo for SRS) for the one or more uplink resources has not been received at the wireless device 1804. The wireless device 1804 may determine that the one or more configuration parameters 1812 do not indicate spatial relation information (e.g., PUCCH-SpatialRelationInfo, SpatialRelationInfo for SRS), for example, for each uplink resource of the one or more uplink resources. The wireless device 1804 may determine/select a pathloss reference RS set among the one or more pathloss reference RS sets 1820, based on the determining.

The DCI 1828 may correspond to DCI format 0_1. The wireless device 1804 may determine that the DCI 1828 does not comprise an SRI field. The wireless device 1804 may determine/select a pathloss reference RS set among the one or more pathloss reference RS sets.

The wireless device 1804 may determine that the one or more configuration parameters 1812 do not indicate/comprise at least one power control parameter set (e.g., SRI-PUSCH-PowerControl). The wireless device may determine/select a pathloss reference RS set among the one or more pathloss reference RS sets, for example, based on the determining.

The determining/selecting the pathloss reference RS set among the one or more pathloss reference RS sets 1820 may comprise determining/selecting the pathloss reference RS set, among the one or more pathloss reference RS sets 1820, with (or indicated/identified by) a pathloss reference RS index that is equal to zero (or any other value). The determining/selecting the pathloss reference RS set among the one or more pathloss reference RS sets 1820 may comprise determining/selecting the pathloss reference RS set with a lowest (or highest) pathloss reference RS index among the one or more pathloss reference RS indices of the one or more pathloss reference RS sets 1820. The pathloss reference RS set may indicate/comprise a pathloss reference RS (or an index of the pathloss reference RS). The wireless device 1804 may determine a transmission power for the TB based on the pathloss reference RS corresponding to the determined/selected pathloss reference RS set. The determining the transmission power for the TB based on the pathloss reference RS may comprise determining/calculating a downlink pathloss estimate for the transmission power based on (e.g., measuring) the pathloss reference RS.

The wireless device 1804 may send (e.g., transmit) the TB based on the determined/calculated transmission power. The wireless device 1804 may send (e.g., transmit) the TB with the transmission power. The wireless device 1804 may transmit the TB based on the downlink pathloss estimate.

The one or more configuration parameters 1812 may or may not indicate a reference cell (e.g., via a higher layer parameter pathlossReferenceLinking) for the cell. The pathloss reference RS may be transmitted on/via the cell, for example, if the one or more configuration parameters 1812 do not indicate a reference cell. The base station 1808 may transmit the pathloss reference RS on/via the cell, for example, if the one or more configuration parameters 1812 do not indicate a reference cell. The base station 1808 may configure the pathloss reference RS for the cell, for example, if the one or more configuration parameters 1812 do not indicate a reference cell. The one or more configuration parameters 1812 may indicate the pathloss reference RS for the cell, for example, if the one or more configuration parameters 1812 do not indicate a reference cell. An RS resource for the pathloss reference RS may be on the cell.

The one or more configuration parameters 1812 may indicate a reference cell (e.g., via a higher layer parameter pathlossReferenceLinking) for the cell. The reference cell may be different from the cell. The reference cell may be same as the cell. The pathloss reference RS may be transmitted on/via the reference cell, for example, based on the one or more configuration parameters 1812 indicating the reference cell for the cell. The base station 1808 may transmit the pathloss reference RS on/via the reference cell, for example, based on the one or more configuration parameters 1812 indicating the reference cell for the cell. The base station 1808 may configure the pathloss reference RS for the reference cell, for example, based on the one or more configuration parameters 1812 indicating the reference cell for the cell. The one or more configuration parameters 1812 may indicate the pathloss reference RS for the reference cell, for example, based on the one or more configuration parameters 1812 indicating the reference cell for the cell. The reference cell may be for a pathloss estimation for the cell. The wireless device 1804 may measure the pathloss reference RS of the reference cell for the pathloss estimation of the cell. An RS resource for the pathloss reference RS may be on the reference cell. A value of the higher layer parameter pathlossReferenceLinking may indicate the reference cell.

Transmitting the TB on the (active) uplink BWP of an uplink carrier (e.g., NUL carrier, SUL) of the cell may comprise transmitting the TB, on the (active) uplink BWP of the uplink carrier of the cell, with the determined/calculated transmission power. The wireless device 1804 may transmit the TB, on the (active) uplink BWP of the uplink carrier of the cell, based on the determined/calculated transmission power. The wireless device 1804 may transmit the TB, on the (active) uplink BWP of the uplink carrier of the cell, with the determined transmission power.

A wireless device may receive information (e.g., DCI) scheduling an uplink transmission (e.g., a PUSCH transmission). DCI may comprise an SRI field that may indicate (or be mapped to) a pathloss reference RS to be used for determining transmission power for the uplink transmission. For example, the wireless device may use an indication in the SRI field to determine/select a pathloss reference RS among configured pathloss reference RSs (e.g., a total quantity of pathloss reference RSs (e.g., 64 or any other second quantity) or a subset of the pathloss reference RSs (e.g., 4 or any other first quantity)). In some types of wireless communications (e.g., compatible with 3GPP Release 16, earlier/later 3GPP releases or generations, and/or other access technology), the DCI may correspond to a DCI format that does not comprise an SRI field. In the absence of an indication of the SRI field, the wireless device may be unable to determine which pathloss reference RS from among the total quantity of pathloss reference RSs or the subset of the pathloss reference RSs (e.g., 4 or any other first quantity) should be used for determining transmission power, for example, if the DCI does not comprise an SRI field.

Various examples herein describe enhanced pathloss reference RS determination, for example, if a wireless device receives DCI that does not comprise an SRI field. The wireless device may use a reference RS indicated by a power control parameter set corresponding to a particular indicator/index (e.g., index 0, or any other index value). The particular indicator/index may be known (e.g., preconfigured, set by a predetermined rule, etc.) by both the wireless device and a base station in advance of receiving and sending, respectively, the DCI that does not comprise an SRI field. Selection of a pathloss reference RS as described herein may provide advantages such as improved power control signaling, reduced uplink overhead/retransmissions, reduced interference, reduced wireless device and/or base station battery/power consumption, and/or reduced delay/latency of communication.

Figure 19:
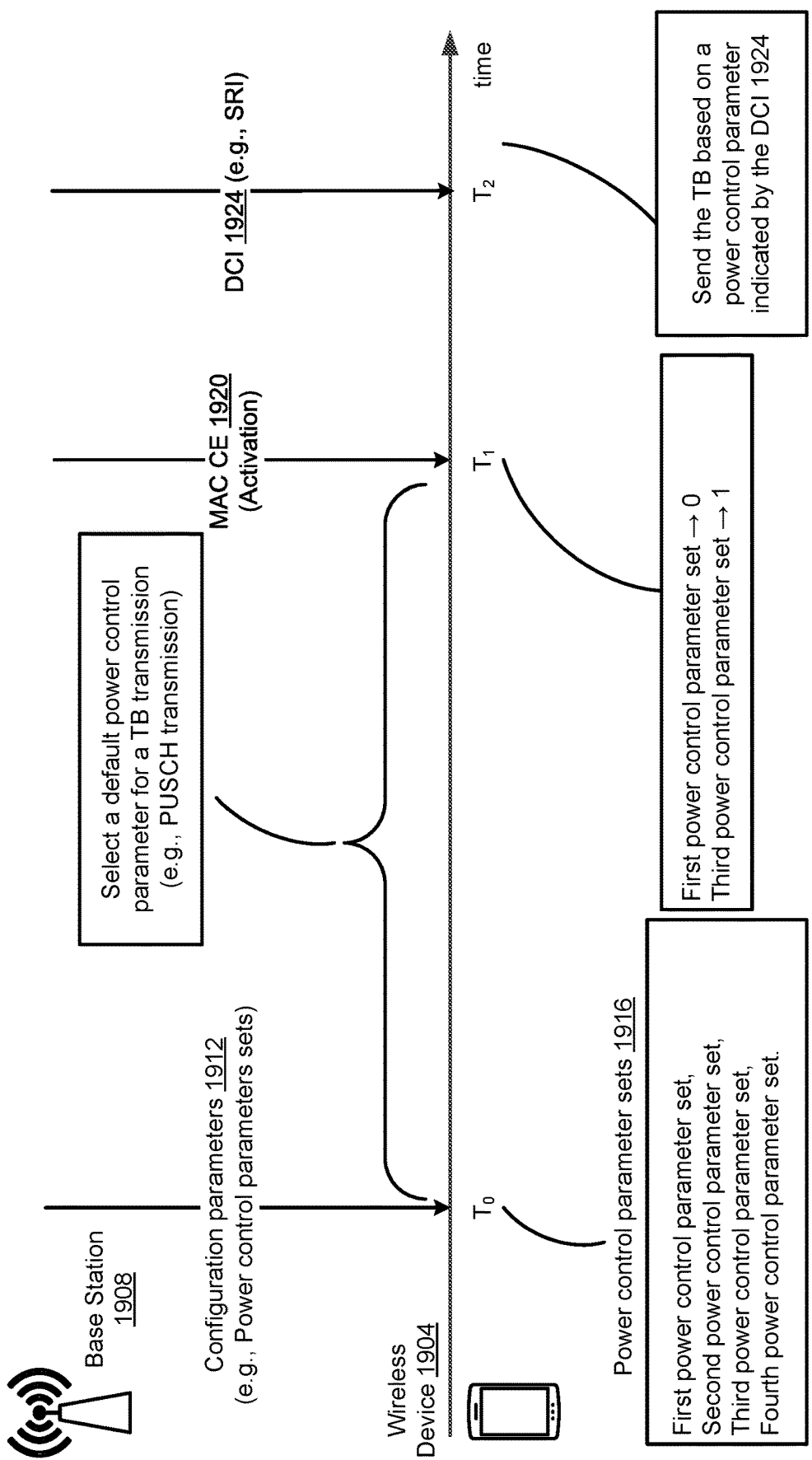
FIG. 19 shows example communications for transmission power control.

FIG. 19 shows an example communications for transmission power control. A base station 1908 may send, to a wireless device 1904, power control parameter sets, each set comprising parameters for determining transmission power (e.g., for a PUSCH transmission) at the wireless device. The base station 1908 may send, to the wireless device 1904, a message activating specific power control parameters sets. The wireless device 1904 may determine the transmission power based on a power control parameter among the activated power control parameters. The wireless device 1904 and/or the base station 1908 may perform one or more operations described above with reference to the wireless device 1804 and/or the base station 1808, as described above with reference to FIG. 18.

The wireless device 1904 may receive (e.g., at or after time $T_0$) one or more messages. The wireless device 1904 may receive the one or more messages from the base station 1908. The one or more messages may comprise one or more configuration parameters 1912. The one or more configuration parameters 1912 may comprise/indicate a plurality of power control parameter sets 1916 (e.g., provided by a higher layer parameter SRI-PUSCH-PowerControl). The plurality of power control parameters sets 1916 may comprise a first power control parameter set, a second power control parameter set, a third power control parameter set, and a fourth power control parameter set. The plurality of power control parameter sets 1916 may be (e.g., may be configured) for PUSCH transmission via/of a cell.

The wireless device may receive (e.g., at or after time $T_1$) a MAC CE 1920 activating at least one power control parameter set (e.g., the first power control parameter set and/or the third power control parameter set) of the plurality of power control parameter sets 1916. The activating the at least one power control parameter set may comprise activating pathloss reference RS(s) associated with the at least one power control parameter set. The MAC CE 1920 may have a respective field indicating each power control parameter set in the at least one power control parameter set. The MAC CE 1920 may have a field indicating a power control index of a power control parameter set in the at least one power control parameter set. The MAC CE 1920 may have field(s) indicating respective power control indices of power control parameter sets in the at least one power control parameter set. The MAC CE 1920 may have a field indicating at least one power control index of the at least one power control parameter set. The field may be set to a value (e.g., one, or any other value) indicating activation of the at least one power control parameter set. The wireless device 1904 may activate the at least one power control parameter set, for example, based on the field indicating the at least one power control parameter set. The wireless device 1904 may map the at least one power control parameter set to at least one codepoint, for example, based on the activating the at least one power control parameter set. The wireless device 1904 may map each power control parameter set of the at least one power control parameter set to a respective codepoint of the at least one codepoint. The at least one codepoint may be of (or may be in) DCI comprising an SRI field. The SRI field in the DCI may indicate (or be equal to or be mapped to) a codepoint of the at least one codepoint. The at least one power control parameter set may comprise the first power control parameter set and the third power control parameter set. The wireless device 1904 may map the first power control parameter set to a first codepoint (e.g., 0) of the at least one codepoint. The wireless device 1904 may map the second power control parameter set to a second codepoint (e.g., 1) of the at least one codepoint.

The wireless device 1904 may receive (e.g., after time $T_1$, or at or after time $T_2$) DCI 1924. The DCI 1924 may schedule a transmission of a TB (e.g., a PUSCH transmission). The DCI 1924 may correspond to DCI format 0_0, DCI format 0_1, or any other DCI format. The DCI 1924 may schedule the transmission of the TB on an (active) uplink BWP of an uplink carrier (e.g., NUL carrier, SUL carrier) of the cell.

The wireless device 1904 may receive the DCI 1924 scheduling the transmission of the TB, for example, after receiving (or activating) the MAC CE 1920 activating the at least one power control parameter set (e.g., after time $T_1$, or at or after time $T_2$). The DCI 1924 may schedule the transmission of the TB in a slot. The wireless device 1904 may send (e.g., transmit) the TB in the slot. The wireless device 1904 may determine that the slot occurs after a second slot via which the MAC CE 1920 is received or in which the MAC CE is activated. The wireless device 1904 may determine that the slot is after than a second slot via which the MAC CE 1920 is received or in which the MAC CE is activated. The wireless device 1904 may send/transmit the TB, for example, after receiving (or activating) the MAC CE 1920. The wireless device 1904 may determine a transmission power for the TB based on a power control parameter set of the at least one power control parameter set, for example, if the wireless device sends/transmits the TB after receiving (or activating) the MAC CE.

A PDSCH transmission may carry/comprise the MAC CE 1920. The wireless device 1904 may send (e.g., transmit) a HARQ-ACK message (e.g., ACK message, NACK message), for the PDSCH transmission, at a first time slot. The wireless device 1904 may apply the MAC CE 1920 at a second time (or starting from a second time), for example, based on the transmitting the HARQ-ACK message. The second time may be after an offset following the first time slot (e.g., $3N_{slot}^{subframe,\mu}+1$). The offset may be based on a subcarrier spacing (or numerology, e.g., 15 kHz, 30 kHz, etc.). The offset may be fixed (e.g., 3 ms, 5 ms, 2 slots, 3 slots, etc.). The wireless device 1904 may activate the MAC CE 1920 at the second time. The activating the MAC CE 1920 in the second time may comprise applying the MAC CE 1920 at the second time (or starting from the second time). The activating the MAC CE 1920 at the second time may comprise applying one or more assumptions/actions for an SRS transmission of the SRS resource set at the second time, for example, if the MAC CE 1920 is an SP SRS activation/deactivation MAC CE for an SRS resource set.

The DCI 1924 may or may not comprise an SRI field. The SRI field in the DCI 1924 may indicate (or be mapped to) a power control parameter set of the at least one power control parameter set. A value of the SRI field in the DCI 1924 may indicate (or be mapped to) a power control parameter set (e.g., first power control parameter set, or third power control parameter set) of the at least one power control parameter set. The SRI field may indicate a codepoint (e.g., 0 or 1) of the power control parameter set. A value of the SRI field may indicate (or be mapped to) the codepoint of the power control parameter set. A value of the SRI field may indicate (or be mapped to) the codepoint of the power control parameter set. The power control parameter set may comprise a pathloss reference RS index (e.g., provided by a higher layer parameter sri-PUSCH-PathlossReferenceRS-Id) indicating (or mapped to) a pathloss reference RS. The pathloss reference RS index may indicate/identify a pathloss reference RS set, of one or more pathloss reference RS sets (e.g., indicated by the one or more configuration parameters 1912), indicating the pathloss reference RS. The wireless device 1904 may determine a transmission power for the TB based on the pathloss reference RS. The determining the transmission power for the TB based on the pathloss reference RS may comprise determining/calculating a downlink pathloss estimate for the transmission power based on (e.g., measuring) the pathloss reference RS.

The wireless device 1904 may select a pathloss reference RS in a manner as described above with reference to FIG. 18, for example, if the DCI 1924 does not comprise an SRI field. The wireless device 1904 may select/determine a power control parameter set, among the plurality of power control parameter sets 1916 or the at least one power control parameter set, to determine/calculate a transmission power for the TB, for example, based on receiving the DCI 1924 that does not comprise an SRI field.

The wireless device 1904 may send (e.g., transmit) the TB based on the determined/calculated transmission power. The wireless device 1904 may send/transmit the TB with the transmission power. The wireless device 1904 may send/transmit the TB based on the downlink pathloss estimate.

The wireless device 1904 may receive DCI scheduling the transmission of the TB, for example, before receiving the MAC CE 1920 activating the at least one power control parameter set (e.g., between $T_0$ and $T_1$, or before $T_1$). The wireless device 1904 may receive the DCI scheduling the transmission of the TB before activating the MAC CE 1920. The wireless device 1904 may determine that the receiving the DCI scheduling the transmission of the TB occurs before receiving (or activating) the MAC CE activating the at least one power control parameter set. The wireless device 1904 may select/determine a power control parameter set, among the plurality of power control parameter sets 1916, to determine/calculate a transmission power for the TB, for example, based on the determining.

The DCI may schedule the transmission of the TB in a slot. The wireless device 1904 may send/transmit the TB in the slot. The wireless device 1904 may determine that the slot occurs before a second slot in which the MAC CE 1920 activating the at least one power control parameter set is received (or activated). The wireless device 1904 may determine that the slot is before a second slot in which the MAC CE 1920 activating the at least one power control parameter set is received (or activated). The wireless device 1920 may send/transmit the TB before receiving (or activating) the MAC CE 1920 activating the at least one power control parameter set (e.g., between T0 and T1, or before T1). The DCI 1924 may schedule the transmission of the TB in the slot that is earlier than (or before) a slot in which the wireless device 1904 receives (or activates) the MAC CE 1920 activating the at least one power control parameter set. The wireless device 1904 may select/determine a power control parameter set, among the plurality of power control parameter sets 1916, to determine/calculate a transmission power for the TB, for example, based on determining that the slot occurs before a second slot in which the MAC CE 1920 is received (or activated).

The wireless device 1904 may send/transmit the TB (e.g., a PUSCH transmission) based on (or for) a configured uplink grant (e.g., configured grant type 1, configured grant type 2). The wireless device 1904 may send/transmit the TB, for the configured uplink grant, in a slot. The wireless device 1904 may determine that the slot occurs before a second slot in which the MAC CE 1920 activating the at least one power control parameter set is received (or activated). The wireless device 1904 may determine that the slot is earlier than a second slot in which the MAC CE 1904 activating the at least one power control parameter set is received (or activated). The wireless device 1904 may send/transmit the TB before receiving (or activating) the MAC CE 1920 activating the at least one power control parameter set (e.g., between $T_0$ and $T_1$, or before $T_1$). The slot for the transmission of the TB for the configured uplink grant is earlier than (or before) a slot in which the MAC CE 1920 is received (or activated). The wireless device 1904 may select/determine a power control parameter set, among the plurality of power control parameter sets 1916, to determine/calculate a transmission power for the TB, for example, based on determining that the slot occurs before a second slot in which the MAC CE 1920 is received (or activated).

The selected/determined power control parameter set may comprise a pathloss reference RS index (e.g., provided by a higher layer parameter sri-PUSCH-PathlossReferenceRS-Id) indicating (or mapped to) a pathloss reference RS. The pathloss reference RS index may indicate/identify a pathloss reference RS set, of the one or more pathloss reference RS sets, indicating the pathloss reference RS. The wireless device 1904 may determine/calculate the transmission power for the TB based on the pathloss reference RS.

The selected/determined power control parameter set may comprise an alpha set index (e.g., provided by a higher layer parameter sri-P0-PUSCH-AlphaSetId) indicating (or mapped to) a power control parameter (e.g., target power level (p0), pathloss scaling factor (alpha). The alpha set index may identify an alpha set, of the one or more alpha sets, indicating the power control parameter (e.g., $\alpha_{b,f,c}(j)$ or alpha; and/or $P_{O\_UE\_PUSCH,b,f,c}(j)$ or p0). The wireless device 1904 may determine/calculate the transmission power for the TB based on a value for the power control parameter. The wireless device 1904 may use the value for the power control parameter for a pathloss power scaling factor (e.g., alpha) to determine a transmission power of the TB. The wireless device 1904 may use the value for the power control parameter for a target power level (e.g., p0) to determine a transmission power of the TB.

The wireless device 1904 may transmit the TB based on the determined/calculated transmission power. The wireless device 1904 may transmit the TB with the transmission power. The selecting/determining the power control parameter set among the plurality of power control parameter sets 1916 may be based on power control indices (e.g., indicated by the one or more configuration parameters, and/or provided by a higher layer parameter SRI-PUSCH-PowerControlId) for the plurality of power control parameter sets 1916. The wireless device 1904 may determine/select the power control parameter set with a lowest (or highest) power control index among the power control indices of the plurality of power control parameter sets 1916. The base station 1908 may advantageously map a lowest (or highest) power control index to a power control parameter set with an optimal pathloss reference RS (e.g., a pathloss reference RS that is in a direction of the wireless device 1904). The power control parameter set with a lowest power control index may correspond to a power control index of zero. The plurality of power control parameter sets 1916 may comprise a first power control parameter set identified by a first power control index and a second power control parameter set indicated/identified by a second power control index. The determining/selecting the power control parameter set among the first power control parameter set and the second power control parameter set may be based on the first power control index and the second power control index. The wireless device 1904 may determine/select the power control parameter set with a lowest (or highest) power control index among the first power control index and the second power control index.

The first power control index may be lower than the second power control index. The wireless device 1904 may select/determine the first power control parameter set as the (selected/determined) power control parameter set, for example, based on the first power control index being lower than the second power control index. The wireless device 1904 may select/determine the second power control parameter set as the (selected/determined) power control parameter set, for example, based on the first power control index being lower than the second power control index.

The first power control index may be higher than the second power control index. The wireless device 1904 may select/determine the first power control parameter set as the (selected/determined) power control parameter set, for example, based on the first power control index being higher than the second power control index. The wireless device 1904 may select/determine the second power control parameter set as the (selected/determined) power control parameter set, for example, based on the first power control index being higher than the second power control index.

The selecting/determining the power control parameter set among the plurality of power control parameter sets 1916 may be based on the power control indices (e.g., provided by a higher layer parameter SRI-PUSCH-PowerControlId) for the plurality of power control parameter sets 1916. The wireless device 1904 may determine/select the power control parameter set with a power control index, among the power control indices, that is equal to a particular value (e.g., zero, or any other value). The wireless device 1904 may determine/select the power control parameter set with a power control index, among the power control indices of the plurality of power control parameter sets 1916, that is equal to the particular value. The value may be preconfigured. The value may be fixed. The value may be configured by the base station 1908. The one or more configuration parameters 1912 may indicate the value. The base station 1908 may advantageously map the particular power control index value to a power control parameter set with an optimal pathloss reference RS (e.g., a pathloss reference RS that is in a direction of the wireless device 1904).

The first power control index may be equal to the particular value (e.g., zero, or any other value). The second power control index may be different from the particular value. The wireless device 1904 may select/determine the first power control parameter set as the (selected/determined) power control parameter set, for example, based on the first power control index being equal to the value.

The second power control index may be equal to the particular value (e.g., zero, or any other value). The first power control index may be different from the particular value. The wireless device 1904 may select/determine the second power control parameter set as the (selected/determined) power control parameter set.

The wireless device 1904 may receive the DCI scheduling the transmission of the TB, for example, before receiving the MAC CE 1920 activating the at least one power control parameter set (e.g., between $T_0$ and $T_1$, or before $T_1$). The wireless device 1904 may receive the DCI scheduling the transmission of the TB, for example, before activating the MAC CE 1920. The wireless device 1904 may determine that the receiving the DCI scheduling the transmission of the TB occurs before receiving (or activating) the MAC CE 1920 activating the at least one power control parameter set. The wireless device 1904 may determine/calculate a transmission power for the TB based on a reference signal, for example, based on the determining that the receiving the DCI scheduling the transmission of the TB occurs before receiving (or activating) the MAC CE 1920.

The reference signal used to determine/calculate a transmission power for the TB may be a reference signal (e.g., SS/PBCH block) that is used to obtain MIB. The wireless device 1904 may use, for determining transmission power, the reference signal (e.g., SS/PBCH block) that is used to obtain MIB. The wireless device 1904 may use the reference signal as a pathloss reference RS to determine the transmission power. The reference signal corresponding to the MIB may correspond to a wide transmission beam, may be frequently transmitted, and may be robust enabling the wireless device 1904 to determine the transmission power in an efficient manner and with lower error probability.

The reference signal used to determine/calculate a transmission power for the TB may be a reference signal (e.g., SS/PBCH block) that is used/identified in a latest/most recent random-access procedure. The wireless device 1904 may use, for determining the transmission power, the reference signal (e.g., SS/PBCH block) that is used/identified in a latest/recent random-access procedure. The latest/recent random-access procedure may or may not be initiated based on receiving a PDCCH order. The latest/recent random-access procedure may or may not be initiated based on receiving a PDCCH order triggering a non-contention based random-access procedure.

The one or more configuration parameters 1912 may indicate the reference signal (e.g., a default downlink pathloss reference RS, SS/PBCH block). The wireless device 1904 may use, for the transmission power determination, the (default) reference signal (e.g., SS/PBCH block) indicated by the one or more configuration parameters 1912.

The wireless device 1904 may use an RS resource from the reference signal to determine the transmission power for the TB. The wireless device 1904 may use the reference signal as a pathloss reference RS to determine the transmission power.

The DCI may schedule the transmission of the TB in a slot. The wireless device may send/transmit the TB in the slot. The wireless device 1904 may determine that the slot occurs before a second slot in which the MAC CE 1920 activating the at least one power control parameter set is received (or activated). The wireless device 1904 may determine that the slot is earlier than a second slot in which the MAC CE 1920 activating the at least one power control parameter set is received (or activated). The wireless device 1904 may send/transmit the TB before receiving (or activating) the MAC CE 1920 activating the at least one power control parameter set (e.g., between $T_0$ and $T_1$, or before $T_1$). The DCI may schedule the transmission of the TB in the slot that is earlier than (or before) receiving (or activating) the MAC CE 1920 activating the at least one power control parameter set. The wireless device 1904 may determine/calculate a transmission power for the TB based on a reference signal, for example, based on determining that the slot is earlier than the second slot.

The reference signal used to determine/calculate a transmission power for the TB may be a reference signal (e.g., SS/PBCH block) that is used to obtain an MIB. The wireless device 1904 may use, for determining the transmission power, the reference signal (e.g., SS/PBCH block) that is used to obtain an MIB. The wireless device 1904 may the use the reference signal as a pathloss reference RS to determine the transmission power.

The reference signal used to determine/calculate a transmission power for the TB may be a reference signal (e.g., SS/PBCH block) that is used/identified in a latest/recent random-access procedure. The wireless device 1904 may use, for determining the transmission power, the reference signal (e.g., SS/PBCH block) that is used/identified in a latest/recent random-access procedure. The latest/recent random-access procedure may or may not be initiated based on receiving a PDCCH order. The latest/recent random-access procedure may or may not be initiated based on receiving a PDCCH order triggering a non-contention based random-access procedure.

The one or more configuration parameters 1912 may indicate the reference signal (e.g., a default downlink pathloss reference RS, SS/PBCH block). The wireless device 1904 may use, for the transmission power determination, the (default) reference signal (e.g., SS/PBCH block) indicated by the one or more configuration parameters 1912.

The wireless device 1904 may transmit the TB (e.g., corresponding to a PUSCH transmission) based on (or for) a configured uplink grant (e.g., configured grant type 1, configured grant Type 2). The wireless device 1904 may send/transmit the TB, for the configured uplink grant, in a slot. The wireless device 1904 may determine that the slot occurs before a second slot that the MAC CE 1920 activating the at least one power control parameter set is received (or activated). The wireless device 1904 may determine that the slot is earlier than a second slot in which the MAC CE 1920 activating the at least one power control parameter set is received (or activated). The wireless device 1904 may send/transmit the TB before receiving (or activating) the MAC CE 1920 activating the at least one power control parameter set (e.g., between $T_0$ and $T_1$, or before $T_1$). The slot for the transmission of the TB for the configured uplink grant is earlier than (or before) the second slot in which the MAC CE 1920 activating the at least one power control parameter set is received (or activated). The wireless device 1904 may determine/calculate a transmission power for the TB based on a reference signal, for example, for example, based on determining that the slot is earlier than the second slot.

The reference signal used to determine/calculate a transmission power for the TB may be a reference signal (e.g., SS/PBCH block) that may be used to obtain an MIB. The wireless device 1904 may use, for the transmission power determination, the reference signal (e.g., SS/PBCH block) that is used to obtain MIB. The wireless device may the use the reference signal as a pathloss reference RS to determine the transmission power.

The reference signal used to determine/calculate a transmission power for the TB may be a reference signal (e.g., SS/PBCH block) that is used/identified in a latest/recent random-access procedure. The wireless device 1904 may use, for the transmission power determination, the reference signal (e.g., SS/PBCH block) that is used/identified in a latest/recent random-access procedure. The latest/recent random-access procedure may or may not be initiated based on receiving a PDCCH order. The latest/recent random-access procedure may or may not be initiated based on receiving a PDCCH order triggering a non-contention based random-access procedure.

The one or more configuration parameters 1912 may indicate the reference signal (e.g., a default downlink pathloss reference RS, SS/PBCH block). The wireless device 1904 may use, for the transmission power determination, the (default) reference signal (e.g., SS/PBCH block) indicated by the one or more configuration parameters.

The determining the transmission power for the TB based on the reference signal may comprise calculating a downlink pathloss estimate for the transmission power based on (e.g., measuring) the reference signal. The wireless device 1904 may send/transmit the TB based on the determined/calculated transmission power. The wireless device 1904 may send/transmit the TB based on the downlink pathloss estimate.

The one or more configuration parameters 1912 may indicate one or more uplink resources on/for the cell. The one or more configuration parameters 1912 may indicate uplink resource indices (e.g., provided by a higher layer parameter pucch-ResourceId) for the one or more uplink resources. The wireless device 1904 may determine that an uplink resource (e.g., a PUCCH resource), of the one or more uplink resources, for transmitting an uplink information/signaling (e.g., UCI, a HARQ-ACK message, an SR, CSI, SRS) is configured (e.g., by the one or more configuration parameters 1912), activated (e.g., by a PUCCH spatial relation activation/deactivation MAC CE), and/or provided (e.g., by the one or more configuration parameters 1912) with spatial relation information (e.g., PUCCH-SpatialRelationInfo, SpatialRelationInfo for SRS). The one or more configuration parameters 1912 may indicate (or provide) spatial relation information for the uplink resource. The uplink resource may have a lowest (or highest) uplink resource index among the uplink resource indices of the one or more uplink resources. The spatial relation information (e.g., PUCCH-SpatialRelationInfo, SpatialRelationInfo for SRS) of the uplink resource (e.g., with the lowest (or highest) uplink resource index) may comprise/indicate a pathloss reference RS (e.g., provided by a higher layer parameter PUCCH-PathlossReferenceRS-Id). The wireless device 1904 may determine a transmission power for an uplink transmission (e.g., a PUCCH transmission) via/in the uplink resource based on the pathloss reference RS. The determining the transmission power for the uplink transmission based on the pathloss reference RS may comprise determining/calculating a downlink pathloss estimate for the transmission power based on (e.g., measuring) the pathloss reference RS.

The wireless device 1904 may receive the DCI scheduling the transmission of the TB before receiving the MAC CE 1920 activating the at least one power control parameter set (e.g., between T0 and T1, or before T1). The wireless device 1904 may receive the DCI scheduling the transmission of the TB before activating the MAC CE 1920. The wireless device 1904 may determine that the receiving the DCI scheduling the transmission of the TB occurs before receiving (or activating) the MAC CE 1920 activating the at least one power control parameter set. The wireless device 1904 may determine a transmission power for the TB based on the pathloss reference RS used for the uplink transmission (e.g., a PUCCH transmission) in/via the uplink resource (e.g., with the lowest or highest uplink resource index).

The DCI may schedule the transmission of the TB in a slot. The wireless device 1904 may send/transmit the TB in the slot. The wireless device 1904 may determine that the slot occurs before a second slot in which the MAC CE 1920 activating the at least one power control parameter set is received (or activated). The wireless device 1904 may determine that the slot is earlier than a second slot that the MAC CE 1920 activating the at least one power control parameter set is received (or activated). The wireless device 1904 may send/transmit the TB before receiving (or activating) the MAC CE activating the at least one power control parameter set (e.g., between $T_0$ and $T_1$, or before $T_1$). The DCI may schedule the transmission of the TB in the slot that is earlier than (or before) receiving (or activating) the MAC CE 1920 activating the at least one power control parameter set. The wireless device 1904 may determine a transmission power for the TB based on the pathloss reference RS used for the uplink transmission (e.g., PUCCH transmission) in/via the uplink resource (e.g., with the lowest or highest uplink resource index), for example, based on determining that the slot occurs before the second slot.

The wireless device 1904 may send/transmit the TB (e.g., corresponding to a PUSCH transmission) based on (or for) a configured uplink grant (e.g., configured grant type 1, configured grant type 2). The wireless device 1904 may send/transmit the TB, for the configured uplink grant, in a slot. The wireless device 1904 may determine that the slot occurs before a second slot in which the MAC CE 1920 activating the at least one power control parameter set is received (or activated). The wireless device 1904 may determine that the slot is earlier than a second slot in which the MAC CE 1920 activating the at least one power control parameter set is received (or activated). The wireless device 1904 may send/transmit the TB before receiving (or activating) the MAC CE 1920 activating the at least one power control parameter set (e.g., between $T_0$ and $T_1$, or before $T_1$). The slot for the transmission of the TB for the configured uplink grant is earlier than (or before) the second slot in which the wireless device receives (or activates) the MAC CE 1920 activating the at least one power control parameter set. The wireless device 1904 may determine a transmission power for the TB based on the pathloss reference RS used for the uplink transmission (e.g., a PUCCH transmission) in/via the uplink resource (e.g., with the lowest or highest uplink resource index), for example, based on determining that the slot is before a second slot. The determining the transmission power for the TB based on the pathloss reference RS may comprise determining/calculating a downlink pathloss estimate for the transmission power based on (e.g., measuring) the pathloss reference RS used for the uplink transmission (e.g., a PUCCH transmission) in/via the uplink resource (e.g., with the lowest or highest uplink resource index).

The wireless device 1904 may send/transmit the TB based on the determined/calculated transmission power. The wireless device 1904 may send/transmit the TB with the transmission power. The wireless device 1904 may transmit the TB based on the downlink pathloss estimate.

The one or more configuration parameters 1912 may indicate one or more pathloss reference RS sets (e.g., path loss reference RS sets 1820, provided by a higher layer parameter PUSCH-PathlossReferenceRS as shown in FIG. 17). The one or more configuration parameters 1912 may indicate/comprise pathloss reference RS indices (e.g., provided by a higher layer parameter PUSCH-PathlossReferenceRS-Id in FIG. 17) for the one or more pathloss reference RS sets. Each pathloss reference RS set of the one or more pathloss reference RS sets may be identified by (or may comprise) a respective pathloss reference RS index of the one or more pathloss reference RS sets.

The wireless device 1904 may receive the DCI scheduling the transmission of the TB, for example, before receiving the MAC CE 1920 activating the at least one power control parameter set (e.g., between $T_0$ and $T_1$, or before $T_1$). The wireless device 1904 may receive the DCI scheduling the transmission of the TB before activating the MAC CE 1920. The wireless device 1904 may determine that the receiving the DCI scheduling the transmission of the TB occurs before receiving (or activating) the MAC CE 1920 activating the at least one power control parameter set. The wireless device may determine/select a pathloss reference RS set among the one or more pathloss reference RS sets to determine/calculate a transmission power for the TB, for example, based on the determining.

The DCI may schedule the transmission of the TB in a slot. The wireless device 1904 may send/transmit the TB in the slot. The wireless device 1904 may determine that the slot occurs before a second slot in which the MAC CE 1920 activating the at least one power control parameter set is received (or activated). The wireless device 1904 may determine that the slot is earlier than a second slot in which the MAC CE 1920 activating the at least one power control parameter set is received (or activated). The wireless device 1904 may send/transmit the TB before receiving (or activating) the MAC CE 1920 activating the at least one power control parameter set (e.g., between T0 and T1, or before T1). The DCI may schedule the transmission of the TB in the slot that is earlier than (or before) the second slot in which the wireless device 1904 receives (or activates) the MAC CE 1920 activating the at least one power control parameter set. The wireless device may determine/select a pathloss reference RS set among the one or more pathloss reference 1904 RS sets to determine/calculate a transmission power for the TB, for example, based on determining that the slot is before the second slot.

The wireless device 1904 may send/transmit the TB (e.g., corresponding to a PUSCH transmission) based on (or for) a configured uplink grant (e.g., configured grant type 1, configured grant type 2). The wireless device 1904 may send/transmit the TB, for the configured uplink grant, in a slot. The wireless device 1904 may determine that the slot occurs before a second slot in which the MAC CE 1920 activating the at least one power control parameter set is received (or activated). The wireless device 1904 may determine that the slot is earlier than a second slot in which the MAC CE 1920 activating the at least one power control parameter set is received (or activated). The wireless device 1904 may send/transmit the TB before receiving (or activating) the MAC CE 1920 activating the at least one power control parameter set (e.g., between $T_0$ and $T_1$, or before $T_1$). The slot for the transmission of the TB for the configured uplink grant is earlier than (or before) receiving (or activating) the MAC CE 1920 activating the at least one power control parameter set. The wireless device may determine/select a pathloss reference RS set among the one or more pathloss reference RS sets to determine/calculate a transmission power for the TB, for example, based on determining that the slot is before the second slot.

The determined/selected pathloss reference RS set may indicate/comprise a pathloss reference RS (and/or an index of the pathloss reference RS). The wireless device 1904 may determine/calculate a transmission power for the TB based on the pathloss reference RS. The determining/calculating the transmission power for the TB based on the pathloss reference RS may comprise calculating a downlink pathloss estimate for the transmission power based on (e.g., measuring) the pathloss reference RS.

The wireless device 1904 may send/transmit the TB based on the determined/calculated transmission power, for example, based on the selecting/determining the pathloss reference RS set to determine/calculate the transmission power. The wireless device 1904 may send/transmit the TB with the transmission power. The wireless device 1904 may send/transmit the TB based on the downlink pathloss estimate.

The selecting/determining the pathloss reference RS set among the one or more pathloss reference RS sets may be based on the pathloss reference RS indices for the one or more pathloss reference RS sets. The wireless device 1904 may determine/select the pathloss reference RS set with a lowest (or highest) pathloss reference RS index among the pathloss reference RS indices of the one or more pathloss reference RS sets. The one or more pathloss reference RS sets may comprise a first pathloss reference RS set identified by a first pathloss reference RS index and a second pathloss reference RS set indicated/identified by a second pathloss reference RS index. The determining/selecting the pathloss reference RS set among the first pathloss reference RS set and the second pathloss reference RS set may be based on the first pathloss reference RS index and the second pathloss reference RS index. The wireless device 1904 may determine/select the pathloss reference RS set with a lowest (or highest) pathloss reference RS index among the first pathloss reference RS index and the second pathloss reference RS index.

The first pathloss reference RS index may be lower than the second pathloss reference RS index. The wireless device 1904 may select the first pathloss reference RS set as the (selected/determined) pathloss reference RS set, for example, based on the first pathloss reference RS index being lower than the second pathloss reference RS index. The wireless device 1904 may select the second pathloss reference RS set as the (selected/determined) pathloss reference RS set, for example, based on the first pathloss reference RS index being lower than the second pathloss reference RS index.

The first pathloss reference RS index may be higher than the second pathloss reference RS index. The wireless device 1904 may select the first pathloss reference RS set as the (selected/determined) pathloss reference RS set, for example, based on the first pathloss reference RS index being higher than the second pathloss reference RS index. The wireless device 1904 may select the second pathloss reference RS set as the (selected/determined) pathloss reference RS set, for example, based on the first pathloss reference RS index being higher than the second pathloss reference RS index.

The selecting/determining the pathloss reference RS set among the one or more pathloss reference RS sets may be based on the pathloss reference RS indices for the one or more pathloss reference RS sets. The wireless device 1904 may determine/select the pathloss reference RS set with a pathloss reference RS index that is equal to a particular value (e.g., zero, or any other value). The wireless device 1904 may determine/select the pathloss reference RS set with a pathloss reference RS index, among the pathloss reference RS indices of the one or more pathloss reference RS sets, that is equal to the particular value. The value may be zero (or any other value). The value may be preconfigured. The value may be fixed. The value may be configured by the base station. The one or more configuration parameters may indicate the value.

The first pathloss reference RS index may be equal to the value (e.g., zero, or any other value). The second pathloss reference RS index may be different from the value. The wireless device 1904 may select the first pathloss reference RS set as the (selected/determined) pathloss reference RS set, for example, based on the first pathloss reference RS index being equal to the value.

The second pathloss reference RS index may be equal to the value (e.g., zero, or any other value). The first pathloss reference RS index may be different from the value. The wireless device 1904 may select the second pathloss reference RS set as the (selected/determined) pathloss reference RS set, for example, based on the second pathloss reference RS index being equal to the value.

The one or more configuration parameters 1912 may indicate one or more alpha sets (e.g., the alpha sets 1824, provided by a higher layer parameter P0-PUSCH-AlphaSet in FIG. 17). The one or more configuration parameters 1912 may indicate one or more alpha set indices (e.g., provided by a higher layer parameter P0-PUSCH-AlphaSetId in FIG. 17) for the one or more alpha sets.

The wireless device 1904 may receive the DCI scheduling the transmission of the TB before receiving (or activating) the MAC CE 1920 activating the at least one power control parameter set (e.g., between T0 and T1, or before T1). The wireless device 1904 may determine that the receiving the DCI scheduling the transmission of the TB occurs before receiving (or activating) the MAC CE 1920 activating the at least one power control parameter set.

The wireless device may determine a value for a determined power control parameter (e.g., $\alpha_{b,f,c}(j)$ or alpha; or $P_{O\_UE\_PUSCH,b,f,c}(j)$ or p0) for the TB based on a value of a power control parameter (e.g., alpha, p0) in an alpha set among the one or more alpha sets, for example, based on the determining that the receiving the DCI scheduling the transmission of the TB occurs before receiving (or activating) the MAC CE 1920. The value for the determined power control parameter and the value of the power control parameter in the alpha set may be the same. The wireless device 1904 may use/determine a value of a power control parameter (e.g., alpha, p0) in an alpha set among the one or more alpha sets to determine a transmission power of the TB, for example, based on the determining that the receiving the DCI scheduling the transmission of the TB occurs before receiving (or activating) the MAC CE 1920.

The wireless device 1904 may reset an accumulation of a power control adjustment state (e.g., PUSCH power control adjustment state) to a value l, for example, based on the determining that the receiving the DCI scheduling the transmission of the TB is before receiving (or activating) the MAC CE 1920. l may be equal to 0, 1, or any other value. j may be greater than one (or may be equal to any other value).

The DCI may schedule the transmission of the TB in a slot. The wireless device 1904 may transmit the TB in the slot. The wireless device 1904 may determine that the slot occurs before a second slot in which the MAC CE 1920 activating the at least one power control parameter set is received (or activated). The wireless device 1904 may determine that the slot is earlier than a second slot in which the MAC CE 1920 activating the at least one power control parameter set is received (or activated). The wireless device 1904 may send/transmit the TB before receiving (or activating) the MAC CE 1920 activating the at least one power control parameter set (e.g., between T0 and T1, or before T1). The DCI may schedule the transmission of the TB in the slot that is earlier than (or before) the second slot in which the wireless device 1904 receives (or activates) the MAC CE 1920 activating the at least one power control parameter set. The wireless device 1904 may determine a value for a determined power control parameter (e.g., $\alpha_{b,f,c}(j)$ or alpha; or $P_{O\_UE\_PUSCH,b,f,c}(j)$ or p0) for the TB based on a value of a power control parameter (e.g., alpha, p0) in an alpha set among the one or more alpha sets. The value for the determined power control parameter and the value of the power control parameter in the alpha set may be the same. The wireless device 1904 may use/determine a value of a power control parameter (e.g., alpha, p0) in an alpha set among the one or more alpha sets to determine a transmission power of the TB. The wireless device may reset an accumulation of a power control adjustment state (e.g., PUSCH power control adjustment state) to a value l, for example, based on the determining that the slot is earlier than a second slot. 1 may be equal to 0, 1, or any other value. j may be greater than one (or may be equal to any other value).

The wireless device 1904 may send/transmit the TB (e.g., corresponding to a PUSCH transmission) based on (or for) a configured uplink grant (e.g., configured grant type 1, configured grant type 2). The wireless device 1904 may send/transmit the TB, for the configured uplink grant, in a slot. The wireless device 1904 may determine that the slot occurs before a second slot in which the MAC CE 1920 activating the at least one power control parameter set is received (or activated). The wireless device 1904 may determine that the slot is earlier than a second slot in which the MAC CE 1920 activating the at least one power control parameter set is received (or activated). The wireless device 1904 may send/transmit the TB before receiving (or activating) the MAC CE 1920 activating the at least one power control parameter set (e.g., between T0 and T1, or before T1). The slot for the transmission of the TB for the configured uplink grant is earlier than (or before) the second slot in which the wireless device 1904 receives (or activates) the MAC CE 1920 activating the at least one power control parameter set. The wireless device 1904 may determine a value for a determined power control parameter (e.g., $\alpha_{b,f,c}(j)$ or alpha; or $P_{O\_UE\_PUSCH,b,f,c}(j)$ or p0) for the TB, for example, based on a value of a power control parameter (e.g., alpha, p0) in an alpha set among the one or more alpha sets and based on determining that the slot for transmission of the TB is earlier than (or before) the second slot. The value for the determined power control parameter may be the same as the value of the power control parameter in the alpha set. The wireless device 1904 may use/determine a value of a power control parameter (e.g., alpha, p0) in an alpha set among the one or more alpha sets to determine a transmission power of the TB based on determining that the slot for transmission of the TB is earlier than (or before) the second slot. The wireless device may reset an accumulation of a power control adjustment state (e.g., PUSCH power control adjustment state) to a value l, for example, based on the determining that the slot is earlier than a second slot. l may be equal to 0, 1, or any other value. j may be greater than one (or may be any other value).

The alpha set may be a first alpha set in the one or more alpha sets. The alpha set may be the first alpha set in a vector of the one or more alpha sets. The first alpha set may be the first element in a vector of the one or more alpha sets. Alpha set 3 may be the first alpha set in the one or more alphas sets, for example, if the one or more alpha sets are {alpha set 3, alpha set 1, alpha set 4, alpha set 2}. Alpha set 2 may be the first alpha set in the one or more alpha sets, for example, if the one or more alpha sets are {alpha set 2, alpha set 3, alpha set 1, alpha set 4}. The first alpha set may be an alpha set with a lowest (or highest) alpha set index among the one or more alpha set indices of the one or more alpha sets.

The wireless device 1904 may use the value for the determined power control parameter for a pathloss power scaling factor (e.g., alpha) for determining a transmission power of the TB. The wireless device 1904 may use the value for the power control parameter for a target power level (e.g., p0) for determining a transmission power of the TB. The wireless device 1904 may send/transmit the TB based on the determined/calculated transmission power. The wireless device 1904 may send/transmit the TB with the transmission power.

Figure 20:
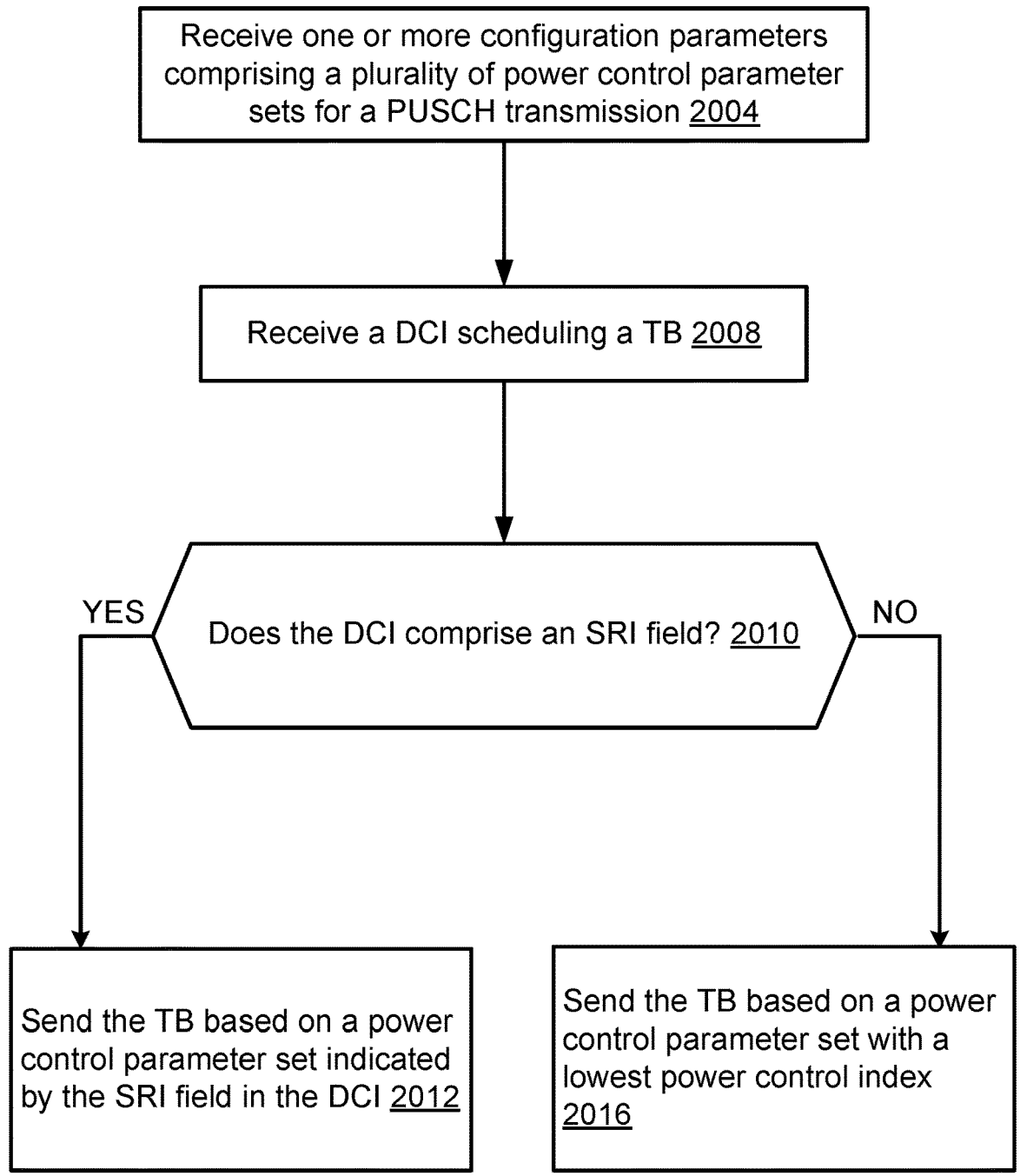
FIG. 20 shows an example method for transmission power control.

FIG. 20 shows an example method for transmission power control. The wireless device 1804 or the wireless device 1904 may perform an example method 2000. At step 2004, a wireless device may receive (e.g., from a base station) one or more configuration parameters. The one or more configuration parameters may comprise a plurality of power control parameter sets (e.g., for PUSCH transmissions). At step 2008, the wireless device may receive (e.g., from the base station) DCI. The DCI may be for scheduling a TB (e.g., corresponding to the PUSCH transmission). At step 2010, the wireless device may determine whether the DCI comprise an SRI field. At step 2012, the wireless device may send (e.g., to the base station) the TB based on a power control parameter set, among the plurality of power control sets, indicated by the SRI field in the DCI, for example, if the DCI comprises an SRI field. At step 2016, the wireless device may send (e.g., to the base station) the TB based on a power control parameter set, among the plurality of power control sets, with a lowest power control index (among the plurality of power control parameter sets), for example, if the DCI does not comprise an SRI field. The wireless device may send the TB based on a reference RS associated with the power control parameter set with the lowest power control index.

Figure 21:
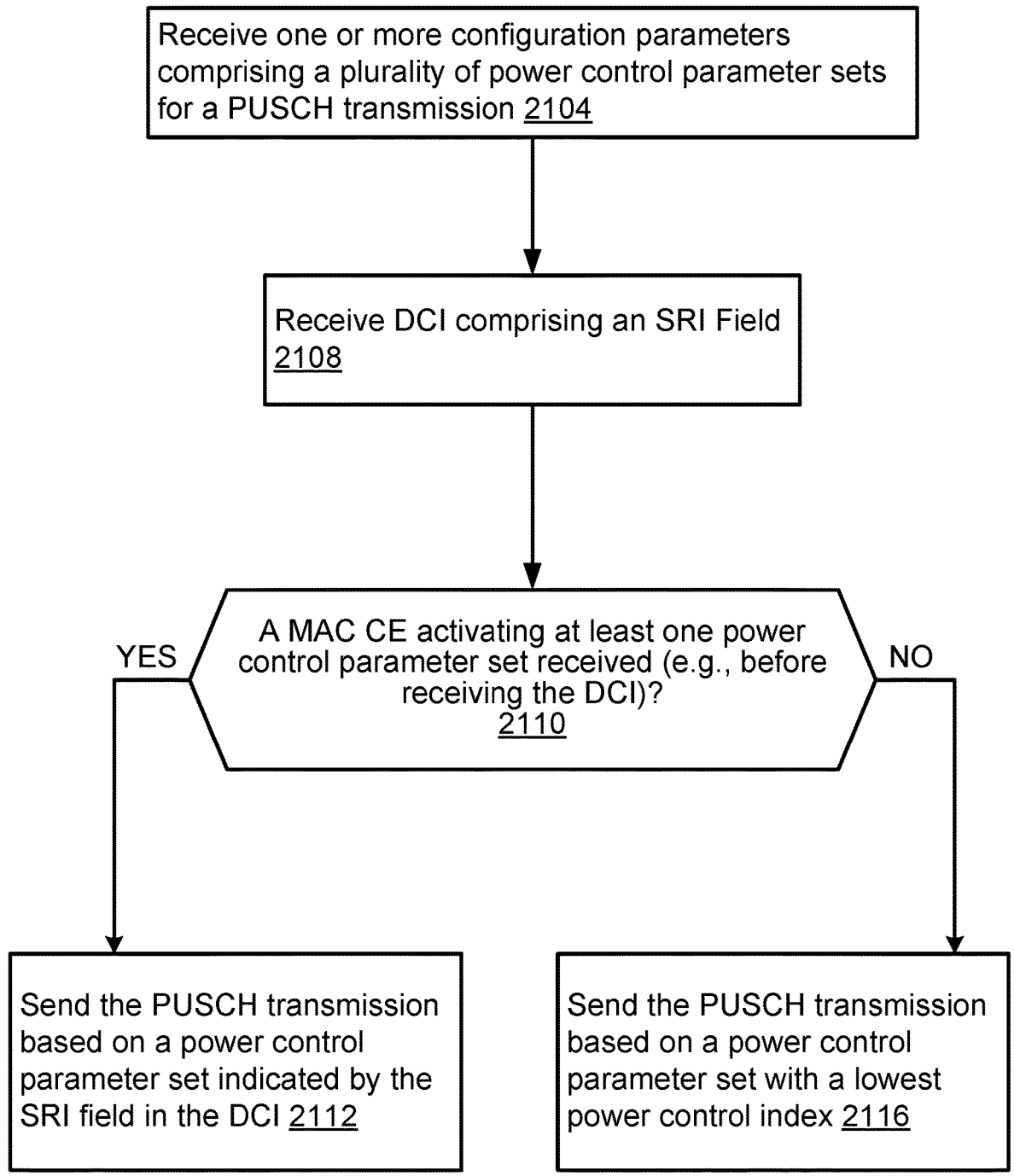
FIG. 21 shows an example method for transmission power control.

FIG. 21 shows an example method for transmission power control. The wireless device 1804 or the wireless device 1904 may perform an example method 2100. At step 2104, a wireless device may receive (e.g., from a base station) one or more configuration parameters. The one or more configuration parameters may comprise a plurality of power control parameter sets (e.g., for PUSCH transmissions). At step 2108, the wireless device may receive (e.g., from the base station) DCI comprising an SRI field. The DCI may be for scheduling a PUSCH transmission. The SRI field may indicate a power control parameter set among the plurality of power control parameter sets. At step 2110, the wireless device may determine whether a MAC CE activating at least one power control parameter set was received, for example, before receiving the DCI in step 2108. At step 2112, the wireless device may send (e.g., to the base station) the PUSCH transmission based on the power control parameter set, among the plurality of power control sets, indicated by the SRI field in the DCI, for example, if the wireless device receives a MAC CE activating at least one power control set, among the plurality of power control parameter sets (e.g., before receiving the DCI). At step 2116, the wireless device may send (e.g., to the base station) the PUSCH transmission based on a power control parameter set, among the plurality of power control sets, with a lowest power control index, for example, if the wireless device does not receive a MAC CE activating at least one power control set, among the plurality of power control parameter sets. The wireless device may send the PUSCH transmission based on a reference RS associated with the power control parameter set with the lowest power control index.

Figure 22:
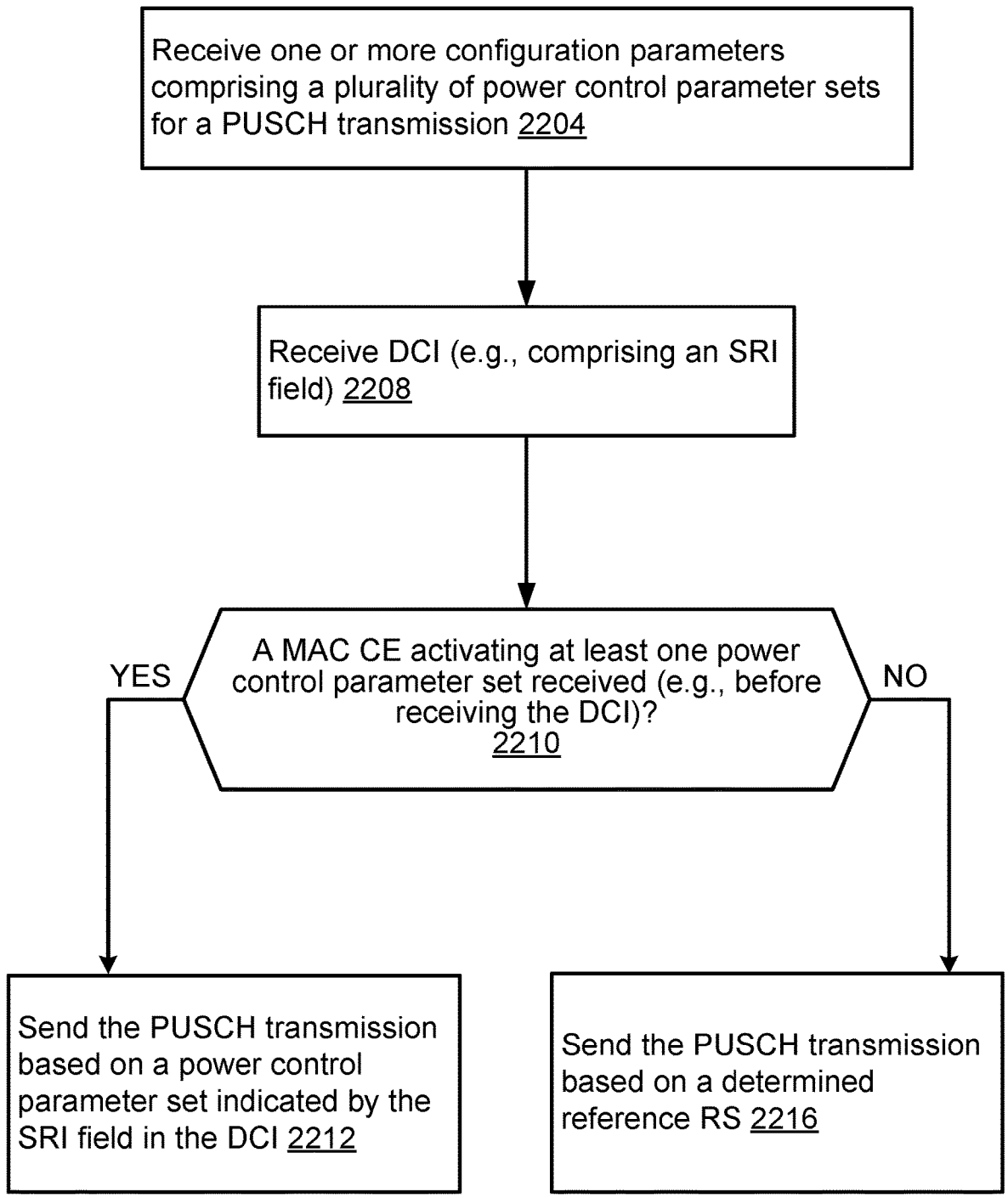
FIG. 22 shows an example method for transmission power control.

FIG. 22 shows an example method 22 for transmission power control. The wireless device 1804 or the wireless device 1904 may perform an example method 2200. At step 2204, a wireless device may receive (e.g., from a base station) one or more configuration parameters. The one or more configuration parameters may comprise a plurality of power control parameter sets (e.g., for PUSCH transmissions). At step 2208, the wireless device may receive (e.g., from the base station) DCI that may or may not comprise an SRI field. The DCI may be for scheduling a PUSCH transmission. The SRI field may indicate a power control parameter set among the plurality of power control parameter sets. At step 2210, the wireless device may determine whether a MAC CE activating at least one power control parameter set was received, for example, before receiving the DCI in step 2008. At step 2212, the wireless device may send (e.g., to the base station) the PUSCH transmission based on the power control parameter set, among the plurality of power control sets, indicated by the SRI field in the DCI, for example, if the wireless device receives (e.g., before receiving the DCI) a MAC CE activating at least one power control set, among the plurality of power control parameter sets. At step 2216, the wireless device may send (e.g., to the base station) the PUSCH transmission based on a determined reference RS (e.g., pathloss reference RS), for example, if the wireless device does not receive (e.g., before receiving the DCI) a MAC CE activating at least one power control set, among the plurality of power control parameter sets. The determined reference RS may be a reference signal used to obtain an MIB. The determined reference signal may be identified/used in a random-access procedure (e.g., a latest random-access procedure). The determined reference signal may be a reference signal corresponding to a lowest/highest pathloss reference RS index among configured pathloss reference RS sets. The determined reference signal may correspond to a configured uplink resource (e.g., a PUCCH resource) with a lowest/highest index among all configured uplink resources.

The wireless device may send the PUSCH transmission based on a spatial domain transmission filter (e.g., a transmission beam). A spatial relation update message (e.g., a MAC CE) may indicate a reference RS. The wireless device may determine a spatial domain transmission filter based on the reference RS. The wireless device may use the reference RS as a pathloss reference RS to determine transmission power, for example, if the wireless device does not receive (e.g., before receiving the DCI or before transmitting the PUSCH transmission) a MAC CE activating at least one power control set, among the plurality of power control parameter sets.

A wireless device may receive (e.g., from a base station) one or more messages. The one or more messages may comprise one or more configuration parameters. The one or more configuration parameters may comprise a plurality of power control parameter sets. The plurality of power control parameter sets may be for a PUSCH (e.g., a PUSCH transmission). The plurality of power control parameter sets may be for a PUCCH (e.g., a PUCCH transmission).

The wireless device may receive DCI. The DCI may schedule a transmission of a TB (e.g., a PUSCH transmission). The wireless device may receive the DCI before receiving a MAC CE activating at least one power control parameter set of the plurality of power control parameter sets (or before activating the MAC CE). The wireless device may determine that the receiving the DCI occurs before receiving a MAC CE activating at least one power control parameter set of the plurality of power control parameter sets (or before activating the MAC CE). The wireless device may select/determine a power control parameter set, among the plurality of power control parameter sets, to determine/calculate a transmission power for the TB, for example, based on the determining that the receiving the DCI occurs before receiving the MAC CE. The wireless device may select/determine a power control parameter set with a lowest (or highest) power control index among power control indices of the plurality of power control parameter sets, to determine/calculate a transmission power for the TB (e.g., as shown in FIG. 20), for example, based on the determining that the receiving the DCI occurs before receiving the MAC CE. The wireless device may select/determine a power control parameter set, among the plurality of power control parameter sets, with a power control index that is equal to a value (e.g., zero, or any other value), for example, based on the determining that the receiving the DCI occurs before receiving the MAC CE. The wireless device may determine/calculate a transmission power for the TB based on a reference signal (e.g., used to obtain MIB, used/identified in the recent/latest random-access procedure, as shown in FIG. 21), for example, based on the determining that the receiving the DCI occurs before receiving the MAC CE. The wireless device may determine a transmission power for the TB based on a pathloss reference RS used for an uplink transmission (e.g., a PUCCH transmission) in/via an uplink resource with a lowest (or highest) uplink resource index among uplink resource indices of one or more uplink resources (e.g., indicated by the one or more configuration parameters), for example, based on the determining that the receiving the DCI occurs before receiving the MAC CE. The wireless device may determine a transmission power for the TB based on a pathloss reference RS used for an uplink transmission (e.g., PUCCH transmission) in/via an uplink resource, among one or more uplink resources, with an uplink resource index that is equal to a value (e.g., zero, or any other value), for example, based on the determining that the receiving the DCI occurs before receiving the MAC CE. The wireless device may determine a transmission power for the TB based on a pathloss reference RS in a pathloss reference RS set with a lowest (or highest) pathloss reference RS index among one or more pathloss reference RS indices of one or more pathloss reference RS sets (e.g., indicated by the one or more configuration parameters), for example, based on the determining that the receiving the DCI occurs before receiving the MAC CE. The wireless device may determine a transmission power for the TB based on a pathloss reference RS in a pathloss reference RS set, among one or more pathloss reference RS sets, with a pathloss reference RS index that is equal to a value (e.g., zero, or any other value), for example, based on the determining that the receiving the DCI occurs before receiving the MAC CE.

The wireless device may send (e.g., transmit) the TB before receiving (or activating) a MAC CE activating at least one power control parameter set of the plurality of power control parameter sets. The wireless device may determine that the transmitting the TB occurs before receiving (or activating) a MAC CE activating at least one power control parameter set of the plurality of power control parameter sets. The wireless device may select/determine a power control parameter set, among the plurality of power control parameter sets, to determine/calculate a transmission power for the TB, for example, based on the determining. The wireless device may select/determine a power control parameter set with a lowest (or highest) power control index among power control indices of the plurality of power control parameter sets, to determine/calculate a transmission power for the TB (e.g., as shown in FIG. 20), for example, based on the determining. The wireless device may select/determine a power control parameter set, among the plurality of power control parameter sets, with a power control index that is equal to a value (e.g., zero, or any other value), for example, based on the determining. The wireless device may determine/calculate a transmission power for the TB based on a reference signal (e.g., used to obtain MIB, used/identified in the recent/latest random-access procedure, as shown in FIG. 21), for example, based on the determining. The wireless device may determine a transmission power for the TB based on a pathloss reference RS used for an uplink transmission (e.g., a PUCCH transmission) in/via an uplink resource with a lowest (or highest) uplink resource index among uplink resource indices of one or more uplink resources (e.g., indicated by the one or more configuration parameters), for example, based on the determining. The wireless device may determine a transmission power for the TB based on a pathloss reference RS used for an uplink transmission (e.g., a PUCCH transmission) in/via an uplink resource, among one or more uplink resources, with an uplink resource index that is equal to a value (e.g., zero, or any other value), for example, based on the determining. The wireless device may determine a transmission power for the TB based on a pathloss reference RS in a pathloss reference RS set with a lowest (or highest) pathloss reference RS index among one or more pathloss reference RS indices of one or more pathloss reference RS sets (e.g., indicated by the one or more configuration parameters), for example, based on the determining. The wireless device may determine a transmission power for the TB based on a pathloss reference RS in a pathloss reference RS set, among one or more pathloss reference RS sets, with a pathloss reference RS index that is equal to a value (e.g., zero, or any other value), for example, based on the determining.

A TB may be scheduled to be transmitted in a slot. The slot may be before (or earlier in time than) a second slot that the wireless device receives (or activates) a MAC CE activating at least one power control parameter set of the plurality of power control parameter sets. A wireless device may determine that the slot is (or occurs) before (or earlier in time than) a second slot that the wireless device receives (or activates) a MAC CE activating at least one power control parameter set of the plurality of power control parameter sets. The wireless device may select/determine a power control parameter set, among the plurality of power control parameter sets, to determine/calculate a transmission power for the TB, for example, based on the determining. The wireless device may select/determine a power control parameter set with a lowest (or highest) power control index among power control indices of the plurality of power control parameter sets, to determine/calculate a transmission power for the TB (e.g., as shown in FIG. 20), for example, based on the determining. The wireless device may select/determine a power control parameter set, among the plurality of power control parameter sets, with a power control index that is equal to a value (e.g., zero, or any other value), for example, based on the determining. The wireless device may determine/calculate a transmission power for the TB based on a reference signal (e.g., used to obtain MIB, used/identified in the recent/latest random-access procedure, as shown in FIG. 21), for example, based on the determining. The wireless device may determine a transmission power for the TB based on a pathloss reference RS used for an uplink transmission (e.g., a PUCCH transmission) in/via an uplink resource with a lowest (or highest) uplink resource index among uplink resource indices of one or more uplink resources (e.g., indicated by the one or more configuration parameters), for example, based on the determining. The wireless device may determine a transmission power for the TB based on a pathloss reference RS used for an uplink transmission (e.g., a PUCCH transmission) in/via an uplink resource, among one or more uplink resources, with an uplink resource index that is equal to a value (e.g., zero, or any other value), for example, based on the determining. The wireless device may determine a transmission power for the TB based on a pathloss reference RS in a pathloss reference RS set with a lowest (or highest) pathloss reference RS index among one or more pathloss reference RS indices of one or more pathloss reference RS sets (e.g., indicated by the one or more configuration parameters), for example, based on the determining. The wireless device may determine a transmission power for the TB based on a pathloss reference RS in a pathloss reference RS set, among one or more pathloss reference RS sets, with a pathloss reference RS index that is equal to a value (e.g., zero, or any other value), for example, based on the determining.

The selected/determined power control parameter set may comprise a pathloss reference RS index (e.g., provided by a higher layer parameter sri-PUSCH-PathlossReferenceRS-Id) indicating (or mapped to) a pathloss reference RS. The pathloss reference RS index may indicate/identify a pathloss reference RS set, of one or more pathloss reference RS sets (e.g., indicated by the one or more configuration parameters), indicating the pathloss reference RS. The wireless device may determine/calculate the transmission power for the TB based on the pathloss reference RS. The wireless device may send/transmit the TB based on the determined/calculated transmission power. The wireless device may send/transmit the TB with the transmission power.

The DCI may comprise an SRI field. The SRI field in the DCI may indicate (or be mapped to) a power control parameter set of the at least one power control parameter set. A value of the SRI field in the DCI may indicate (or be mapped to) the power control parameter set of the at least one power control parameter set.

The wireless device may determine that the receiving the DCI occurs, for example, after receiving (or activating) a MAC CE activating at least one power control parameter set of the plurality of power control parameter sets. The wireless device may receive the DCI scheduling the transmission of the TB, for example, after receiving (or activating) the MAC CE activating the at least one power control parameter set. The wireless device may select/determine the power control parameter set indicated by the SRI field to determine/calculate a transmission power for the TB, for example, based on the determining.

The wireless device may send (e.g., transmit) the TB, for example, after receiving (or activating) a MAC CE activating at least one power control parameter set of the plurality of power control parameter sets. The wireless device may determine that the transmitting the TB occurs, for example, after receiving (or activating) a MAC CE activating at least one power control parameter set of the plurality of power control parameter sets. The wireless device may select/determine the power control parameter set indicated by the SRI field to determine/calculate a transmission power for the TB, for example, based on the determining.

The TB may be scheduled to be transmitted in a slot. The slot may be after (or later in time than) a second slot that the wireless device receives (or activates) a MAC CE activating at least one power control parameter set of the plurality of power control parameter sets. The wireless device may determine that the slot is (or occurs) after (or later in time than) a second slot that the wireless device receives (or activates) a MAC CE activating at least one power control parameter set of the plurality of power control parameter sets. The wireless device may select/determine the power control parameter set indicated by the SRI field to determine/calculate a transmission power for the TB, for example, based on the determining.

The power control parameter set (e.g., indicated by the SRI field) may comprise a pathloss reference RS index (e.g., provided by a higher layer parameter sri-PUSCH-Pathloss-ReferenceRS-Id) indicating (or mapped to) a pathloss reference RS. The pathloss reference RS index may indicate/identify a pathloss reference RS set, of one or more pathloss reference RS sets (e.g., indicated by the one or more configuration parameters), indicating the pathloss reference RS. The wireless device may determine a transmission power for the TB based on the pathloss reference RS. The wireless device may send/transmit the TB based on the determined/calculated transmission power. The wireless device may send/transmit the TB with the transmission power.

A base station may configure a wireless device with one or more pathloss reference RSs. The base station may update the one or more pathloss reference RSs using RRC signaling. Updating the one or more pathloss reference RSs by the RRC signaling may increase signaling overhead. For example, in a high mobility environment, the base station may need to send (e.g., transmit), to the wireless device, RRC messages (e.g., RRC reconfiguration messages) updating the one or more pathloss reference RSs.

Updating the one or more pathloss reference RSs using RRC signaling may result in increased transmission power (e.g., at the wireless device). Power control parameters (e.g., corresponding to one or more pathloss reference RSs) updated by the RRC signaling may not follow dynamic beam switching for the PUSCH transmissions. The wireless device may be unable to dynamically adjust transmission powers of the PUSCH transmissions using RRC signaling which may result in increased transmission powers. Increased transmission powers may increase interference at other cells and/or wireless devices.

Spatial relation information (e.g., information corresponding to/indication of a transmitting beam) of an uplink resource (e.g., PUCCH resource, SRS resource) for a PUSCH transmission may be updated using a spatial relation update message (e.g., a MAC CE). Updating the spatial relation information by MAC CE signaling may enable dynamic beam switching for uplink transmissions (e.g., PUSCH transmissions).

It may be beneficial to update power control parameters (e.g., one or more pathloss reference RSs) based on an update message (e.g., a MAC CE). Updating the power control parameters using MAC CE signaling may reduce RRC signaling overhead in a high mobility environment. The power control parameters updated by the MAC CE signaling may follow dynamic beam switching for the PUSCH transmission. The wireless device may be enabled to adjust the transmission power of the PUSCH transmission thereby improving power efficiency among other advantages.

In some types of wireless communications (e.g., compatible with 3GPP Release 16, earlier/later 3GPP releases or generations, and/or other access technology), control information (e.g., DCI) may indicate (e.g., via an SRI field) spatial relation information (e.g., associated with a transmission beam) and a power control parameter set to be used for an uplink transmission. A spatial relation update message may be sent (e.g., by a base station) to update the spatial relation information. There may be a time delay between updating the spatial relation information and updating a power control parameter set (e.g., updating a path loss reference RS indicated by the power control parameter set), during which the uplink resource and the power control parameter set may be associated with the same SRI. The pathloss reference RS (associated with the power control parameter set) and the updated spatial relation information may be misaligned, for example, during the time delay. The wireless device may determine a spatial transmission filter (e.g., the transmission beam) based on the updated spatial relation information and determine the transmission power based on the path loss reference RS (which may not be in a same direction as the transmission beam), for example, during the time delay. The misalignment may result in inaccurate determination of a transmission power by a wireless device. The base station may be unable to receive an uplink transmission from the wireless device due to inaccurate transmission power determination.

As described further herein, enhanced pathloss reference RS determination may be used, for example, based on a spatial relation update. A wireless device may use a reference RS indicated in a spatial relation update message as a reference RS (e.g., pathloss reference RS). The wireless device may use the reference RS indicated in the spatial relation update message, for example, during a time delay between receiving the spatial relation update message and receiving a message updating a power control parameter set. The wireless device may update the power control parameter set to indicate the reference RS, for example, based on the spatial relation update message. Using the reference RS indicated in a spatial relation update message as a pathloss reference RS may enable/enhance alignment between an uplink transmission beam and a beam used for determining uplink transmission power, which may result in more accurate transmission power determination and/or improved efficiency in wireless communication.

Figure 23:
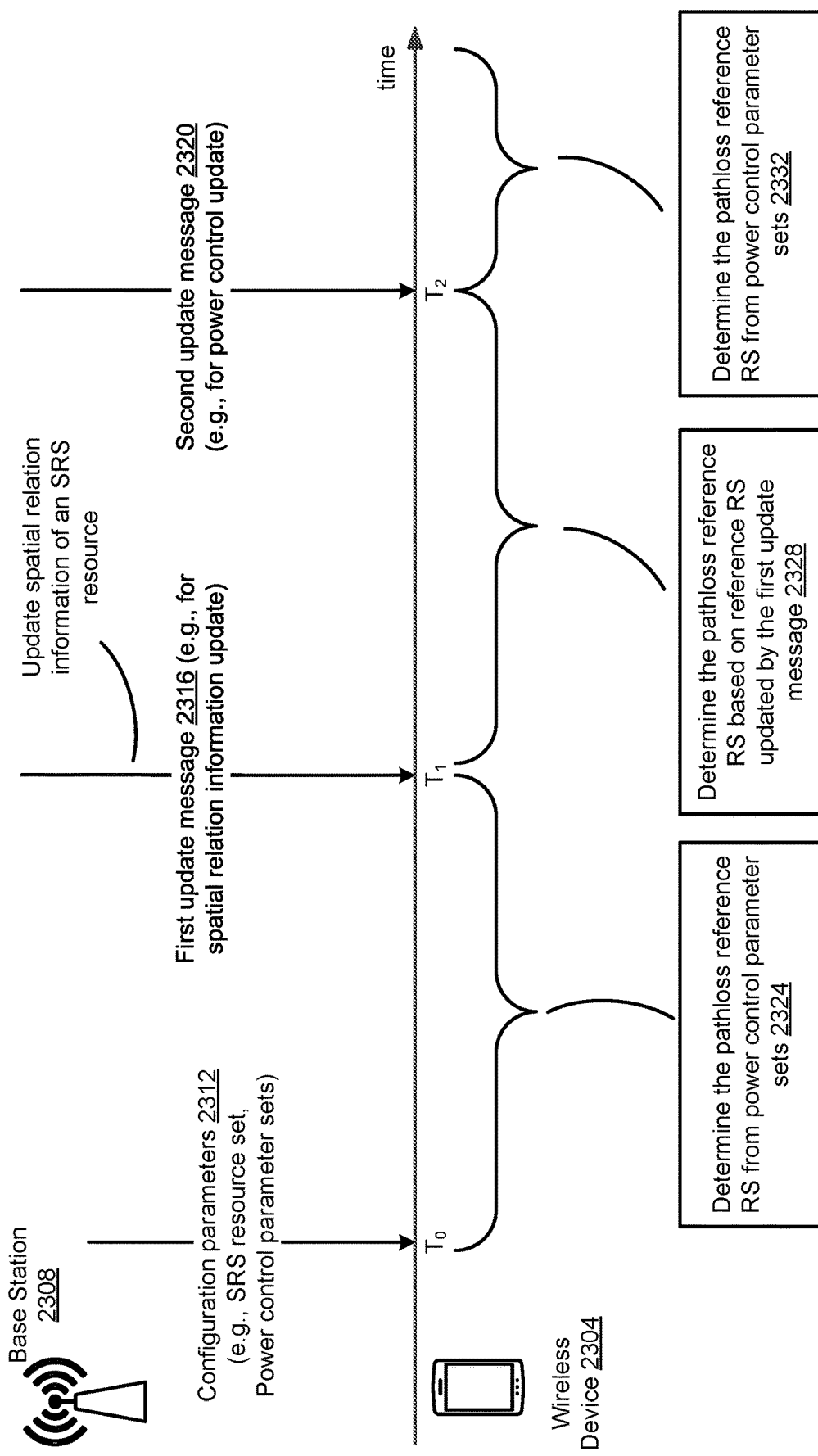
FIG. 23 shows example communications for transmission power control comprising messaging for updating spatial relation information and/or a power control parameter set.

FIG. 23 shows example communications for transmission power control comprising messaging for updating spatial relation information and/or a power control parameter set. A wireless device 2304 may use different reference RSs based on whether spatial relation information and/or a pathloss reference RS (e.g., indicated by configuration parameters in an RRC message) are updated (e.g., by a base station 2308). The wireless device 2304 may use a reference RS corresponding to an updated spatial relation information for determining a transmission power, for example, if the spatial relation information is updated and the pathloss reference RS is not updated. The wireless device 2304 may use an updated pathloss reference RS for determining a transmission power, for example, if the spatial relation information and the pathloss reference RS are both updated.

The wireless device 2304 may (e.g., at or after time $T_0$) receive, from a base station 2308, one or more messages. The one or more messages may comprise one or more configuration parameters 2312. The one or more configuration parameters 2312 may comprise/indicate a plurality of power control parameter sets (e.g., provided by a higher layer parameter SRI-PUSCH-PowerControl). The plurality of power control parameter sets may be for (e.g., configured for) PUSCH transmission via/of a cell. The plurality of power control parameter sets may be for (e.g., configured for) a PUCCH transmission via/of a cell. The cell may be a primary cell (PCell). The cell may be a secondary cell (SCell). The cell may be a secondary cell configured with a PUCCH (e.g., PUCCH SCell).

The one or more configuration parameters 2312 (or the plurality of power control parameter sets) may indicate/comprise power control indices (e.g., provided by a higher layer parameter SRI-PUSCH-PowerControlId) for the plurality of power control parameter sets. Each power control parameter set of the plurality of power control parameter sets may be indicated/identified by (or may comprise) a respective power control indicator/index of the power control indicators/indices. A first power control parameter set of the plurality of power control parameter sets may be identified by a first power control index of the power control indices. A second power control parameter set of the plurality of power control parameter sets may be identified by a second power control index of the power control indices. The first power control index and the second power control index may be different.

The one or more configuration parameters 2312 may indicate at least one SRS resource set (e.g., provided by higher layer parameter SRS-ResourceSet). The at least one SRS resource set may comprise one or more SRS resources. The one or more configuration parameters 2312 may comprise SRS resource indicators/indices (e.g., provided by a higher layer parameter srs-ResourceId) for the one or more SRS resources. Each SRS resource of the one or more SRS resources may be indicated/identified by a respective SRS resource index of the SRS resource indices. A first SRS resource of the one or more SRS resources may be indicated/identified by a first SRS resource index of the SRS resource indices. A second SRS resource of the one or more SRS resources may be identified by a second SRS resource index of the SRS resource indices.

The one or more configuration parameters 2312 may comprise/indicate one or more power control parameter sets. Each power control parameter set may comprise an indication of a pathloss reference RS set. The one or more configuration parameters 2312 may indicate one or more pathloss reference RS sets (e.g., pathloss reference RSs sets 1820, provided by a higher layer parameter PUSCH-PathlossReferenceRS). The one or more configuration parameters 2312 may indicate one or more pathloss reference RS indices (e.g., provided by a higher layer parameter PUSCH-PathlossReferenceRS-Id) for the one or more pathloss reference RS sets. Each pathloss reference RS set of the one or more pathloss reference RS sets may be indicated/identified by (or may comprise) a respective pathloss reference RS indicator/index of the one or more pathloss reference RS indicators/indices.

The wireless device may send (e.g., transmit) a TB via/on an (active) uplink BWP of an uplink carrier (e.g., a NUL carrier, a SUL carrier) of the cell. The TB may correspond to a PUSCH transmission (e.g., uplink data). The wireless device 2304 may send/transmit the TB before receiving (or activating) a first update message 2316 (e.g., a MAC CE)) updating a spatial relation of an SRS resource of the one or more SRS resources (e.g., before T1 or between T0 and T1). The wireless device 2304 may send/transmit the TB based on a configured uplink grant (e.g., configured grant type 1, configured grant type 2). The wireless device 2304 may receive DCI. The DCI may schedule a transmission of the TB. The DCI may comprise an SRI field.

The SRI field may indicate (or be mapped to) an SRS resource (e.g., an aperiodic SRS resource, a semi-persistent SRS resource, a periodic SRS resource) of the one or more SRS resources. A value of the SRI field may indicate (or be mapped to) the SRS resource of the one or more SRS resources. The SRI field may indicate an SRS resource indicator/index of the SRS resource. A value of the SRI field may indicate (or be mapped to) the SRS resource indicator/index (e.g., provided by a higher layer parameter srs-ResourceId) of the SRS resource.

The wireless device 2304 may determine that the SRS resource is configured with spatial relation information (e.g., provided by the higher layer parameter spatialRelationInfo). The one or more configuration parameters 2312 may indicate (or provide) the spatial relation information for the SRS resource. The wireless device 2304 may determine that the SRS resource is activated/indicated with spatial relation information (e.g., activated/indicated by SP SRS activation/deactivation MAC CE). The wireless device 2304 may receive a MAC CE (e.g., an SP SRS activation/deactivation MAC CE) activating (or indicating a resource used for) the spatial relation information for the SRS resource.

The spatial relation information may provide/indicate a spatial setting (e.g., a beam) for an uplink transmission (e.g., a PUSCH transmission, a PUCCH transmission, an SRS transmission and/or the TB). The spatial relation information may indicate/comprise an indicator/index of a first reference RS (e.g., ssb-Index, csi-RS-Index, srs). The first reference RS may be for (e.g., to determine) a spatial domain transmission filter. The wireless device 2304 may use the first reference RS (e.g., indicated by the spatial relation information of the SRS resource) to determine a spatial domain transmission filter and/or a beam for the uplink transmission. The one or more configuration parameters 2312 may indicate the indicator/index of the first reference RS.

The first reference RS may be a downlink RS. The downlink RS may comprise a SS/PBCH block. The downlink RS may comprise a CSI-RS (e.g., a periodic CSI-RS, a semi-persistent CSI-RS, an aperiodic CSI-RS). The downlink RS may comprise a DM-RS (e.g., for a PDCCH reception, a PDSCH reception, etc.). The wireless device 2304 may use a spatial domain receiving filter to receive the downlink RS. The wireless device 2304 may transmit the TB with a spatial domain transmission filter that is the same as the spatial domain receiving filter, for example, based on the first reference RS (e.g., indicated by the spatial relation information) being the downlink RS. The wireless device 2304 may send/transmit the TB with the spatial domain receiving filter, for example, based on the first reference RS (e.g., indicated by the spatial relation information) being the downlink RS. The wireless device 2304 may send/transmit the TB based on the spatial domain receiving filter, for example, based on the first reference RS (e.g., indicated by the spatial relation info) being the downlink RS.

The first reference RS may be an uplink RS (e.g., a periodic SRS, a semi-persistent SRS, an aperiodic SRS, and/or a DM-RS). The wireless device may use a spatial domain transmission filter to send/transmit the uplink RS. The wireless device 2304 may send/transmit the TB with a spatial domain transmission filter that is the same as the spatial domain transmission filter used to transmit the uplink RS, for example, based on the first reference RS (e.g., indicated by the spatial relation information) being the uplink RS. The wireless device 2304 may send/transmit the TB based on the spatial domain transmission filter used to transmit the uplink RS, for example based on the first reference RS (e.g., indicated by the spatial relation info) being the uplink RS.

The SRI field may indicate (or be mapped to) a power control parameter set of the plurality of power control parameter sets. A value of the SRI field may indicate (or be mapped to) the power control parameter set of the plurality of power control parameter sets. The SRI field may indicate a power control indicator/index of the power control parameter set. A value of the SRI field may indicate (or be mapped to) the power control index (e.g., provided by a higher layer parameter sri-PUSCH-PowerControlId) of the power control parameter set.

The power control parameter set may comprise a pathloss reference RS indicator/index (e.g., provided by a higher layer parameter sri-PUSCH-PathlossReferenceRS-Id) indicating (or mapped to) a first pathloss reference RS. The pathloss reference RS index may identify a pathloss reference RS set, of the one or more pathloss reference RS sets, indicating the first pathloss reference RS. The SRI field may indicate (or associated with or mapped, via the power control parameter set, to) the pathloss reference RS index of (or identifying) the pathloss reference RS set indicating the first pathloss reference RS. A value of the SRI field in the DCI may be mapped to the pathloss reference RS index of the pathloss reference RS set indicating (or associated with or mapped to) the first pathloss reference RS. The power control parameter set indicated by the SRI field may comprise the pathloss reference RS index of (or indicating/identifying) the pathloss reference RS set. The wireless device 2304 may determine (e.g., step 2324) the first pathloss reference RS from a value of the pathloss reference RS index that is mapped to the SRI field. The value of the pathloss reference RS index and the SRI field may be mapped from the power control index of the power control parameter set. The first pathloss reference RS (corresponding to the power control parameter set indicated by the SRI field) and the first reference RS (corresponding to the spatial relation information of the SRS resource indicated by the SRI field) may be aligned (e.g., may have similar or substantially similar spatial domain characteristics).

The wireless device 2304 may determine a transmission power for the TB based on the first pathloss reference RS. The determining the transmission power for the TB based on the first pathloss reference RS may comprise determining/calculating a downlink pathloss estimate for the transmission power based on (e.g., measuring) the first pathloss reference RS.

The wireless device 2304 may send/transmit the TB based on the determined/calculated transmission power. The wireless device 2304 may send/transmit the TB with the transmission power. The wireless device may send/transmit the TB based on the downlink pathloss estimate. The wireless device 2304 and/or the base station 2308 may perform one or more operations described above with reference to FIGS. 17-21, for example, if sending/transmitting the TB between $T_0$ and $T_1$, or before $T_1$.

The wireless device may receive (e.g., at or after time T1) the first update message 2316 (e.g., a MAC CE). The first update message 2316 may update the spatial relation information of the SRS resource. The (updated) spatial relation information of the SRS resource may comprise a second indicator/index of a second reference RS (e.g., ssb-Index, csi-RS-Index, srs). The second reference RS may be different from the first reference RS. The second index may be different from the index of the first reference RS. The updating the spatial relation information of the SRS resource may comprise changing/updating the index of the reference RS, in the spatial relation information, to the second index of the second reference RS. The updating the spatial relation information of the SRS resource may comprise changing/updating the reference RS, in the spatial relation information, to the second reference RS. The one or more configuration parameters 2312 may indicate the second index for the second reference RS.

The wireless device 2304 may send (e.g., transmit) a TB on an (active) uplink BWP of an uplink carrier (e.g., a NUL carrier, a SUL carrier) of the cell. The TB may correspond to a PUSCH transmission (e.g., uplink data). The wireless device 2304 may send/transmit the TB, for example, after the receiving (or activating) the first update message 2316 updating the spatial relation information of the SRS resource (e.g., after $T_1$, or between $T_1$ and $T_2$). The wireless device 2304 may send/transmit the TB, for example, before receiving a second update message (e.g., a MAC CE, RRC reconfiguration message, etc.) updating a pathloss reference RS.

The wireless device 2304 may send/transmit the TB based on a configured uplink grant (e.g., configured grant type 1, configured grant type 2). The wireless device 2304 may receive DCI. The DCI may schedule a transmission of the TB. The DCI may have an SRI field. The SRI field may indicate (or be mapped to) the SRS resource of the one or more SRS resources.

The spatial relation information of the SRS resource may provide/indicate a spatial setting for an uplink transmission (e.g., a PUSCH transmission, a PUCCH transmission, an SRS, and/or the TB). The spatial relation information may indicate/comprise the second index of the second reference RS indicated/updated by the first update message 2316 (e.g., at or after time $T_1$). The second reference RS may be for (e.g., to determine) a spatial domain transmission filter. The wireless device 2304 may use the second reference RS (e.g., indicated by the spatial relation information of the SRS resource) to determine a spatial domain transmission filter. The wireless device 2304 may send/transmit the TB (e.g., after $T_1$, or between $T_1$ and $T_2$) with the spatial domain transmission filter that is the same as a spatial domain receiving/transmitting filter used to receive/transmit the second reference RS. The wireless device 2304 may send/transmit the TB (e.g., after $T_1$, or between $T_1$ and $T_2$) with the spatial domain transmission filter that is based on a spatial domain receiving/transmitting filter used to receive/transmit the second reference RS.

The SRI field may indicate (or be mapped to) the power control parameter set of the plurality of power control parameter sets. The power control parameter set may comprise the pathloss reference RS indicator/index (e.g., provided by a higher layer parameter sri-PUSCH-PathlossReferenceRS-Id) indicating (or mapped to) the first pathloss reference RS. The first pathloss reference RS (corresponding to the power control parameter set indicated by the SRI field) and the second reference RS (corresponding to the spatial relation information of the SRS resource indicated by the SRI field) may not be aligned (e.g., may have different spatial domain characteristics, correspond to different directions) due to the update of the spatial relation information caused by the first update message 2316. The wireless device 2304 may inaccurately determine a transmission power for the TB, due to the misalignment between the first pathloss reference RS and the second reference RS, for example, if the wireless device 2304 uses the first pathloss reference RS corresponding to the SRI field.

The wireless device 2304 may use (e.g., at step 2328) the second reference RS as a pathloss reference RS to determine a transmission power. The wireless device 2304 may determine the transmission power for the TB based on the second reference RS indicated/updated by the first update message 2316. The wireless device 2304 may determine the transmission power for the TB based on the second reference RS. The wireless device 2304 may determine the transmission power for the TB based on the second reference RS, for example, based on the receiving the first update message 2316 and not receiving (and/or activating) a second update message (e.g., MAC CE, RRC reconfiguration, etc.) updating a pathloss reference RS. The wireless device 2304 may determine the transmission power for the TB based on the second reference RS for a time period until a reception and/or activation of the second update message (e.g., between time $T_1$ and time $T_2$). The wireless device 2304 may not determine the transmission power for the TB based on the first pathloss reference RS for a time period until the reception and/or activation of the second update message (e.g., between time $T_1$ and time $T_2$).

The wireless device 2304 may send/transmit the TB based on the determined/calculated transmission power. The determining the transmission power for the TB based on the second reference RS may comprise determining/calculating a downlink pathloss estimate for the transmission power based on (e.g., measuring) the second reference RS. The wireless device 2304 may send/transmit the TB based on the downlink pathloss estimate.

The wireless device 2304 may receive (and/or activate) a second update message 2320 (e.g., a MAC CE, an RRC reconfiguration message, etc.), for example, at or after time T2. The second update message 2320 may update the first pathloss reference RS indicated by the power control parameter set. The second update message 2320 may update the first pathloss reference RS in the pathloss reference RS set indicated by the power control parameter set. A pathloss reference RS index in the power control parameter set may identify the pathloss reference RS set, of the one or more pathloss reference RS sets, indicating the first pathloss reference RS. The updating the first pathloss reference RS may comprise that the pathloss reference RS set indicates/comprises a second index of a second pathloss reference RS. The second index may be different from the index of the first pathloss reference RS. The second pathloss reference RS may be different from the first pathloss reference RS. The updating the first pathloss reference RS may comprise changing/updating the index of the first pathloss reference RS in the pathloss reference RS set to the second index of the second pathloss reference RS. The updating the first pathloss reference RS may comprise changing/updating the first pathloss reference RS in the pathloss reference RS set to the second pathloss reference RS.

The wireless device 2304 may send (e.g., transmit) a TB on an (active) uplink BWP of an uplink carrier (e.g., a NUL carrier, a SUL carrier) of the cell. The TB may correspond to a PUSCH transmission (e.g., uplink data). The wireless device 2304 may send/transmit the TB, for example, after the receiving (and/or activating) the second update message 2320 updating the first pathloss reference RS to the second pathloss reference RS (e.g., at or after $T_2$). The wireless device 2304 may send/transmit the TB based on a configured uplink grant (e.g., configured grant type 1, configured grant type 2).

The wireless device may receive DCI. The DCI may schedule a transmission of the TB. The DCI may comprise an SRI field. The SRI field may indicate (or be mapped to) the SRS resource of the one or more SRS resources.

The spatial relation information of the SRS resource may provide/indicate a spatial setting for an uplink transmission (e.g., a PUSCH transmission, a PUCCH transmission, an SRS, and/or the TB). The spatial relation information may indicate/comprise the second index of the second reference RS (e.g., as indicated/updated by the first update message 2316). The wireless device 2304 may send/transmit the TB with a spatial domain transmission filter that is the same as a spatial domain receiving/transmitting filter used to receive/transmit the second reference RS. The wireless device 2304 may transmit the TB with a spatial domain transmission filter that is based on a spatial domain receiving/transmitting filter used to receive/transmit the second reference RS.

The SRI field may indicate (or be mapped to) the power control parameter set of the plurality of power control parameter sets. The power control parameter set may comprise a pathloss reference RS index (e.g., provided by a higher layer parameter sri-PUSCH-PathlossReferenceRS-Id), indicating (or mapped to) the second pathloss reference RS, indicated/updated by the second update message 2320. The pathloss reference RS index may identify the pathloss reference RS set, of the one or more pathloss reference RS sets, indicating the second pathloss reference RS. The SRI field may indicate (or be associated with or be mapped, via the power control parameter set, to) the pathloss reference RS index of (or identifying) the pathloss reference RS set indicating the second pathloss reference RS. A value of the SRI field may be mapped to the pathloss reference RS index of the pathloss reference RS set indicating (or associated with or mapped to) the second pathloss reference RS. The power control parameter set indicated by the SRI field may comprise the pathloss reference RS index of (or indicating/identifying) the pathloss reference RS set. The wireless device 2304 may determine the second pathloss reference RS from a value of the pathloss reference RS index that is mapped to the SRI field. The value of the pathloss reference RS index and the SRI field may be mapped from the power control index of the power control parameter set.

The wireless device 2304 may determine a transmission power for the TB based on the second pathloss reference RS. The determining the transmission power for the TB based on the second pathloss reference RS may comprise calculating a downlink pathloss estimate for the transmission power based on (e.g., measuring) the second pathloss reference RS. The wireless device 2304 may send/transmit the TB based on the determined/calculated transmission power. The wireless device 2304 may send/transmit the TB with the transmission power. The wireless device 2304 may send/transmit the TB based on the downlink pathloss estimate.

Figure 24:
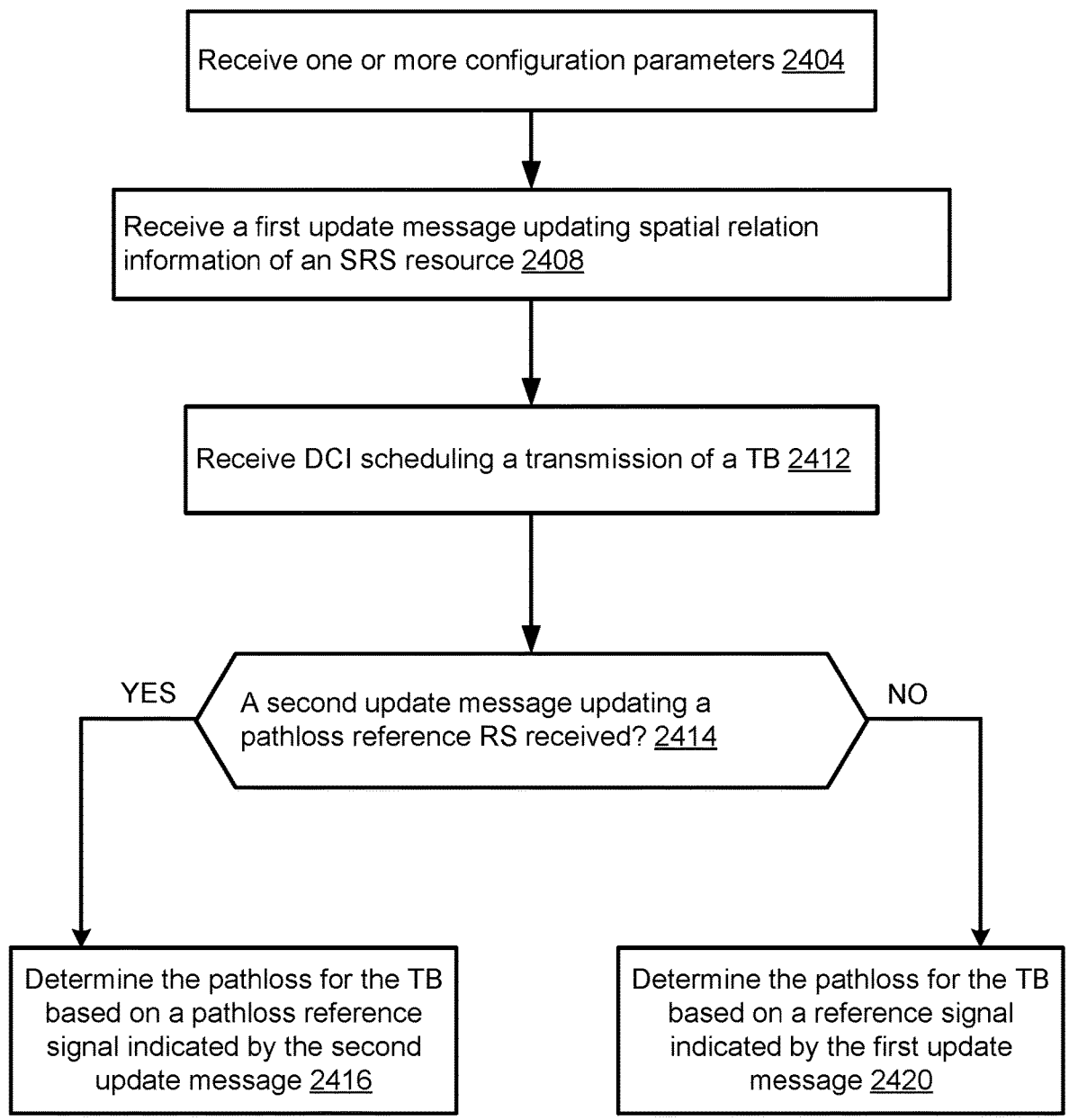
FIG. 24 shows an example method for transmission power control.

FIG. 24 shows an example method for transmission power control. The wireless device(s) 1804, 1904, and/or 2304 may perform an example method 2300. At step 2404, a wireless device may receive (e.g., from a base station) one or more messages comprising one or more configuration parameters for a cell. The one or more configuration parameters may comprise/indicate a plurality of power control parameter sets. The one or more configuration parameters may indicate at least one SRS resource set. The at least one SRS resource set may comprise one or more SRS resources.

At step 2408, the wireless device may receive (or activate) a first update message (e.g., a MAC CE). The wireless device may receive the first update message from the base station. The first update message may update spatial relation information of an SRS resource of the one or more SRS resources.

At step 2412, the wireless device may receive (e.g., from the base station) DCI. The DCI may schedule a transmission of a TB (e.g., a PUSCH transmission). The DCI may comprise an SRI field. The SRI field may indicate (or be mapped to) the SRS resource of the one or more SRS resources. A value of the SRI field may indicate (or be mapped to) the SRS resource of the one or more SRS resources. The SRI field may indicate (or be mapped to) a power control parameter set of the plurality of power control parameter sets. The value of the SRI field may indicate (or be mapped to) the power control parameter set of the plurality of power control parameter sets. The power control parameter set may be mapped to or indicate a first pathloss reference RS.

At step 2414, the wireless device may determine whether a second update message updating the pathloss reference RS indicated by the power control parameter set is received (or activated) or not. The determining whether the second update message is received or not may comprise determining whether the second update message is received (or activated) or not after the receiving (or activating) the first update message. The determining whether the second update message is received (or activated) or not may comprise determining whether the second update message is received or not before the receiving the DCI. The determining whether the second update message is received (or activated) or not may comprise determining whether the second update message is received (or activated) or not before a slot in which the TB is scheduled to be transmitted. The determining whether the second update message is received (or activated) or not may comprise determining whether the second update message is received (or activated) or not until a slot in which the TB is scheduled to be transmitted.

The wireless device may determine that the second update message updating the pathloss reference RS indicated by the power control parameter set is (or has been) received (or activated). The second update message may change/update the pathloss reference RS (in a pathloss reference RS set mapped to the power control parameter set) to a second pathloss reference RS. At step 2416, the wireless device may determine a transmission power for the TB based on the second pathloss reference RS indicated/updated by the second update message, for example, based on the determining that the second update message updating the pathloss reference RS indicated by the power control parameter set is (or has been) received (or activated). The determining the transmission power for the TB based on the second pathloss reference RS may comprise determining/calculating a downlink pathloss estimate for the transmission power based on (e.g., measuring) the second pathloss reference RS. The wireless device may send/transmit the TB (e.g., to the base station) based on the determined/calculated transmission power.

The wireless device may determine that the second update message updating the pathloss reference RS indicated by the power control parameter set is not (or has not been) received (or activated). At step 2420, the wireless device may determine a transmission power for the TB based on a reference RS indicated/updated by the first update message, for example, based on the determining. The determining the transmission power for the TB based on the reference RS may comprise determining/calculating a downlink pathloss estimate for the transmission power based on (e.g., measuring) the reference RS. The wireless device may send/transmit the TB (e.g., to the base station) based on the determined/calculated transmission power.

The wireless device may support beam correspondence. A transmit/receive (Tx/Rx) beam correspondence at the wireless device may hold. A Tx/Rx beam correspondence at the base station (e.g., or a TRP) may hold. The wireless device may use a Tx/Rx beam correspondence, for example, for uplink and/or downlink transmissions.

Figure 25:
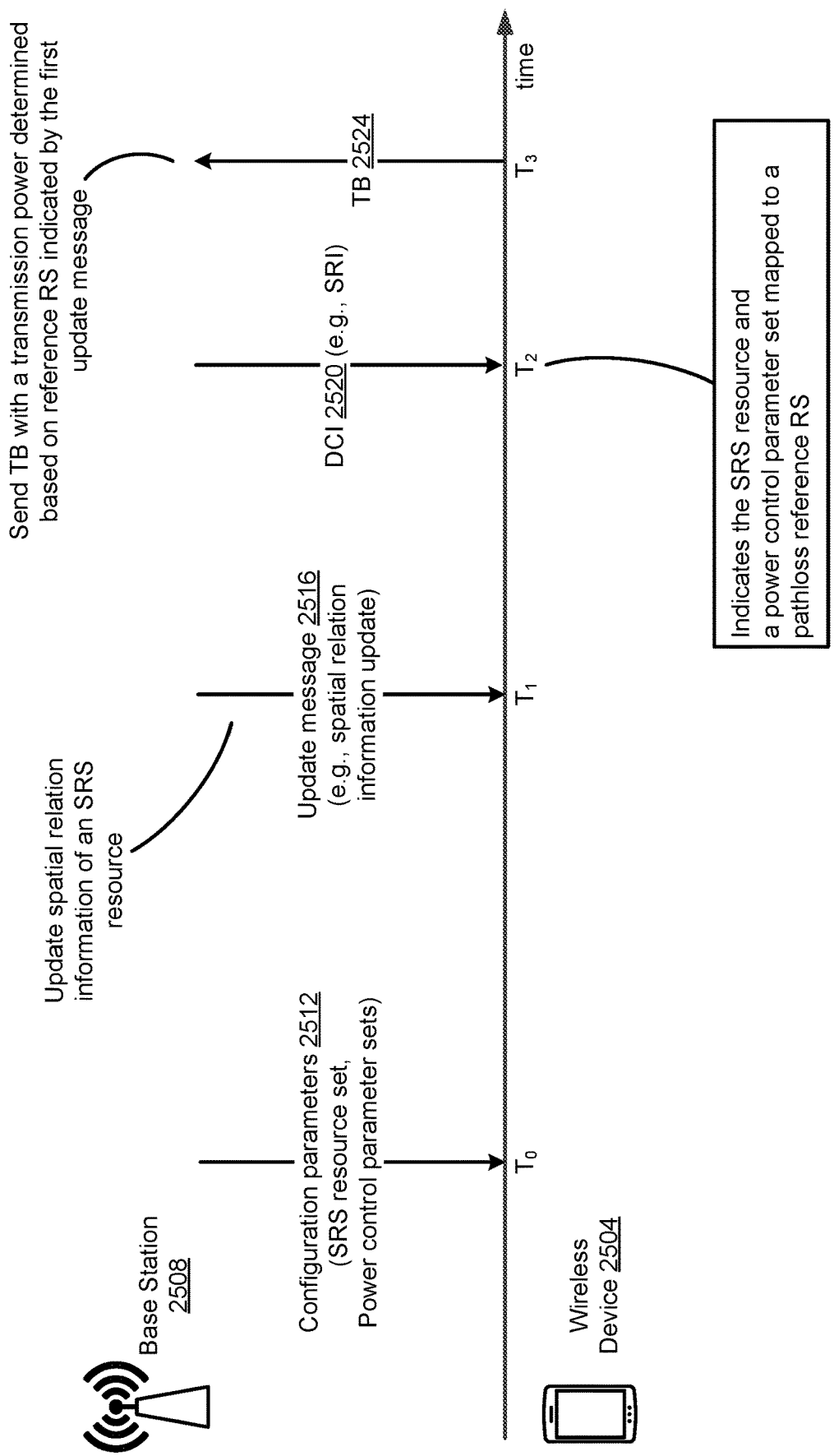
FIG. 25 shows example communications for transmission power control comprising messaging for updating spatial relation information and/or a power control parameter set.

FIG. 25 shows example communications for transmission power control comprising messaging for updating spatial relation information and/or a power control parameter set. A wireless device 2504 may update a pathloss RS, corresponding to a power control parameter set, based on receiving (e.g., from a base station 2508) a message updating spatial relation information. The wireless device 2504 may update a power control parameter set to indicate a reference RS corresponding to updated spatial relation information. The wireless device 2504 may use the reference RS to determine both transmission power and the spatial domain transmission filter for an uplink transmission.

The wireless device 2504 may (e.g., at or after time $T_0$) receive, from a base station 2508, one or more messages. The one or more messages may comprise one or more configuration parameters 2512. The wireless device 2504 and/or the base station 2508 may perform one or more operations described with reference to the wireless device 2204 and/or the base station 2208, respectively, between times $T_0$ and $T_1$.

The wireless device 2504 may receive (e.g., at or after time $T_1$) an update message 2516 (e.g., a MAC CE). The update message 2516 may update the spatial relation information of an SRS resource, for example, in a manner as described above with reference to FIG. 23. The update message 2516 may update the spatial relation information of the SRS resource to indicate a second reference RS that is different from a reference RS (e.g., as initially configured by the one or more configuration parameters 2512 or activated by a previous MAC CE, if any). The update message 2516 may comprise an indication of the second reference RS.

The wireless device 2504 may change/update a pathloss reference RS in a pathloss reference set indicated by (or mapped to) a power control parameter set, for example, based on the receiving the update message 2516 updating the spatial relation information of the SRS resource. The pathloss reference RS may correspond to a first index. The power control parameter set and the SRS resource may be associated with a same SRI. The power control parameter set may indicate (or be mapped to) the pathloss reference RS set indicating the pathloss reference RS. A pathloss reference RS index in the power control parameter set may indicate/identify the pathloss reference RS set, of one or more pathloss reference RS sets, indicating the pathloss reference RS. The updating/changing the pathloss reference RS in the pathloss reference RS set may comprise that the pathloss reference RS set indicates/comprises a second index of the second reference RS (e.g., as indicated/updated by the update message 2516). The updating/changing the pathloss reference RS in the pathloss reference RS set may comprise changing/updating the first index of the pathloss reference RS in the pathloss reference RS set to the second index of the second reference RS (e.g., indicated/updated by the update message 2516). The updating/changing the pathloss reference RS in the pathloss reference RS set may comprise changing/updating the pathloss reference RS in the pathloss reference RS set to the second reference RS indicated by the update message 2516.

The wireless device 2504 may receive, from the base station 2508, DCI 2520 (e.g., at or after time T2). An SRI field in the DCI 2520 may indicate (or be mapped) to the SRS resource and the power control parameter set. A value of the SRI field in the DCI 2520 may indicate (or be mapped to) the power control parameter set. The value of the SRI field in the DCI 2520 may indicate (or be mapped to) the SRS resource. The SRI field may indicate a power control index of the power control parameter set. The value of the SRI field may indicate (or be mapped to) the power control index of the power control parameter set. The SRI field may indicate an SRS resource index of the SRS resource. The value of the SRI field may indicate (or be mapped to) the SRS resource index of the SRS resource. The SRS resource index and the power control index may be the same. The SRS resource index and the power control index may be different. The wireless device 2504 may change/update the pathloss reference RS in the pathloss reference set indicated by (or mapped to) the power control parameter set, for example, based on the receiving the update message 2516 updating the spatial relation information of the SRS resource, indicated by the SRI field, to the second reference RS.

The second reference RS indicated by the update message 2516 may be a downlink RS. The downlink RS may comprise a SS/PBCH block. The downlink RS may comprise a CSI-RS (e.g., a periodic CSI-RS, a semi-persistent CSI-RS, an aperiodic CSI-RS). The downlink RS may comprise a DM-RS (e.g., for PDCCH reception, for PDSCH reception, etc.).

The pathloss reference RS in the pathloss reference RS set and the second reference RS indicated by the update message 2516 may be quasi co-located. The pathloss reference RS and the second reference RS may be quasi co-located with QCL TypeD. The pathloss reference RS and the second reference RS may be quasi co-located with a QCL type (e.g., QCL TypeD, QCL TypeA, or other QCL types).

The wireless device 2504 may send (e.g., transmit) a TB 2524 on an (active) uplink BWP of an uplink carrier (e.g., a NUL carrier, a SUL carrier) of the cell (e.g., at or time T3). The TB 2524 may correspond to a PUSCH transmission (e.g., uplink data). The wireless device 2504 may send/ transmit the TB 2524, for example, after the receiving (or activating) the update message 2516 updating the spatial relation information of the SRS resource. The wireless device 2504 may send/transmit the TB 2524, for example, based on receiving the DCI 2520.

The wireless device 2504 may transmit the TB 2524 based on a configured uplink grant (e.g., configured grant type 1, configured grant type 2). The DCI 2520 may schedule a transmission of the TB 2524. The DCI 2520 may comprise an SRI field. The SRI field may indicate (or be mapped to) the SRS resource of the one or more SRS resources. The SRI field may indicate (or be mapped to) the power control parameter set of the plurality of power control parameter sets.

The wireless device 2504 may determine a transmission power for the TB 2524 using the second reference RS, for example, based on the updating the pathloss reference RS, indicated by the power control parameter set, to the second reference RS indicated by the update message 2516. The determining the transmission power for the TB 2524 based on the second reference RS may comprise determining/calculating a downlink pathloss estimate for the transmission power based on (e.g., measuring) the second reference RS. The wireless device 2504 may send/transmit the TB 2524 based on the determined/calculated transmission power (at time $T_3$). The wireless device 2504 may send/transmit the TB 2524 based on the downlink pathloss estimate.

The wireless device 2504 may use the second reference RS to determine a spatial domain transmission filter. The wireless device may send/transmit (e.g., at or after time $T_3$) the TB 2524 with the spatial domain transmission filter that is the same as a spatial domain receiving/transmitting filter used to receive/transmit the second reference RS. The wireless device 2504 may send/transmit the TB 2524 with the spatial domain transmission filter that is based on a spatial domain receiving/transmitting filter used to receive/transmit the second reference RS.

A wireless device may perform a downlink measurement on one or more send/transmit (Tx) beams of a TRP. The TRP may perform an uplink measurement on one or more receive (Rx) beams of the TRP. A Tx/Rx beam correspondence at the TRP may hold, for example, if the TRP determines an Rx beam of the TRP for an uplink reception based on the downlink measurement at the wireless device. A Tx/Rx beam correspondence at the TRP may hold when the TRP determines an Tx beam of the TRP for a downlink transmission based on the uplink measurement at the TRP.

A wireless device may perform a downlink measurement on one or more Rx beams of the wireless device. The TRP may perform an uplink measurement on one or more Tx beams of the wireless device. The TRP may send an indication of the uplink measurement to the wireless device. A Tx/Rx beam correspondence at the wireless device may hold, for example, if the wireless device determines a Tx beam of the wireless device for an uplink transmission based on the downlink measurement at the wireless device. A Tx/Rx beam correspondence at the wireless device may hold when the wireless device determines an Rx beam of the wireless device for a downlink reception based on the indication of the uplink measurement.

A base station may use a Tx beam in a downlink transmission for an Rx beam in an uplink reception, for example, if a Tx/Rx beam correspondence holds. A wireless device may use an Rx beam in a downlink reception for a Tx beam in an uplink transmission, for example, if a Tx/Rx beam correspondence holds.

Separate transmit antennas and receive antennas may be used for transmissions and receptions, respectively. The transmit antennas and the receive antennas may not share physical antenna elements, for example, based on the separating the transmit and receive antennas. An angle of arrival and an angle of departure may be different, for example, if the transmit antennas and the receive antennas do not share physical antenna elements. A Tx/Rx beam correspondence may not hold, for example, if the transmit antennas and the receive antennas do not share physical antenna elements.

An angle of arrival and an angle of departure may be the same, for example, if the transmit antennas and the receive antennas share physical antenna elements. A Tx/Rx beam correspondence may hold, for example, if the angle of arrival and the angle of departure are different.

A Tx/Rx beam correspondence may require a calibration of an antenna array at a wireless device. Some UEs may not use the Tx/Rx beam correspondence because the calibration of the antenna array may be difficult to achieve. A capability indication or a signaling mechanism may be needed to differentiate wireless devices that may use the Tx/Rx beam correspondence (and can skip UL beam sweeping) and wireless devices that may not use the Tx/Rx beam correspondence. A wireless device may send (e.g., transmit), to a TRP (or a base station), a capability indication of a Tx/Rx beam correspondence at the wireless device. The wireless device may report the capability indication of the Tx/Rx beam correspondence to the TRP, for example, during an initial access stage.

Figure 26:
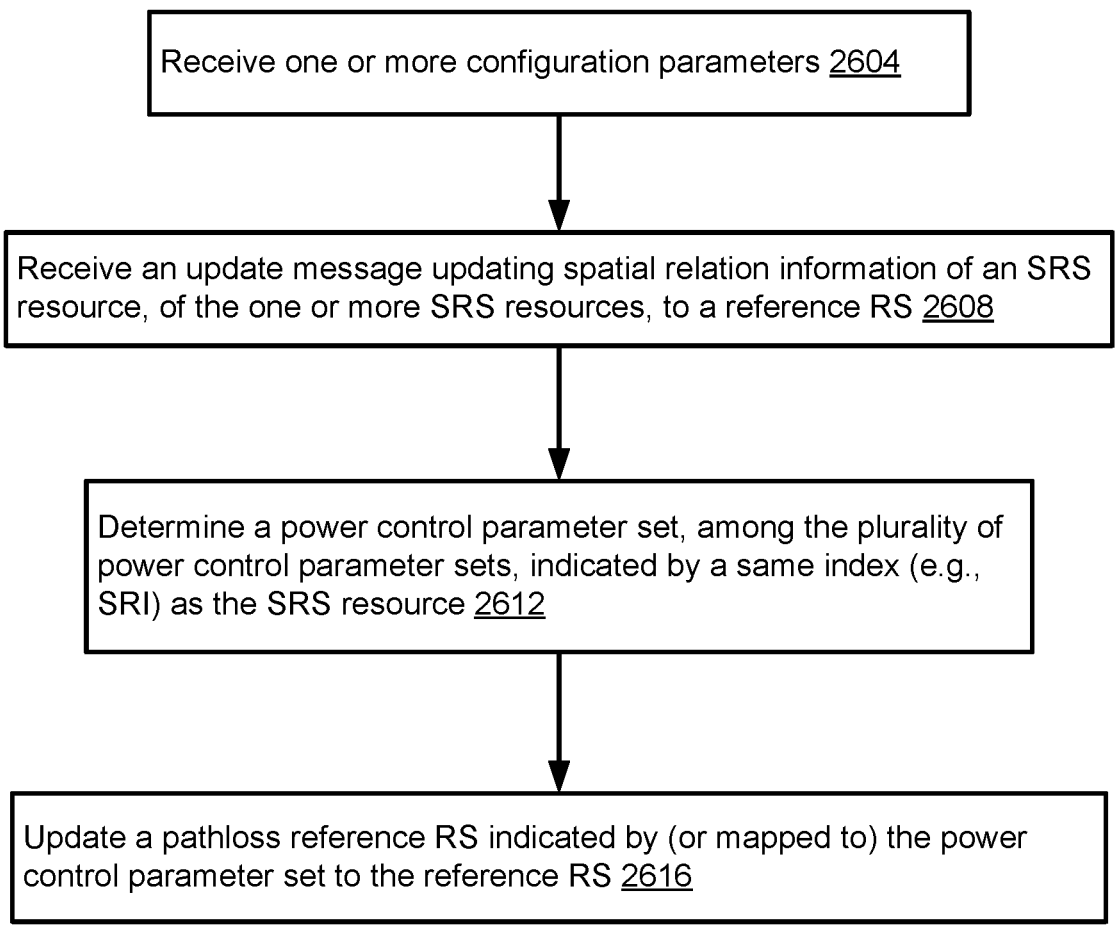
FIG. 26 shows an example method for updating a power control parameter set.

FIG. 26 shows an example method for updating a power control parameter set. The wireless device(s) 1804, 1904, 2304, and/or 2504 (and/or any other wireless device described herein) may perform an example method 2600. At step 2604, a wireless device may receive (e.g., from a base station) one or more messages comprising one or more configuration parameters for a cell. The one or more configuration parameters may comprise/indicate a plurality of power control parameter sets. The one or more configuration parameters may indicate at least one SRS resource set. The at least one SRS resource set may comprise one or more SRS resources.

At step 2608, the wireless device may receive (or activate) an update message (e.g., a MAC CE). The wireless device may receive the update message from the base station. The update message may update spatial relation information of an SRS resource of the one or more SRS resources. The spatial relation information may be updated to indicate a new reference RS.

At step 2612, the wireless device may determine a power control parameter set, among the plurality of power control parameter sets, that is indicated by a same index/indicator as the SRS resource. The power control parameter set and the SRS resource may be associated with a same SRI. At step 2616, the wireless device may update a pathloss reference RS indicated by (or mapped to) the power control parameter set to the new reference RS. The wireless device may use the new reference RS for determining a transmission power of an uplink transmission.

A wireless device may perform a method comprising multiple operations. The wireless device may receive one or more messages comprising one or more configuration parameters indicating a plurality of power control parameter sets for physical uplink shared channel (PUSCH) transmissions, wherein each of the plurality of power control parameter sets is mapped to a respective power control parameter set index. The wireless device may receive downlink control information (DCI) scheduling transmission of a transport block, wherein the DCI is in a format that does not comprise a sounding reference signal resource indicator (SRI) field. The wireless device may, based on the DCI being in a format that does not comprise an SRI field, determine a transmission power for the transport block based on a pathloss reference signal associated with a power control parameter set indicated by a lowest power control parameter set index of power control parameter set indexes of the plurality of power control parameter sets. The wireless device may transmit the transport block using the determined transmission power. The wireless device may also perform one or more additional operations. Each of the plurality of power control parameter sets may be associated with at least one pathloss reference signal of a plurality of pathloss reference signals. The wireless device may receive second DCI activating a configured uplink grant, wherein the second DCI is in a format that does not comprise an SRI field. The wireless device may, based on the second DCI being in a format that does not comprise an SRI field, determine a second transmission power of a second transport block for the configured uplink grant based on the pathloss reference signal. The wireless device may transmit the second transport block using the second transmission power. The wireless device may receive a message activating at least one power control parameter set of the plurality of power control parameter sets, wherein the at least one power control parameter set comprises the power control parameter set with the lowest power control parameter set index. The wireless device may receive a message indicating at least one power control parameter set of the plurality of power control parameter sets, wherein the receiving the DCI comprises receiving the DCI after receiving the message indicating the at least one power control parameter set. The wireless device may receive second DCI scheduling transmission of a second transport block, wherein the second DCI indicates an SRI that is mapped to a second power control parameter set of the plurality of power control parameter sets. The wireless device may determine a second transmission power of the second transport block based on a second pathloss reference signal indicated by the second power control parameter set. The wireless device may transmit the second transport block using the second transmission power. The wireless device may receive a message indicating at least one power control parameter set of the plurality of power control parameter sets. The wireless device may, before the receiving the message, determine a default pathloss reference signal of a plurality of pathloss reference signals associated with the plurality of power control parameter sets. The wireless device may transmit an uplink signal using a transmission power based on the default pathloss reference signal. The lowest power control parameter set index may be equal to zero. The power control parameter set may comprise a path loss reference signal index indicating the path loss reference signal. The determining the transmission power based on the path loss reference signal may comprise determining the transmission power based on calculating a downlink path loss estimate of the path loss reference signal. The one or more configuration parameters may be for the PUSCH transmissions via an uplink bandwidth part (BWP) of a cell. The wireless device may activate the uplink BWP as an active uplink BWP of the cell. The transmitting the transport block may be via the active uplink BWP. The power control parameter set may be an SRI PUSCH power control. The one or more configuration parameters may indicate a plurality of uplink resources, wherein each of the plurality of uplink resources may be mapped to a respective uplink resource index. The wireless device may, based on the DCI being in the format that does not comprise the SRI field, determine an uplink resource with a lowest uplink resource index of uplink resource indexes of the plurality of uplink resources. The transmitting the transport block may comprise transmitting the transport block using the determined uplink resource. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive one or more messages comprising one or more configuration parameters indicating a plurality of power control parameter sets for physical uplink shared channel (PUSCH) transmissions, wherein each of the plurality of power control parameter sets is mapped to a respective power control parameter set index. The wireless device may receive downlink control information (DCI) scheduling transmission of a transport block, wherein the DCI is in a format that does not comprise a sounding reference signal resource indicator (SRI) field. Based on the DCI being in a format that does not comprise an SRI field, the wireless device may determine a pathloss reference signal indicated by a lowest power control parameter set index of power control parameter set indexes of the plurality of power control parameter sets. The wireless device may transmit the transport block using a transmission power based on the pathloss reference signal. The wireless device may also perform one or more additional operations. The wireless device may determine the transmission power based on a downlink pathloss estimate of the pathloss reference signal. Each of the plurality of power control parameter sets may be associated with at least one pathloss reference signal of a plurality of pathloss reference signals. The wireless device may receive a message activating at least one power control parameter set of the plurality of power control parameter sets, wherein the at least one power control parameter set comprises the power control parameter set with the lowest power control parameter set index. The wireless device may receive a message indicating at least one power control parameter set of the plurality of power control parameter sets, wherein the receiving the DCI comprises receiving the DCI prior to receiving the message indicating the at least one power control parameter set. The wireless device may receive second DCI scheduling transmission of a second transport block, wherein the second DCI indicates an SRI that is mapped to a second power control parameter set of the plurality of power control parameter sets. The wireless device may determine a second transmission power of the second transport block based on a second pathloss reference signal indicated by the second power control parameter set. The wireless device may transmit the second transport block using the second transmission power. The lowest power control parameter set index may be equal to zero. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the DCI. A computer-readable medium may store instructions that, when executed, cause performance of the described method, additional operations and/or include the additional elements.

A wireless device may perform a method comprising multiple operations. The wireless device may receive one or more messages comprising one or more configuration parameters indicating a plurality of power control parameter sets for physical uplink shared channel (PUSCH) transmissions, wherein each of the plurality of power control parameter sets is mapped to a respective power control parameter set index. The wireless device may determine a default pathloss reference signal of a plurality of pathloss reference signals, wherein each of the plurality of pathloss reference signals is associated with a respective power control parameter set of the plurality of power control parameter sets. The wireless device may transmit a first transport block using a transmission power based on the default pathloss reference signal. The wireless device may receive a control message indicating at least one power control parameter set of the plurality of power control parameter sets. The wireless device may, after the receiving the control message, transmit a second transport block using a transmission power based on at least one pathloss reference signal associated with the at least one power control parameter set. The wireless device may also perform one or more additional operations. The wireless device may after the receiving the control message and before the transmitting the second transport block, receive downlink control information (DCI) scheduling transmission of the second transport block, wherein the DCI is in a format that does not comprise a sounding reference signal resource indicator (SRI) field. The wireless device may determine the at least one pathloss reference signal based on a lowest power control parameter set index of power control parameter set indexes of the plurality of power control parameter sets. The default pathloss reference signal may be indicated by a lowest power control parameter set index of power control parameter set indexes of the plurality of power control parameter sets. The lowest power control parameter set index may be equal to zero. The default pathloss reference signal may be at least one of: a reference signal used to receive a master information block (MIB); or a reference signal used in a latest random access procedure. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the control message. A computer-readable medium may store instructions that, when executed, cause performance of the described method, additional operations and/or include the additional elements.

A wireless device may perform a method comprising multiple operations. The wireless device may receive first downlink control information (DCI) for scheduling transmission of a first transport block, wherein the first DCI comprises a first sounding reference signal resource indicator (SRI) field indicating a power control parameter set. The wireless device may determine, based on a first reference signal mapped to the power control parameter set, a first transmission power for a scheduled transmission of the first transport block. The wireless device may transmit the first transport block using the first transmission power. The wireless device may, based on receiving a medium access control (MAC) control element (CE) indicating a second reference signal, map the second reference signal to the power control parameter set. The wireless device may receive second DCI for scheduling transmission of a second transport block, wherein the second DCI comprises a second SRI field indicating the power control parameter set. The wireless device may determine, based on the second reference signal, a second transmission power for a scheduled transmission of the second transport block. The wireless device may transmit the second transport block using the second transmission power. The wireless device may also perform one or more additional operations. The wireless device may receive one or more messages comprising one or more configuration parameters indicating a plurality of power control parameter sets comprising the power control parameter set. The first SRI field may indicate a resource mapped to a third reference signal. The transmitting the first transport block may comprise transmitting the first transport block using a spatial domain transmission filter based on the third reference signal. The transmitting the second transport block may comprise transmitting the second transport block using a spatial domain transmission filter based on the second reference signal. The determining the first transmission power may be further based on determining a downlink pathloss estimate of the first reference signal. The determining the second transmission power may be further based on determining a downlink pathloss estimate of the second reference signal. The mapping may comprise mapping a path loss reference signal (RS) index in the power control parameter set to a path loss reference RS that indicates the second reference signal. The wireless device may, based on the receiving the MAC CE indicating the second reference signal, map the second reference signal to spatial relation information associated with a sounding reference signal (SRS) resource indicated by the second SRI field. A parameter SRI-PUSCH-PowerControl may indicate the power control parameter set, and a parameter PUSCH-Pathloss-ReferenceRS-Id may indicate the second reference signal. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first DCI. A computer-readable medium may store instructions that, when executed, cause performance of the described method, additional operations and/or include the additional elements.

A wireless device may perform a method comprising multiple operations. The wireless device may receive one or more configuration parameters indicating a plurality of power control parameter sets. The wireless device may receive a medium access control (MAC) control element (CE) indicating a reference signal. The wireless device may map the reference signal to a first power control parameter set of the plurality of power control parameter sets. The wireless device may receive downlink control information (DCI) for scheduling transmission of a transport block, wherein the DCI may comprise a sounding reference signal resource indicator (SRI) field indicating the first power control parameter set. The wireless device may determine, based on the reference signal, a transmission power for a scheduled transmission of the transport block. The wireless device may transmit the transport block using the transmission power. The wireless device may receive DCI for scheduling transmission of an uplink signal, wherein the DCI for scheduling transmission of the uplink signal may comprise the SRI field indicating the first power control parameter set. The wireless device may determine, based on a second reference signal mapped to the first power control parameter set, a second transmission power for a scheduled transmission of the uplink signal. The wireless device may transmit the uplink signal using the second transmission power. The transmitting the transport block may comprise transmitting the transport block using a spatial domain transmission filter based on the reference signal. The determining the transmission power may be further based on determining a downlink pathloss estimate of the reference signal. The SRI field may indicate a sounding reference signal (SRS) resource. The wireless device may, based on the receiving the MAC CE indicating the reference signal, map the reference signal to spatial relation information associated with a sounding reference signal (SRS) resource indicated by the SRI field. A parameter SRI-PUSCH-PowerControl may indicate the first power control parameter set, and a parameter PUSCH-PathlossReferenceRS-Id may indicate the reference signal. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first DCI. A computer-readable medium may store instructions that, when executed, cause performance of the described method, additional operations and/or include the additional elements.

A wireless device may perform a method comprising multiple operations. The wireless device may receive a medium access control (MAC) control element (CE) indicating a reference signal. receiving downlink control information (DCI) for scheduling transmission of a transport block, wherein the DCI comprises a sounding reference signal resource indicator (SRI) field indicating a power control parameter set. The wireless device may determine a transmission power, for a scheduled transmission of the transport block, based on: the power control parameter set; and the reference signal. The wireless device may transmit the transport block using the transmission power. The wireless device may also perform one or more additional operations. The wireless device may receive DCI for scheduling transmission of an uplink signal, wherein the DCI for scheduling transmission of the uplink signal may comprise the SRI field indicating the power control parameter set. The wireless device may determine, based on a second reference signal mapped to the power control parameter set, a second transmission power for a scheduled transmission of the uplink signal. The wireless device may transmit the uplink signal using the second transmission power. The wireless device may, based on the receiving the MAC CE indicating the reference signal, map the reference signal to the power control parameter set, wherein the determining the transmission power may be further based on the mapping. The transmitting the transport block may comprise transmitting the transport block using a spatial domain transmission filter based on the reference signal. The determining the transmission power may be further based on determining a downlink pathloss estimate of the reference signal. The wireless device may, based on the receiving the MAC CE indicating the reference signal, map the reference signal to spatial relation information associated with a sounding reference signal (SRS) resource indicated by the SRI field. A parameter SRI-PUSCH-PowerControl may indicate the power control parameter set, and a parameter PUSCH-PathlossReferenceRS-Id may indicate the reference signal. Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the first DCI. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:
1. A method comprising:
receiving, by a wireless device, first downlink control information (DCI) for scheduling transmission of a first transport block, wherein the first DCI comprises a first sounding reference signal resource indicator (SRI) field indicating a power control parameter set;
determining, based on a first reference signal mapped to the power control parameter set, a first transmission power for a scheduled transmission of the first transport block;
transmitting the first transport block using the first transmission power;
based on receiving a medium access control (MAC) control element (CE) indicating a second reference signal, mapping the second reference signal to the power control parameter set;
receiving second DCI for scheduling transmission of a second transport block, wherein the second DCI comprises a second SRI field indicating the power control parameter set;
determining, based on the second reference signal, a second transmission power for a scheduled transmission of the second transport block; and
transmitting the second transport block using the second transmission power.
2. The method of claim 1, further comprising:
receiving one or more messages comprising one or more configuration parameters indicating a plurality of power control parameter sets comprising the power control parameter set.
3. The method of claim 1, wherein:
the first SRI field indicates a resource mapped to a third reference signal;
the transmitting the first transport block comprises transmitting the first transport block using a spatial domain transmission filter based on the third reference signal; and
the transmitting the second transport block comprises transmitting the second transport block using a spatial domain transmission filter based on the second reference signal.
4. The method of claim 1, wherein:
the determining the first transmission power is further based on determining a downlink pathloss estimate of the first reference signal; and the determining the second transmission power is further based on determining a downlink pathloss estimate of the second reference signal.

5. The method of claim 1, wherein the mapping comprises mapping a pathloss reference reference signal (RS) index in the power control parameter set to the second reference signal.

6. The method of claim 1, further comprising:
based on the receiving the MAC CE indicating the second reference signal, mapping the second reference signal to spatial relation information associated with a sounding reference signal (SRS) resource indicated by the second SRI field.

7. The method of claim 1, wherein a parameter SRI-PUSCH-PowerControl indicates the power control parameter set, and wherein a parameter PUSCH-PathlossReferenceRS-Id indicates the second reference signal.

8. A method comprising:
receiving, by a wireless device, one or more configuration parameters indicating a plurality of power control parameter sets;
receiving a medium access control (MAC) control element (CE) indicating a reference signal;
mapping the reference signal to a first power control parameter set of the plurality of power control parameter sets;
receiving downlink control information (DCI) for scheduling transmission of a transport block, wherein the DCI comprises a sounding reference signal resource indicator (SRI) field indicating the first power control parameter set;
determining, based on the reference signal, a transmission power for a scheduled transmission of the transport block; and
transmitting the transport block using the transmission power.

9. The method of claim 8, further comprising:
receiving DCI for scheduling transmission of an uplink signal, wherein the DCI for scheduling transmission of the uplink signal comprises the SRI field indicating the first power control parameter set;
determining, based on a second reference signal mapped to the first power control parameter set, a second transmission power for a scheduled transmission of the uplink signal; and
transmitting the uplink signal using the second transmission power.

10. The method of claim 8, wherein:
the transmitting the transport block comprises transmitting the transport block using a spatial domain transmission filter based on the reference signal.

11. The method of claim 8, wherein:
the determining the transmission power is further based on determining a downlink pathloss estimate of the reference signal.

12. The method of claim 8, wherein the SRI field indicates a sounding reference signal (SRS) resource.

13. The method of claim 8, further comprising:
based on the receiving the MAC CE indicating the reference signal, mapping the reference signal to spatial relation information associated with a sounding reference signal (SRS) resource indicated by the SRI field.

14. The method of claim 8, wherein a parameter SRI-PUSCH-PowerControl indicates the first power control parameter set, and wherein a parameter PUSCH-PathlossReferenceRS-Id indicates the reference signal.

15. A method comprising:
receiving downlink control information (DCI) for scheduling transmission of a transport block, wherein the DCI comprises a sounding reference signal resource indicator (SRI) field indicating a power control parameter set;
based on receiving a medium access control (MAC) control element (CE) indicating a reference signal, mapping the reference signal to the power control parameter set;
determining a transmission power, for a scheduled transmission of the transport block, based on:
the power control parameter set; and
the reference signal; and
transmitting the transport block using the transmission power.

16. The method of claim 15, further comprising:
receiving DCI for scheduling transmission of an uplink signal, wherein the DCI for scheduling transmission of the uplink signal comprises the SRI field indicating the power control parameter set;
determining, based on a second reference signal mapped to the power control parameter set, a second transmission power for a scheduled transmission of the uplink signal; and
transmitting the uplink signal using the second transmission power.

17. The method of claim 15, further comprising receiving the MAC CE indicating the reference signal.

18. The method of claim 15, wherein:
the transmitting the transport block comprises transmitting the transport block using a spatial domain transmission filter based on the reference signal; and
the determining the transmission power is further based on determining a downlink pathloss estimate of the reference signal.

19. The method of claim 15, further comprising:
based on the receiving the MAC CE indicating the reference signal, mapping the reference signal to spatial relation information associated with a sounding reference signal (SRS) resource indicated by the SRI field.

20. The method of claim 15, wherein a parameter SRI-PUSCH-PowerControl indicates the power control parameter set, and wherein a parameter PUSCH-PathlossReferenceRS-Id indicates the reference signal.

* * * * *

UNITED STATES PATENT AND TRADEMARK OFFICE
CERTIFICATE OF CORRECTION

PATENT NO. : 11,337,163 B2
APPLICATION NO. : 16/935968
DATED : May 17, 2022
INVENTOR(S) : Cirik et al.

Page 1 of 4

It is certified that error appears in the above-identified patent and that said Letters Patent is hereby corrected as shown below:

On the Title Page

Page 2, Column 1, Other Publications, Line 1:
Delete "Dec. 2, 20202" and insert --Dec. 22, 2020-- therefor Page 2, Column 1, Other Publications, Line 31:
Delete "avaluation" and insert --evaluation-- therefor Page 3, Column 2, Other Publications, Line 55:
Delete "Dec. 1, 20208" and insert --Dec. 18, 2020-- therefor In the Specification Column 1, Background, Line 21:
After "device", insert --.-- therefor Column 13, Detailed Description, Line 26:
After "commands", insert --.-- therefor Column 35, Detailed Description, Line 23:
Delete "0<s_id<14)," and insert --0≤s_id<14),-- therefor Column 35, Detailed Description, Line 25:
Delete "0<t_id<80)," and insert --0≤t_id<80),-- therefor Column 35, Detailed Description, Line 26:
Delete "0<f_id<8)," and insert --0≤f_id<8),-- therefor Column 46, Detailed Description, Line 59:
After "running", insert --.-- therefor Signed and Sealed this
Twenty-second Day of August, 2023

Katherine Kelly Vidal
*Director of the United States Patent and Trademark Office*

CERTIFICATE OF CORRECTION (continued)
U.S. Pat. No. 11,337,163 B2

Column 56, Detailed Description, Line 26:
Delete "preset" and insert --present-- therefor Column 61, Detailed Description, Line 67:
Delete "1816" and insert --1812-- therefor Column 62, Detailed Description, Line 3:
Delete "1816" and insert --1812-- therefor Column 62, Detailed Description, Line 6:
Delete "1816" and insert --1812-- therefor Column 62, Detailed Description, Line 9:
Delete "1808" and insert --1804-- therefor Column 62, Detailed Description, Line 12:
Delete "1808" and insert --1804-- therefor Column 62, Detailed Description, Line 14:
Delete "1808" and insert --1804-- therefor Column 62, Detailed Description, Line 17:
Delete "1808" and insert --1804-- therefor Column 63, Detailed Description, Line 5:
Delete "1808" and insert --1804-- therefor Column 63, Detailed Description, Line 15:
Delete "1808" and insert --1804-- therefor Column 63, Detailed Description, Line 18:
Delete "1808" and insert --1804-- therefor Column 63, Detailed Description, Line 21:
Delete "1808" and insert --1804-- therefor Column 65, Detailed Description, Line 27:
After "1816", insert --.-- therefor Column 67, Detailed Description, Line 30:
Delete "1808" and insert --1804-- therefor Column 71, Detailed Description, Line 48:
Delete "T2)" and insert --$T_2$)-- therefor

CERTIFICATE OF CORRECTION (continued)
U.S. Pat. No. 11,337,163 B2

Column 73, Detailed Description, Line 25:
Delete "1920" and insert --1904-- therefor Column 73, Detailed Description, Line 27:
Delete "T0 and T1," and insert --$T_0$ and $T_1$,-- therefor Column 73, Detailed Description, Line 28:
Delete "T1)." and insert --$T_1$).-- therefor Column 73, Detailed Description, Line 47:
Delete "1904" and insert --1920-- therefor Column 78, Detailed Description, Line 23:
Delete "T0 and T1," and insert --$T_0$ and $T_1$,-- therefor Column 78, Detailed Description, Line 23:
Delete "T1)." and insert --$T_1$).-- therefor Column 79, Detailed Description, Line 62:
Delete "T0 and T1," and insert --$T_0$ and $T_1$,-- therefor Column 79, Detailed Description, Line 63:
Delete "T1)." and insert --$T_1$).-- therefor Column 81, Detailed Description, Line 59:
Delete "T0 and T1," and insert --$T_0$ and $T_1$,-- therefor Column 81, Detailed Description, Line 59:
Delete "T1)." and insert --$T_1$).-- therefor Column 82, Detailed Description, Line 32:
Delete "T0 and T1," and insert --$T_0$ and $T_1$,-- therefor Column 82, Detailed Description, Line 33:
Delete "T1)." and insert --$T_1$).-- therefor Column 82, Detailed Description, Line 51:
Delete "1 may" and insert --l may-- therefor Column 83, Detailed Description, Line 1:
Delete "T0 and T1," and insert --$T_0$ and $T_1$,-- therefor Column 83, Detailed Description, Line 2:
Delete "T1)." and insert --$T_1$).-- therefor

CERTIFICATE OF CORRECTION (continued)
U.S. Pat. No. 11,337,163 B2

Column 91, Detailed Description, Line 27:
Delete "T1" and insert --$T_1$-- therefor Column 91, Detailed Description, Line 27:
Delete "T0 and T1." and insert --$T_0$ and $T_1$.-- therefor Column 93, Detailed Description, Line 21:
Delete "T1)" and insert --$T_1$)-- therefor Column 94, Detailed Description, Line 62:
Delete "T2." and insert --$T_2$.-- therefor Column 98, Detailed Description, Line 27:
Delete "T2)." and insert --$T_2$).-- therefor Column 98, Detailed Description, Line 65:
Delete "T3)." and insert --$T_3$).-- therefor Column 107, Detailed Description, Line 9:
Delete "Lab VIEWMathScript." and insert --LabVIEWMathScript.-- therefor Column 108, Detailed Description, Lines 12-13:
After "manner", insert --.--